(12) United States Patent
McHugh et al.

(10) Patent No.: US 9,187,340 B2
(45) Date of Patent: Nov. 17, 2015

(54) SULFIDE OXIDATION PROCESS FOR PRODUCTION OF MOLYBDENUM OXIDES FROM MOLYBDENITE

(71) Applicant: Orchard Material Technology, North Andover, MA (US)

(72) Inventors: Larry F. McHugh, North Andover, MA (US); Leonid N. Shekhter, Ashland, MA (US); Joseph D. Lessard, Medford, MA (US); Daniel G. Gribbin, Portland, ME (US); Esra Cankaya-Yalcin, North Andover, MA (US)

(73) Assignee: ORCHARD MATERIAL TECHNOLOGY, North Andover, MA (US)

( * ) Notice: Subject to any disclaimer, the term of this patent is extended or adjusted under 35 U.S.C. 154(b) by 233 days.

(21) Appl. No.: 13/946,649

(22) Filed: Jul. 19, 2013

(65) Prior Publication Data

US 2014/0161715 A1 Jun. 12, 2014

Related U.S. Application Data

(60) Provisional application No. 61/736,114, filed on Dec. 12, 2012.

(51) Int. Cl.
*C01B 39/02* (2006.01)
*C01B 17/52* (2006.01)
*C22B 1/02* (2006.01)
*C01G 39/02* (2006.01)

(52) U.S. Cl.
CPC ............... *C01G 39/02* (2013.01); *C01B 17/52* (2013.01); *C22B 1/02* (2013.01)

(58) Field of Classification Search
CPC ........... C01G 39/02; C22B 1/02; C01B 17/52
USPC ........................................................ 423/606
See application file for complete search history.

(56) References Cited

U.S. PATENT DOCUMENTS

| 3,336,100 | A | * | 8/1967 | Cloppet ...................... 423/606 |
| 4,045,215 | A | | 8/1977 | Leroy et al. |
| 4,321,089 | A | | 3/1982 | Kruesi et al. |

(Continued)

FOREIGN PATENT DOCUMENTS

EA 002417 2/2000

OTHER PUBLICATIONS

Hakobyan et al.; "New Technology for the Treatment of Molybdenum Sulfide Concentrates"; Sohn Int'l Symp Adv Processing of Metals and Materials vol. 4—New; Improved and Existing Tech: Non-Ferrous Materials Extraction and Processing; 2006; pp. 203-216.

(Continued)

*Primary Examiner* — Anthony J Zimmer
(74) *Attorney, Agent, or Firm* — Cantor Colburn LLP

(57) ABSTRACT

A looping method for production of $MoO_2$, the method including reacting molybdenite feed with a substantially stoichiometric mixture comprising $MoO_3$ and oxygen in a first furnace to produce $MoO_2$ and $SO_2$, removing a first portion of the $MoO_2$ from the first furnace, transferring a second portion of the $MoO_2$ from the first furnace to a second furnace, reoxidizing of the transferred portion of the $MoO_2$ in the second furnace to $MoO_3$; and looping the $MoO_3$ from the second furnace to the first furnace for use as an oxidizing agent.

16 Claims, 31 Drawing Sheets

(56) References Cited

U.S. PATENT DOCUMENTS

| | | | |
|---|---|---|---|
| 4,376,647 A | | 3/1983 | Sohn |
| 4,462,822 A | | 7/1984 | Sabacky et al. |
| 4,523,948 A | | 6/1985 | McHugh et al. |
| 4,552,749 A | * | 11/1985 | McHugh et al. .............. 423/606 |
| 4,555,387 A | | 11/1985 | Sabacky et al. |
| 4,687,647 A | * | 8/1987 | Berg .............................. 423/53 |
| 6,730,279 B2 | | 5/2004 | Balliett et al. |
| 2008/0260612 A1 | | 10/2008 | McHugh |

OTHER PUBLICATIONS

Hakobyan et al.; "The oxidation of molybdenum sulfide concentrate with water vapor. Part 1—Thermodynamic aspects"; Mineral Processing and Extractive Metallurgy (TIMM C); vol. 116; pp. 152-154 (2007).

Hakobyan et al.; "The oxidation of molybdenum sulfide concentrate with water vapor. Part 2—Macrokinetics and mechanism"; Mineral Processing and Extractive Metallurgy (TIMM C); vol. 116; pp. 155-158 (2007).

McHugh et al.; "Climax Conversion Practice III"; The Metallurgical Society of CIM; 1977; pp. 21-24.

McHugh et al.; "The Sulfide Ore Looping Oxidation Process: An Alternative to Current Roasting and Smelting Practice"; JOM; Jul. 2008; pp. 84-87.

\* cited by examiner

SULFIDE OXIDATION PROCESS FOR PRODUCTION OF MOLYBDENUM OXIDES FROM MOLYBDENITE

CROSS-REFERENCE TO RELATED APPLICATION

This application claims the benefit of U.S. Provisional Application No. 61/736,114 filed Dec. 12, 2012, which is hereby incorporated by reference in its entirety.

FIELD OF THE INVENTION

This application is directed to methods for the production of molybdenum oxides from molybdenite, and in particular a looping sulfide oxidation process for the production of molybdenum oxides from molybdenite.

BACKGROUND

Molybdenum (Mo) metal is usually found as deposits of molybdenite ($MoS_2$) in nature. Traditionally, the metal value is extracted from the sulfidic ore through various pyrometallurgical techniques. The primary application for Mo is in the steel industry, where it is used to produce high strength steel alloys. The Mo used in these applications is supplied to the steel manufacturers either as molybdenum(VI) oxide (molybdenum trioxide, $MoO_3$) or ferromolybdenum, an iron-molybdenum alloy.

In producing molybdenum trioxide, or so called technical grade oxide, the molybdenite is oxidized in various multiple hearth roasting furnaces. For example, one conversion process, referred to as the Climax conversion process, uses a Nichols Herreshoff or Lurgi design multiple hearth furnace to slowly roast the $MoS_2$ at temperatures in the range of 530 to 700° C. (L. F. McHugh, P. L. Sallade, *Molybdenum Conversion Practice*, Metec, Inc.: Winslow N.J., 1977; L. F. McHugh, J. Godshalk, M. Kuzior, *Climax Conversion Practice III*, The Metallurgical Society of CIM, 1977, 21-24). Over the course of roasting, the molybdenite is first converted to molybdenum(IV) oxide (molybdenum dioxide, $MoO_2$) and then slowly converted to the trioxide, $MoO_3$, in the lower hearths. In such a roasting operation, the lower hearths are maintained at lower temperatures to keep the highly volatile $MoO_3$ from sublimating. The $SO_2$ produced during conversion, which is highly diluted due to the significant amount of excess air used during roasting, is usually converted to sulfuric acid in a downstream process, which may result in some high pressure steam production.

The molybdenite host ore (unprocessed ore containing molybdenite) is usually concentrated prior to oxidation to upgrade the molybdenite concentration via an oil flotation method. A method has been described wherein the residual flotation oil can be removed in situ during roasting to produce technical grade oxide from the molybdenite without further purification (L. F. McHugh, D. E. Barchers, *Roasting of Molybdenite Concentrates Containing Flotation Oils*, U.S. Pat. No. 4,523,948, issued Jun. 18, 1985).

In alternative incarnations of $MoO_3$ production, microwaves have been used to heat molybdenite host ores in the presence of oxygen to convert them to oxides, followed by separation and recovery (P. R. Kruesi, V. H. Frahm, Jr., *Process for the Recovery of Molybdenum and Rhenium from their Sulfide Ores*, U.S. Pat. No. 4,321,089, issued Mar. 23, 1982). Chlorine can be substituted for oxygen and the metals recovered as chlorides. The conversion can be conducted in a flash roasting set-up wherein the molybdenite is converted to gaseous $MoO_3$ and any slag-forming constituents are converted to a liquid slag that separates from the molybdenum, wherein the flash roasting is performed at 1600±200° C., and the technical grade oxide is later condensed at significantly lower temperatures (B. J. Sabacky, M. T. Hepworth, *Flash Roasting of Molybdenum Sulfide Concentrates in a Slagging Reactor*, U.S. Pat. No. 4,555,387, issued Nov. 26, 1985). High pressure oxidation carried out in an autoclave followed by leaching and recovery has also been described (R. W. Balliett, W. Kummer, J. E. Litz, L. F. McHugh, H. H. K. Nauta, P. B. Queneau, R.-C. Wu, *Production of Pure Molybdenum Oxide from Low Grade Molybdenite Concentrates*, U.S. Pat. No. 6,730,279, issued May 4, 2004).

It is more attractive to the steel industry to use $MoO_2$ rather than $MoO_3$ because the lower oxygen content means a higher Mo content, and less reducing agent consumption during the production of molybdenum steels. Additionally, the dioxide is less volatile than the trioxide. The use of $MoO_2$ also eliminates the need to produce ferromolybdenum. Several authors have attempted to produce the dioxide from molybdenite concentrates using various techniques.

For example, by mixing stoichiometric amounts of powdered or pelletized $MoO_3$ and $MoS_2$, $MoO_2$ can be produced at temperatures of 600 to 700° C. and pressure slightly in excess of atmospheric pressure, while liberating $SO_2$ (R. Cloppet, *Process for the Production of Molybdenum Dioxide*, U.S. Pat. No. 3,336,100, issued Aug. 15, 1967). The molybdenum product was then further treated in an $SO_2$ lean atmosphere to produce the final dioxide product. In a similar process, particulate $MoO_2$ and $MoS_2$ (weight ratio 2:1) were roasted at 700 to 800° C. in the presence of enough oxygen to facilitate the conversion of the molybdenite to $MoO_2$ (B. J. Sabacky, M. T. Hepworth, *Molybdenum Dioxide-Molybdenite Roasting*, U.S. Pat. No. 4,462,822, issued Jul. 31, 1984). A portion of the dioxide produced was recycled to convert the next charge of molybdenite. Some $MoO_3$ is produced as a by-product. Pelletized $MoO_2$ has been produced from $MoO_3$ using a reducing $H_2$ atmosphere in a reaction vessel that was able to control the exothermic reduction of the trioxide (H. W. Meyer, J. D. Baker, W. H. Ceckler, *Direct Reduction of Molybdenum Oxide to Substantially Metallic Molybdenum*, U.S. Pat. No. 4,045,215, issued Aug. 30, 1977). The dioxide was further reduced to metallic Mo, or the dioxide was collected as a final product.

It has also been proposed to convert molybdenite to $MoO_2$ using water steam (K. Y. Hakobyan, H. Y. Sohn, A. V. Tarasov, P. A. Kovgan, A. K. Hakobyan, V. A. Briovkvine, V. G. Leontiev, and O. I. Tsybine, "New Technology for the Treatment of Molybdenum Sulfide Concentrates," Sohn International Symposium Advanced Processing of Metals and Materials Vol. 4 to New, Improved and Existing Technologies: Non-Ferrous Materials Extraction and Processing, ed. by F. Kongoli and R. G. Reddy, TMS (The Minerals, Metals & Materials Society), pp. 203-216, 2006; H. Y. Sohn, *Process for Treating Sulfide-Bearing Ores*, U.S. Pat. No. 4,376,647, issued Mar. 15, 1983; K. Y. Hakobyan, P. A. Kovgan, A. V. Tarasov, A. K. Hakobyan, Eurasian Patent 002417, issued 2002; K. Y. Hakobyan, H. Y. Sohn, A. K. Hakobyan, V. A. Bryukvin, V. G. Leontiev, and O. I. Tsibin, "The Oxidation of Molybdenum Sulfide Concentrate with Water Vapor: Part I. Thermodynamic Aspects," Mineral Processing and Extractive Metallurgy (TIMM C), 116, 152-154 (2007); K. Y. Hakobyan, H. Y. Sohn, A. K. Hakobyan, V. A. Bryukvin, V. G. Leontiev, and O. I. Tsibin, "The Oxidation of Molybdenum Sulfide Concentrate with Water Vapor: Part II. Macrokinetics and Mechanism," Mineral Processing and Extractive Metallurgy (TIMM C), 116, 155-158 (2007)). In such a scheme, steam is reacted with the $MoS_2$ feed to produce the dioxide and an $H_2S$ off-gas stream. Hydrogen sulfide is a toxic gas and is difficult to handle in downstream processes. A rotating furnace is used to treat molybdenite ores at 900 to 1,000° C. in a countercurrent flow of water vapor in an excess of 6 to 10 times the mass of the molybdenite. Residual sulfur is optimized to minimize the loss of $MoO_2$ to $MoO_3$ vapor formation.

Solid $MoO_3$ has been used in a reaction between $MoO_3$ and $MoS_2$ to produce $MoO_2$ (L. F. McHugh, D. K. Huggins, M. T. Hepworth, J. M. Laferty, *Process for the Production of Molybdenum Dioxide*, U.S. Pat. No. 4,552,749, issued Nov. 12, 1985). In this process the conversion to dioxide is carried out at temperatures low enough to favor dioxide formation and to produce an $SO_2$-rich stream (750 to 950° C.). A portion of the $MoO_2$ product was sent to a flash reactor where it was reoxidized to the trioxide at temperatures sufficient to sublimate the $MoO_3$ (1,000 to 1,700° C.) and recycled to convert the next charge of molybdenite. In a similar process, the $MoO_2$ is oxidized in a second step to $MoO_3$ to recover rhenium from the final product; in this operation the $MoO_2$ is not the final product (H. Y. Sohn, *Process for Treating Sulfide-Bearing Ores*, U.S. Pat. No. 4,376,647, issued Mar. 15, 1983).

Solid $MoO_3$ has been proposed as an oxidant to molybdenite to achieve a high degree of desulfurization; the process required ca. 10% excess $MoO_3$ to be mixed intimately with the molybdenite in order to achieve a low sulfur content product (L. F. McHugh, R. Balliett, J. A. Mozolic, *The Sulfide Ore Looping Oxidation Process: An Alternative to Current Roasting and Smelting Practice*, JOM, July 2008, 84-87; L. F. McHugh, *Oxidation of metallic materials as part of an extraction, purification, and/or refining process*, U.S. Patent Application 2008/0260612 A1, published Oct. 23, 2008). Some of the dioxide was then reoxidized in a flash furnace with oxygen to recycle $MoO_3$ to the molybdenite charge (similar to as reported in L. F. McHugh, D. K. Huggins, M. T. Hepworth, J. M. Laferty, *Process for the Production of Molybdenum Dioxide*, U.S. Pat. No. 4,552,749, issued Nov. 12, 1985).

The methods described above all appear to use significant excess oxygen. While these methods produce $MoO_2$ from molybdenite feeds, it has not been possible to produce a product without concomitantly producing some $MoO_3$. When it has been used, oxygen has also always been in excess. A method that can produce exclusively $MoO_2$ is desired.

There accordingly remains a need in the art for methods for the production of $MoO_2$ from molybdenite. Producing $MoO_2$ with lower amounts of $MoO_3$ is considered particularly advantageous. It is further desired that the $MoO_2$ productions methods allowed control of $SO_2$ and energy consumption during production.

SUMMARY OF THE INVENTION

The present disclosure provides a pyrometallurgical method for production of molybdenum(IV) oxide, the method including contacting molybdenite feed with oxygen in a furnace including a high temperature zone, wherein an amount of the oxygen is substantially stoichiometric; and reacting the molybdenite feed with the oxygen to produce molybdenum(IV) oxide and sulfur(IV) oxide, wherein complete desulfurization of the molybdenite feed is accomplished in the high temperature zone at a temperature of about 1,000 to about 1,500° C. with a residence time of about 0.1 to about 40 seconds.

The present disclosure also provides a looping method for production of molybdenum(IV) oxide, the method comprising reacting a molybdenite feed with a substantially stoichiometric mixture comprising molybdenum(VI) oxide and oxygen in a first furnace to produce molybdenum(IV) oxide and sulfur(IV) oxide; removing a first portion of the molybdenum(IV) oxide from the first furnace; transferring a second portion of the molybdenum(IV) oxide from the first furnace to a second furnace; reoxidizing the second portion of the molybdenum(IV) oxide in the second furnace to molybdenum(VI) oxide; and looping the molybdenum(VI) oxide from the second furnace to the first furnace for use as an oxidizing agent.

Other embodiments will be apparent from the Drawings, Detailed Description, and Claims below.

BRIEF DESCRIPTION OF THE DRAWINGS

These and other aspects will become apparent and more readily appreciated from the following description of the embodiments, taken in conjunction with the accompanying drawings in which.

DETAILED DESCRIPTION

Direct Oxidation of $MoS_2$ with Gaseous $O_2$

In an embodiment, a method for production of molybdenum(IV) oxide ($MoO_2$) includes contacting a molybdenite feed with oxygen, wherein an amount of the oxygen is substantially stoichiometric, and oxidizing the molybdenite feed with the oxygen in a furnace to $MoO_2$.

The term "molybdenite feed" as defined herein refers to molybdenum sulfide ($MoS_2$) concentrate that primary includes molybdenum disulfide and small amounts of gangue components such as $SiO_2$, $Al_2O_3$, FeO, or CaO. The molybdenite feed may include any particulated concentrate composed predominantly of molybdenum disulfide derived from any one of a number of commercial sources. For example, the molybdenite feed may include a concentrate derived from various ore beneficiation processes that are effective to reduce the gangue and other contaminating substances in the concentrate to levels below about 10%. The concentration of the molybdenum disulfide in the ore, as mined, is generally in the order of about 0.03% to about 0.06%, but this concentration may be increased through various beneficiation processes, such as an oil flotation extraction process, to levels of 50% or greater molybdenum, and even of 60% or greater molybdenum.

The oxygen used in the method for production of $MoO_2$ may include pure oxygen, or a mixture of oxygen and another gas, for example, a mixture of oxygen and nitrogen, air, or oxygen-enriched air. The content of oxygen in air may be about 21%, and the content of oxygen in oxygen-enriched air may be from about 21% to about 100%.

The term "substantially stoichiometric," as defined herein with regard to the method for production of $MoO_2$ by oxidation with oxygen but without use of molybdenum(VI) oxide $MoO_3$ as an oxidant, refers to a ratio of molecular oxygen ($O_2$) to molybdenite feed ($MoS_2$) that is 3:1 or about 3:1 (moles $O_2$:moles $MoS_2$). The stoichiometric amount is given as a percent of the stoichiometric 3 moles oxidizing agent (molecular oxygen): 1 mole $MoS_2$ stoichiometry. A stoichiometric percent of 90% to 110% indicates a ratio of moles $O_2$ to moles $MoS_2$ of about 2.7:1 to about 3.3:1. The substantially stoichiometric amount may be about 85% to about 115% based on the total amount of molybdenite feed, for example, about 90% to about 110% based on the total amount of molybdenite feed, or about 95% to about 105% based on the total amount of molybdenite feed.

The oxidation of the molybdenite feed with the oxygen may be conducted in a furnace, which for example, can be a flash furnace, a shaft furnace, a multiple hearth furnace, a rotary furnace, a rotary kiln, or a fluid bed furnace.

The oxidation of the molybdenite feed with the oxygen may further be conducted at temperature of about 500° C. to about 1,500° C., for example, 800° C. to about 1,500° C., or 1,100° C. to about 1,500° C.

Figure 1:
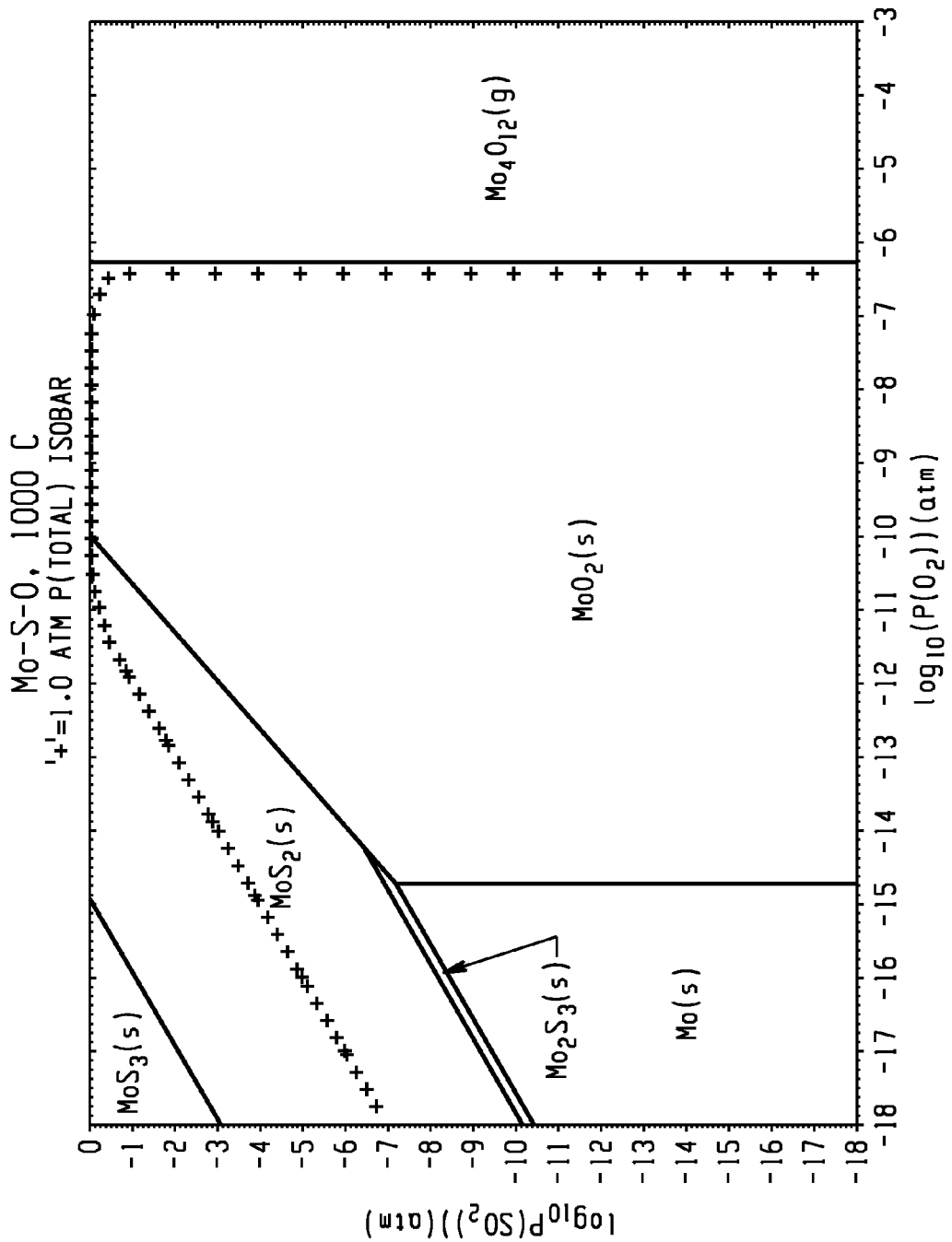
FIG. 1 shows a predominance phase diagram for the Mo—O—S system at 1,000° C.
Figure 2:
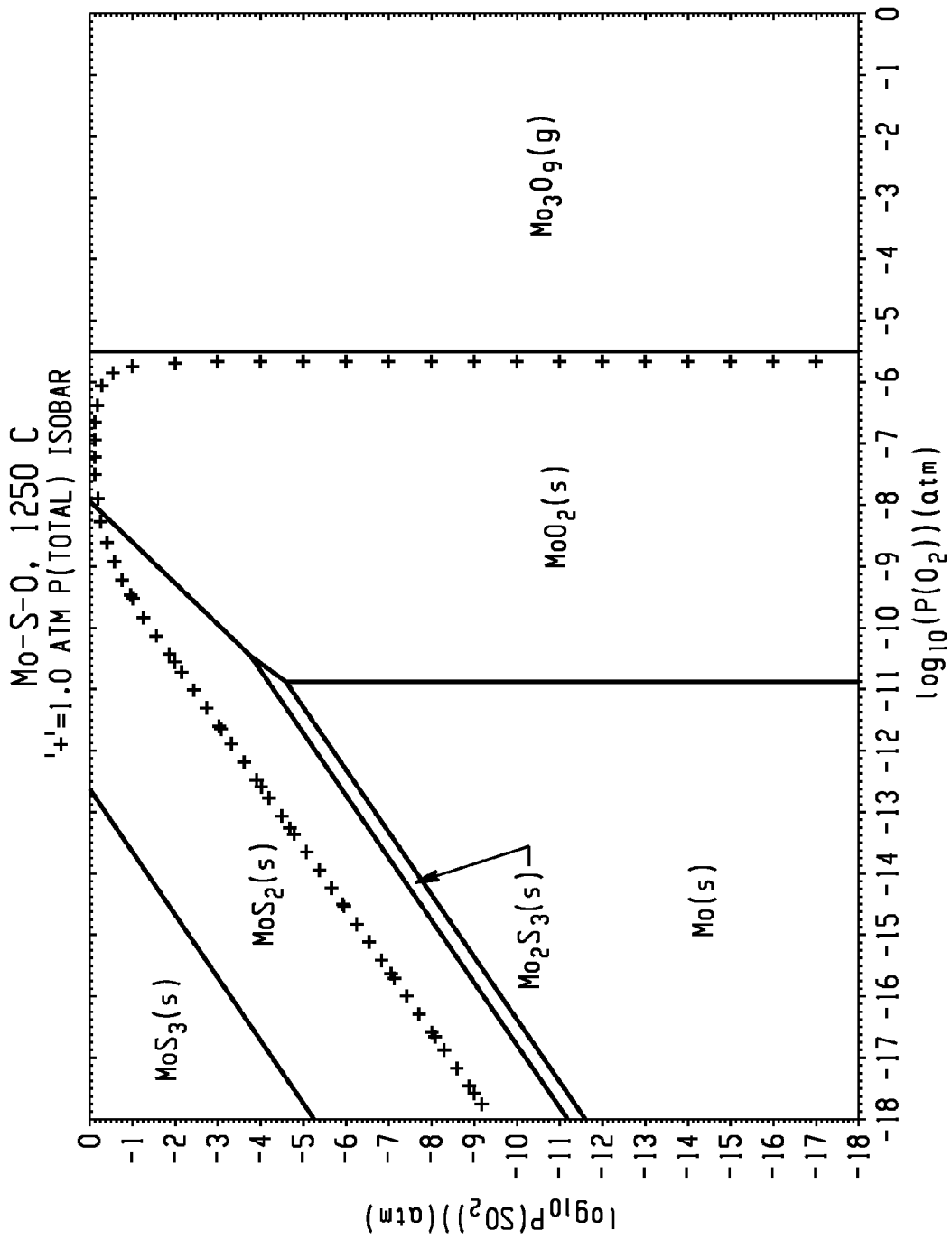
FIG. 2 shows a predominance phase diagram for the Mo—O—S system at 1,250° C.
Figure 3:
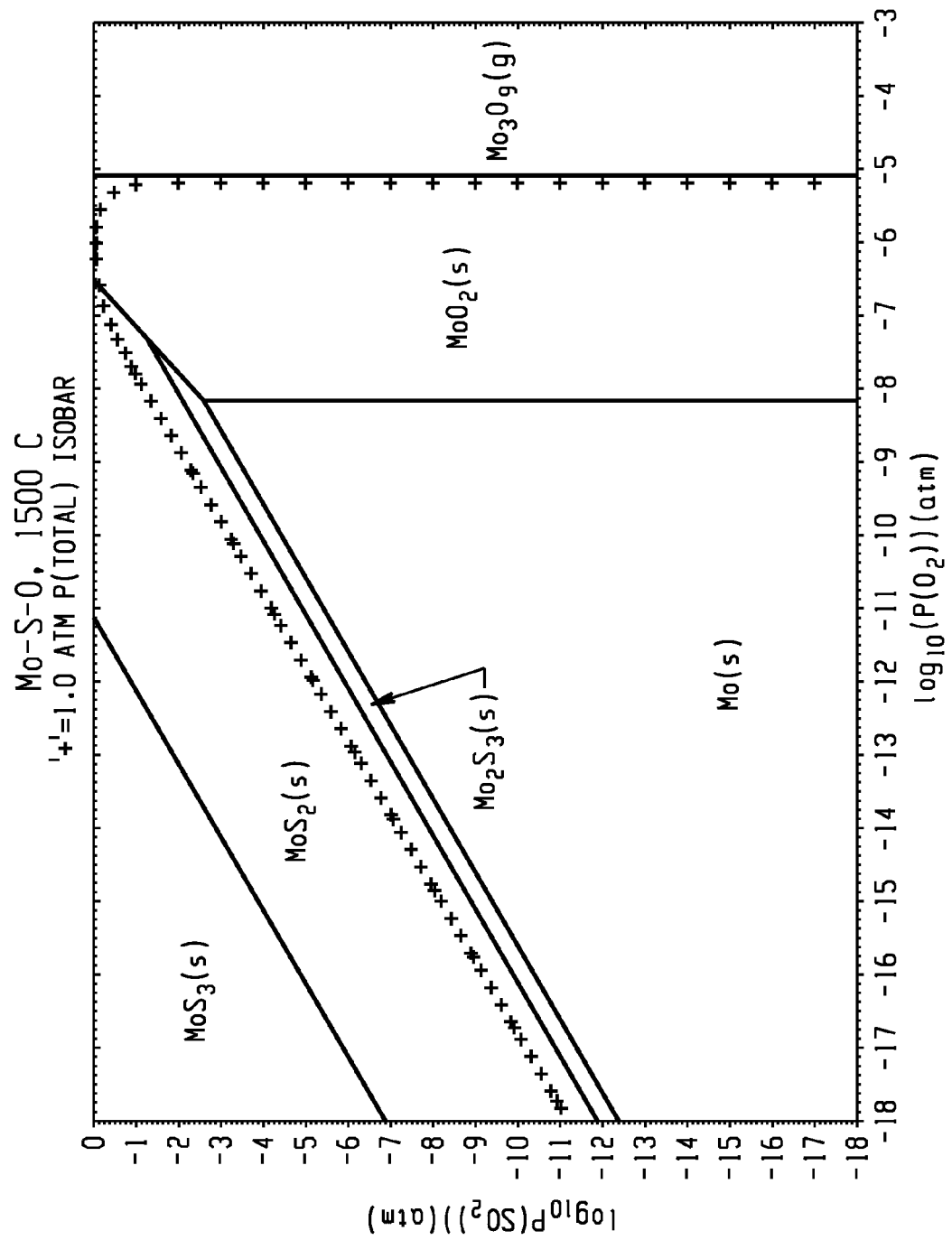
FIG. 3 shows a predominance phase diagram for the Mo—O—S system at 1,500° C.

FIGS. 1 to 10 demonstrate the thermodynamics for the chemical reaction of $MoS_2$ with gaseous oxygen produced using FactSage software (Bale, C. W., et al. FactSage™ 6.3.1, Thermfact and GTT-Technologies, CRCT, Montreal, Canada (2012)) that model the thermodynamic equilibria of various species under given thermodynamic states. FIGS. 1 to 3 show the predominance phase diagram for the Mo—$O_2$—$SO_2$ system at 1,000° C., 1,250° C., and 1,500° C., respectively. These diagrams show that $MoO_2$, a traditionally difficult compound to isolate during conventional roasting, is stable over a range of operating pressures and temperatures. With increase in temperature, it is observed that $MoO_2$ becomes the thermodynamically stable species over a more and more narrow $O_2$ partial pressure. This suggests that an appropriately designed process can operate at or near equilibrium conditions and produce $MoO_2$ selectively over $MoO_3$ from $MoS_2$ concentrates. Additionally, it is apparent from FIGS. 1 to 3 that $MoS_2$ progresses first to $MoO_2$ before further oxidation to either molybdenum suboxides or $MoO_3$. Therefore, an appropriately designed process will take steps to maximize the conversion of $MoS_2$ to $MoO_2$ while minimizing any further oxidation. Such steps include promoting the rapid and complete conversion of $MoS_2$ by using fine particulate $MoS_2$ feed, high temperature reactor operation, precise $MoS_2$ and oxygen feed rates and ratios. The molybdenite feed should be free flowing and well dispersed in the oxygen feed to promote complete exposure of the $MoS_2$ to the oxidizer. Due to the exothermic nature of the reaction between $MoS_2$ and $O_2$, it is possible to create a high temperature zone in the furnace wherein the conversion of $MoS_2$ to $MoO_2$ takes place. Thus, the term "high temperature zone" as defined herein refers to a portion of a furnace wherein an exothermic reaction (Table 5) between the molybdenum feed and oxygen to produce $MoO_2$ takes place. The residence time in the high temperature zone can be estimated using Stokes' Law, which relates drag force on a falling particle to the particle's size and the viscosity of the surrounding fluid. Taking into consideration that the largest particle present in the molybdenite feed will fall the fastest, the size of this particle determines the minimum residence time required to perform the desulfurization; all smaller particles will spend a longer time in the high temperature zone. The residence time of the reacting particles in the high temperature zone (1000-1500° C.) will vary from 0.1 to 40 seconds for particle agglomerates on the order of 500 to 1000 μm.

| | Residence time in high temperature zone of given length, sec | | |
|---|---|---|---|
| Particle size, μm | 0.01 m | 0.1 m | 1.0 m |
| 500 | 0.39 | 3.9 | 39 |
| 1000 | 0.10 | 0.98 | 9.8 |

Figure 4:
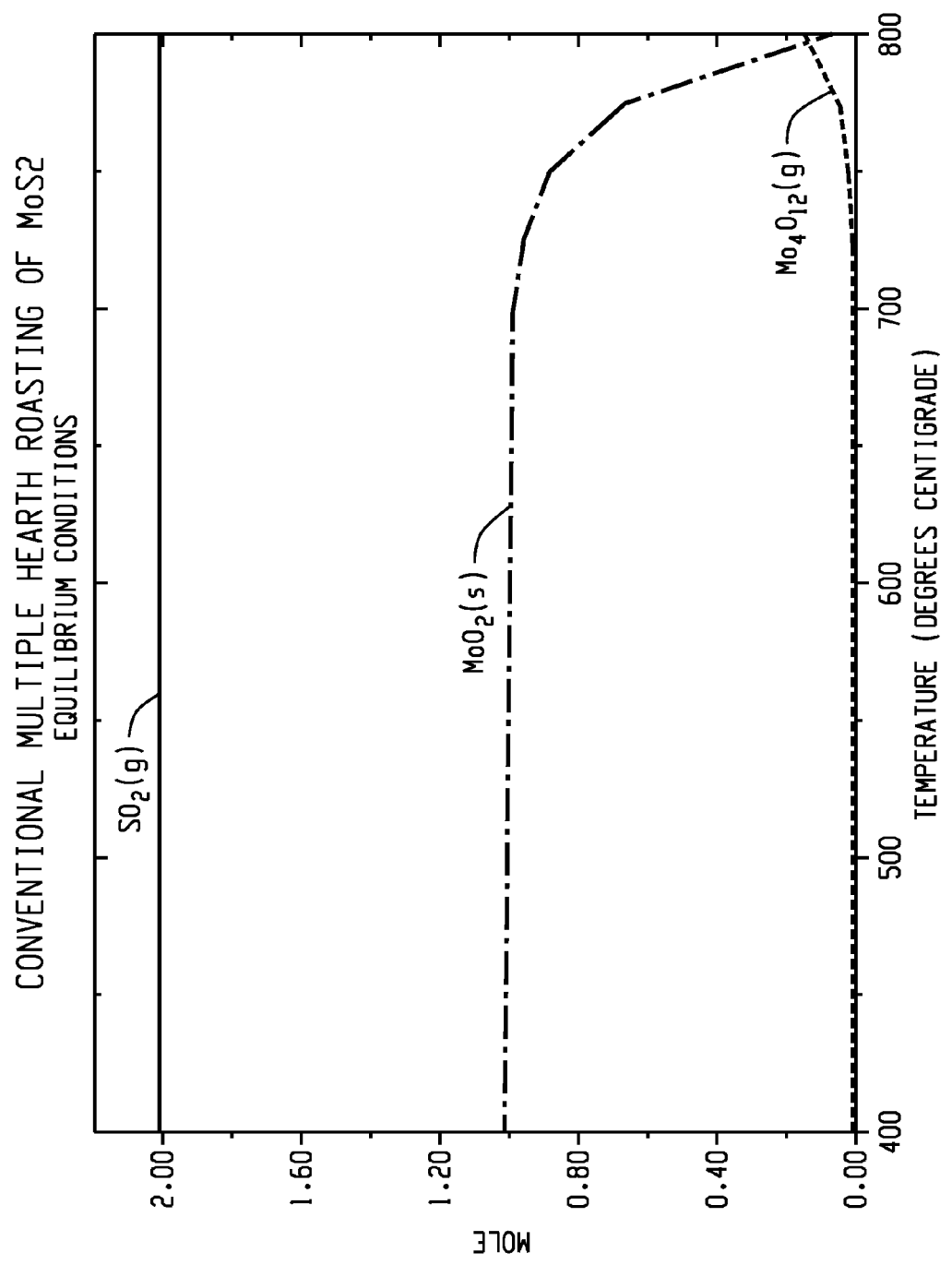
FIG. 4 shows a thermodynamic equilibrium composition during conventional roasting of 1 mole of Mo $S_2$.

A flash type reactor is well suited to provide the short residence that ensures complete desulfurization and conversion to $MoO_2$ without overoxidizing the molybdenum. The term "complete desulfurization" as defined herein means that less than 0.1 weight % of sulfur remains in the molybdenum oxide product(s), for example 0 to less than 0.1 weight %. More preferably, 0 to less than 0.05 weight % of sulfur remains in the molybdenum oxide product(s). Alternative embodiments may include fluid bed reactors. A self-propagating high-temperature synthesis (SHS) technique can be employed (USSR Patent No. 255221). FIG. 4 shows a conventional molybdenite roasting at 400 to 800° C. utilizing a multiple hearth furnace, which exposes the $MoS_2$ to an excess $O_2$ environment. It has been shown that by introducing $MoS_2$ to excess $O_2$, the $MoO_2$ formed as an intermediate product is further oxidized in the excess oxygen to $MoO_3$, thus lowering the yield of $MoO_2$. The overall chemical reaction for this operation is shown by Equation 1 wherein the x represents the excess $O_2$ used.

$$MoS_2 + (3.5+x)O_2 \rightarrow MoO_3 + 2 SO_2 \quad \text{Equation 1}$$

When using $MoO_3$ to produce alloy steels, manufacturers must reduce the oxide to metallic molybdenum. If selective production of $MoO_2$ were possible, then $MoO_2$ would be a more desirable material for production of metallic molybdenum than $MoO_3$ since $MoO_2$ has higher molybdenum content, and therefore, it requires less reducing agent to produce metallic molybdenum. All prior art attempts to selectively produce $MoO_2$ from $MoS_2$ were unsuccessful because the excess amount of $O_2$ further oxidized $MoO_2$ to $MoO_3$. In conventional multiple hearth roasting, excess $O_2$ is required to achieve complete desulfurization and complete oxidation to $MoO_3$. In the present disclosure, limiting the amount of oxygen to a stoichiometric amount, selectively produces $MoO_2$ from $MoS_2$ without further oxidation of $MoO_2$ to $MoO_3$. The appropriate FactSage simulations summarized in Table 1 confirm this result (Bale, C. W., et al. FactSage™ 6.3.1, Thermfact and GTT-Technologies, CRCT, Montreal, Canada (2012)).

TABLE 1

Process Variables in $MoS_2$ Oxidation with $O_2$.

| VARIABLE | VALUE |
|---|---|
| Temperature Range | 500 to 2,000° C. |
| Moles of $MoS_2$ | 1 |
| Moles of $O_2$ (in air) | 2.85-3.15 |
| % of Stoichiometry | 95-105% |

Oxidation of $MoS_2$ with a stoichiometric amount of oxygen is shown by Equation 2.

$$MoS_2 + 3 O_2 \text{ (stoichiometric)} \rightarrow MoO_2 + 2 SO_2 \quad \text{Equation 2}$$

Figure 5:
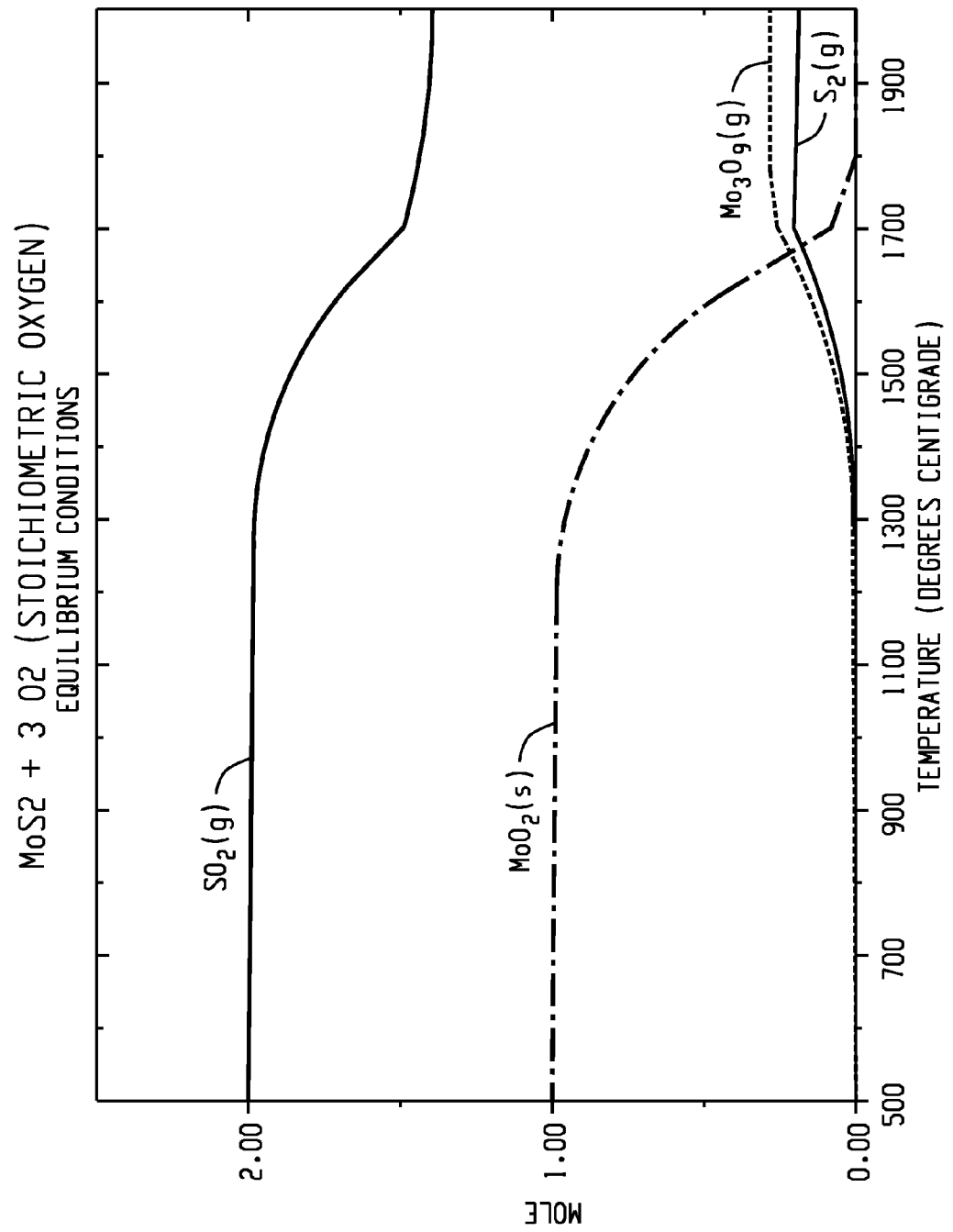
FIG. 5 shows a thermodynamic equilibrium composition for conversion of 1 mole of Mo $S_2$ to $MoO_2$ under stoichiometric $O_2$.

As can be seen from Equation 2, the maximum amount of $MoO_2$ produced from the input materials is 1 mole. As seen in FIG. 5, virtually a 100% yield of $MoO_2$ may be achieved over a wide range of temperatures when operating at equilibrium conditions. While this is promising data, controlling addition of a stoichiometric amount of $O_2$ would be challenging under plant conditions. Thus, further simulations were performed to understand the reaction under both excess and lean oxygen conditions.

Figure 6:
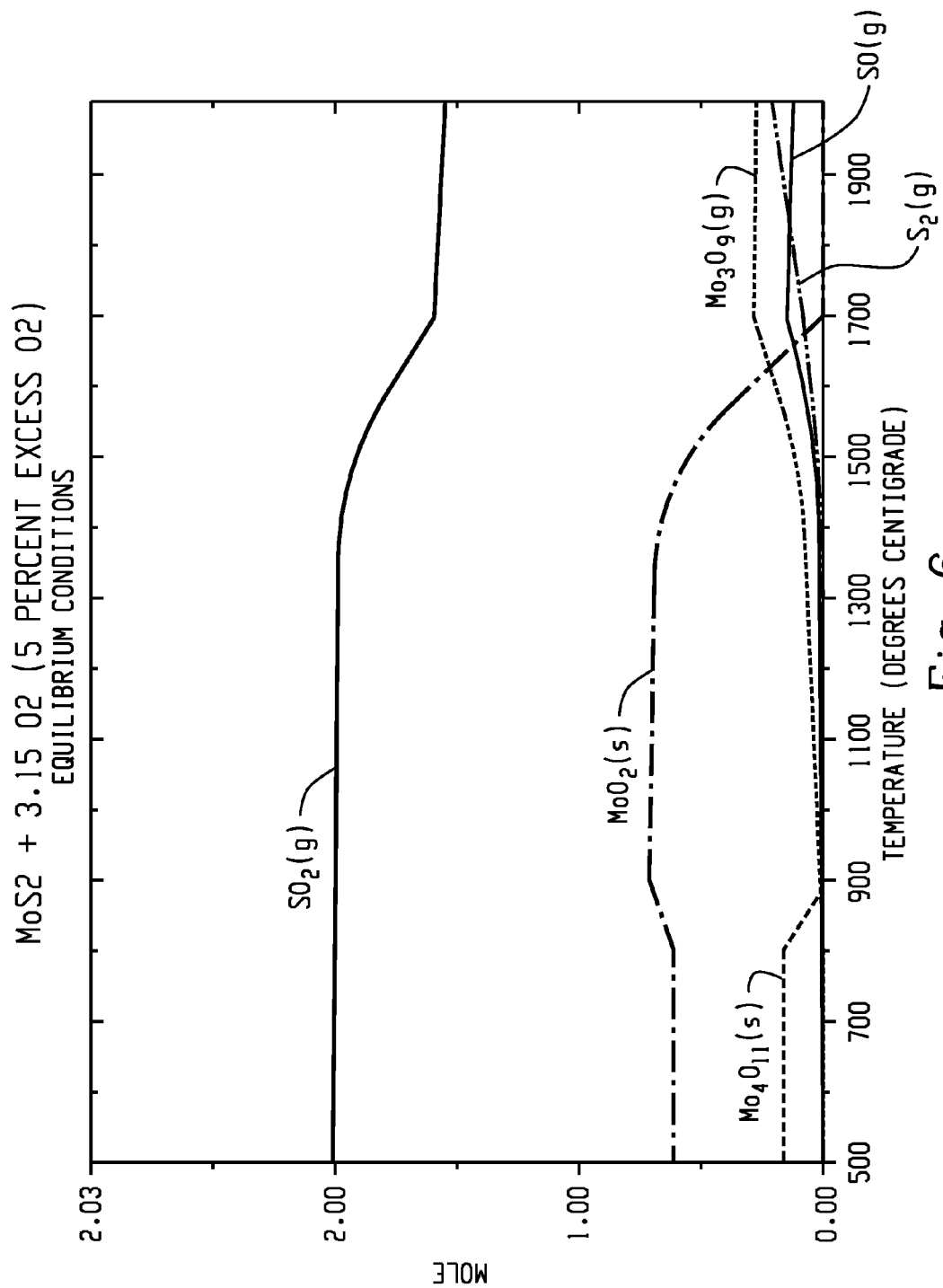
FIG. 6 shows a thermodynamic equilibrium composition for conversion of 1 mole of $MoS_2$ to $MoO_2$ under 5% excess $O_2$.

As shown in FIG. 6, when $O_2$ is present in 5% excess, approximately 30% of the $MoO_2$ product is converted to gaseous $MoO_3$ ($Mo_3O_9$). In effect, 0.7 moles of $MoO_2$ and 0.3 moles of $MoO_3$ are produced per mole of $MoS_2$ oxidized with a 5% excess of $O_2$. This significantly affects the selectivity of production of $MoO_2$ and indicates that any amount of excess $O_2$ may severely reduce the yield of $MoO_2$.

Figure 7:
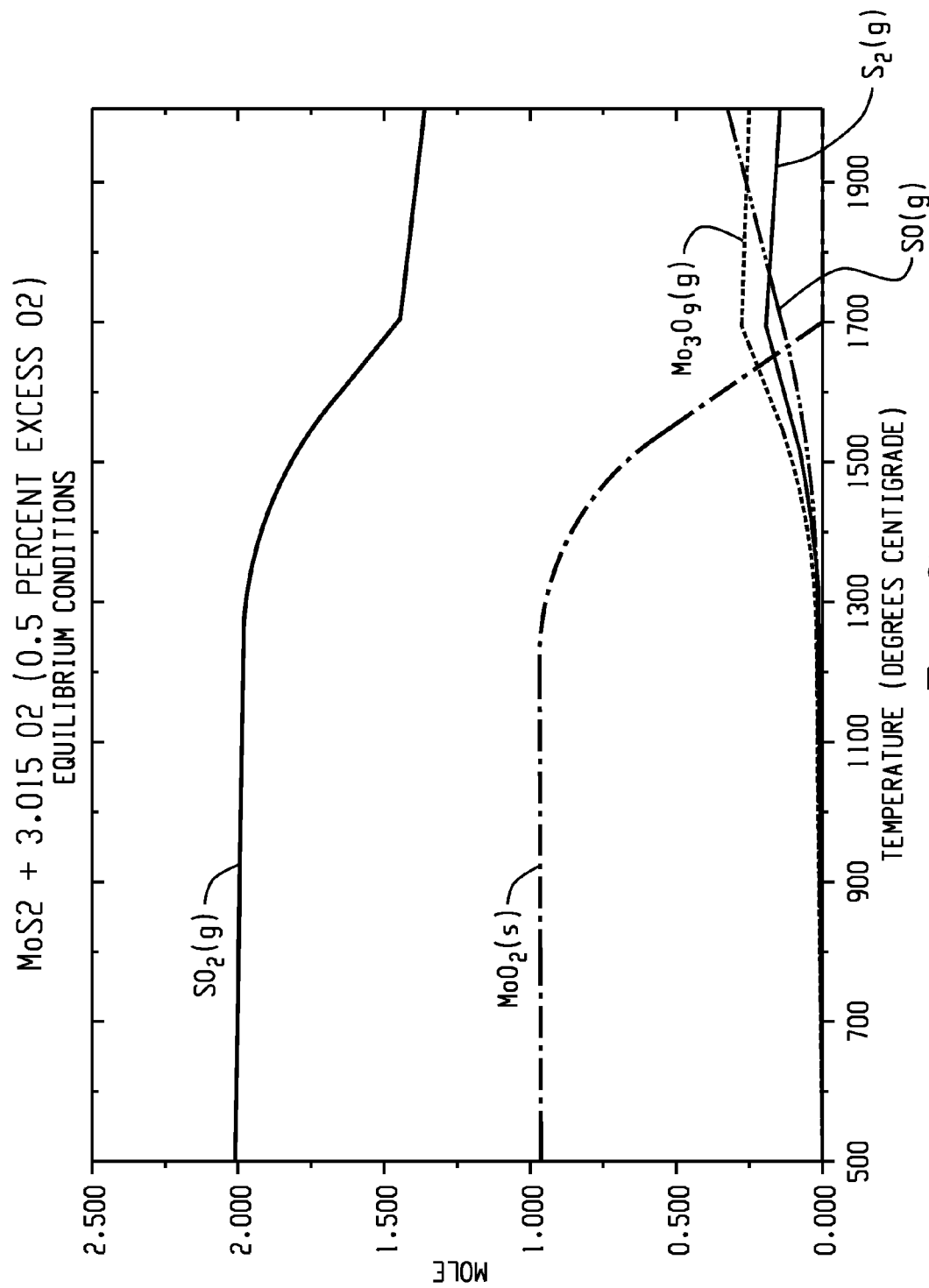
FIG. 7 shows a thermodynamic equilibrium composition for conversion of 1 mole of $MoS_2$ to $MoO_2$ under conditions utilizing 0.5% excess $O_2$.
Figure 8:
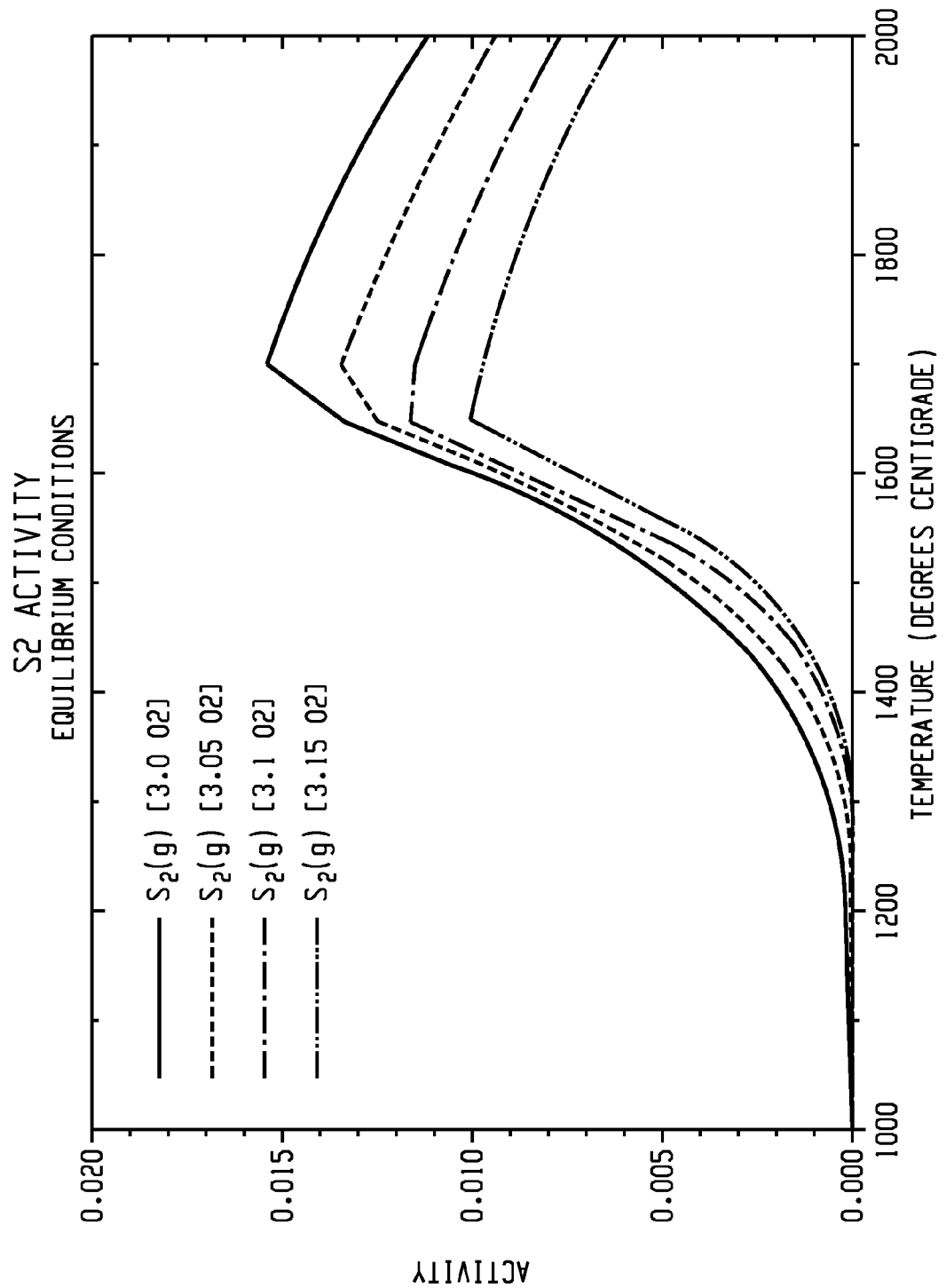
FIG. 8 shows a thermodynamic equilibrium partial pressure of $S_2$ during oxidation of 1 mole of $MoS_2$ at various amounts of oxygen.
Figure 9:
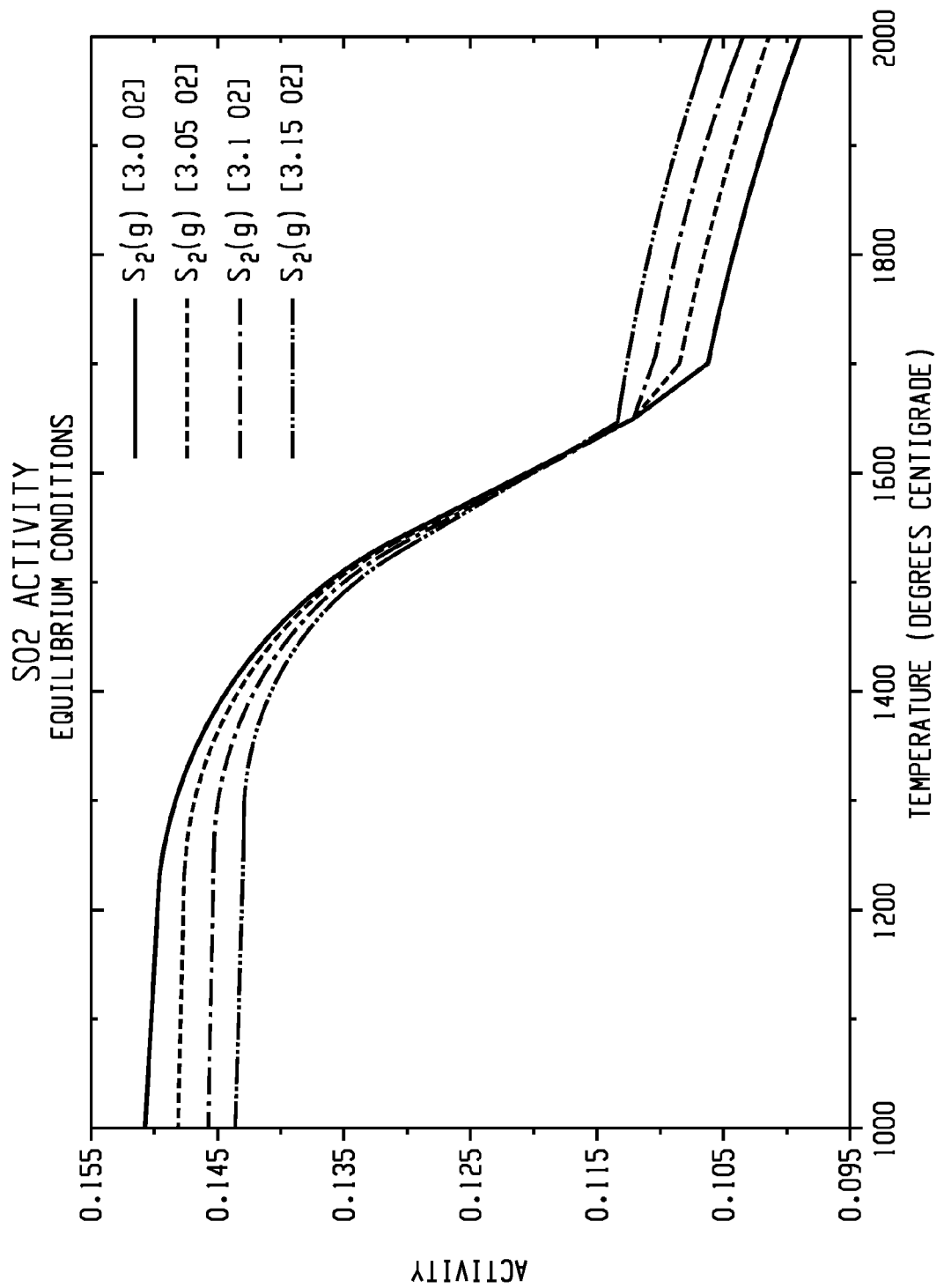
FIG. 9 shows a thermodynamic equilibrium partial pressure of $SO_2$ during oxidation of 1 mole of $MoS_2$ at different amounts of oxygen.
Figure 10:
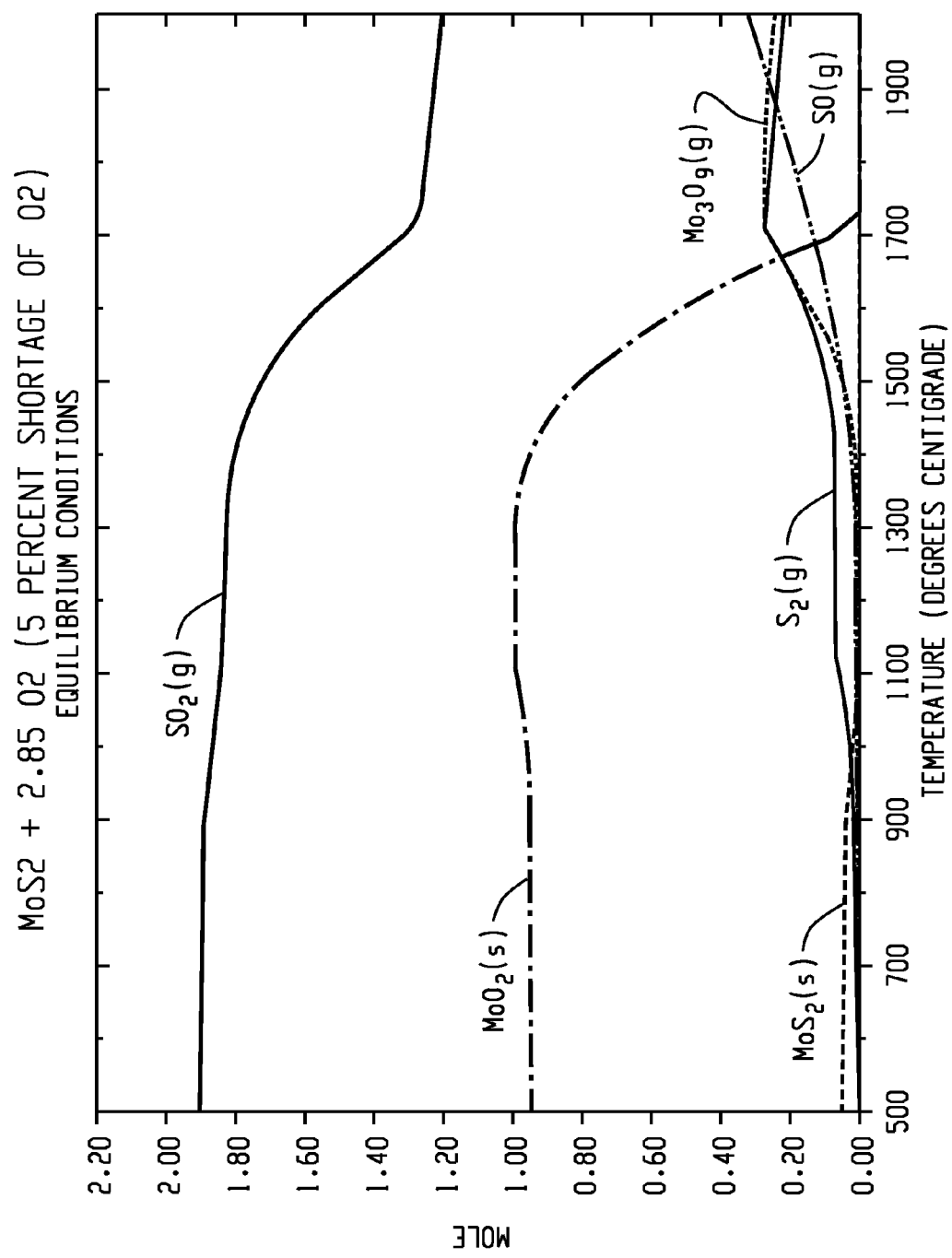
FIG. 10 shows a thermodynamic equilibrium composition for conversion of 1 mole of $MoS_2$ to $MoO_2$ under 5% lean $O_2$.
Figure 11:
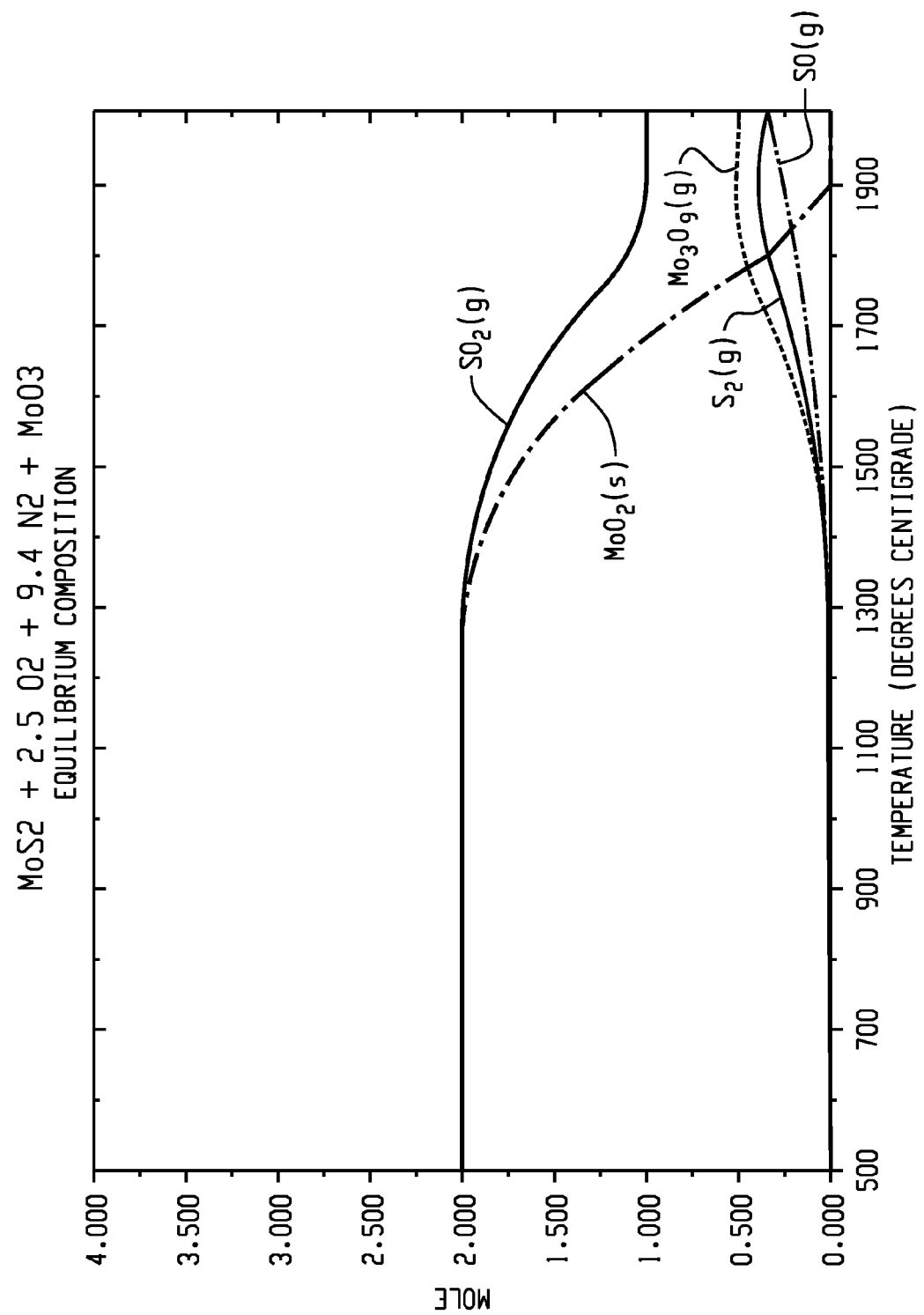
FIG. 11 shows a thermodynamic equilibrium for combined cycle oxidation of 1 mole of molybdenite; 2.5 moles $O_2$, 1 mole $MoO_3$.
Figure 12:
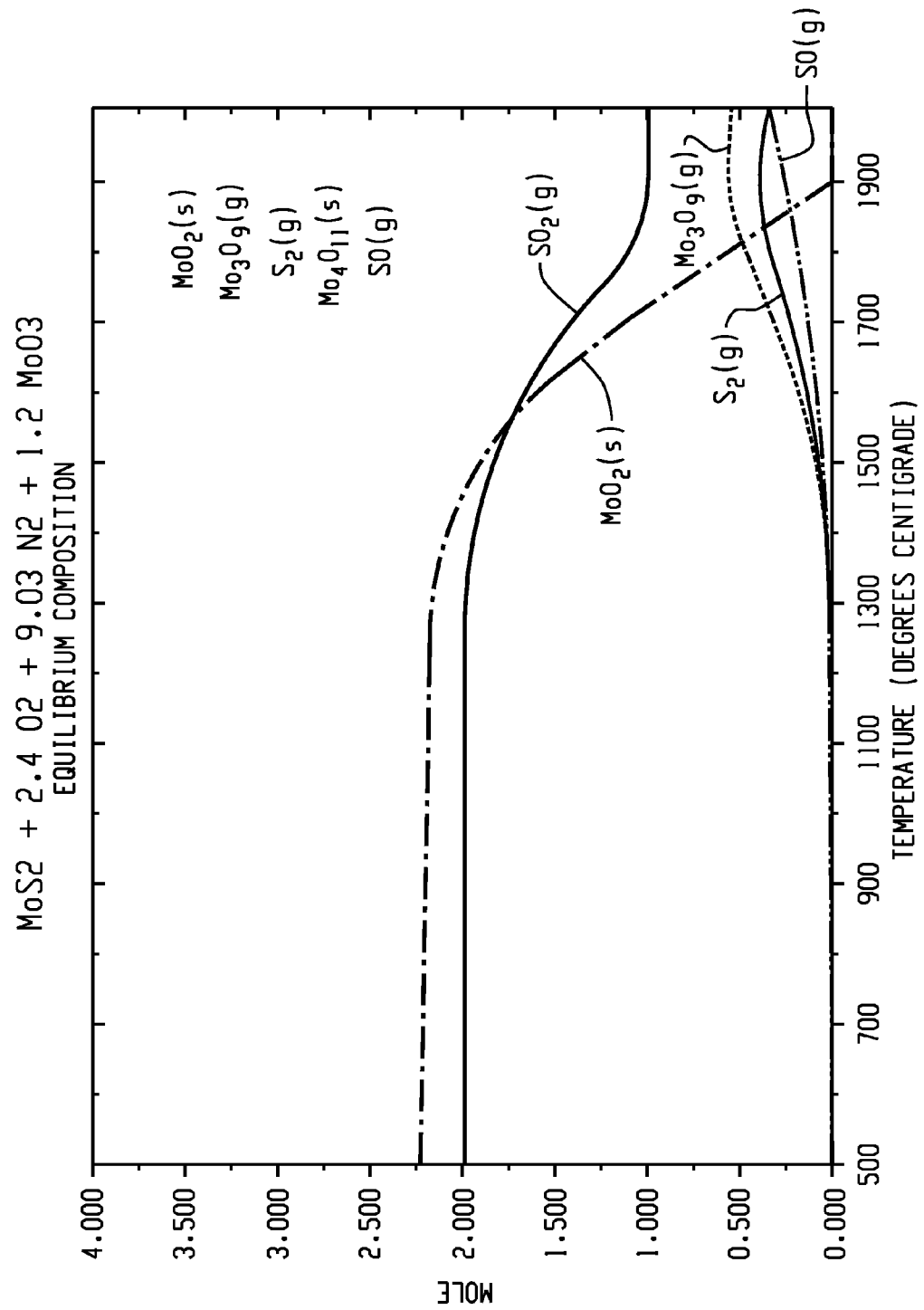
FIG. 12 shows a thermodynamic equilibrium for combined cycle oxidation of 1 mole of molybdenite; 2.4 moles $O_2$, 1.2 moles $MoO_3$.
Figure 13:
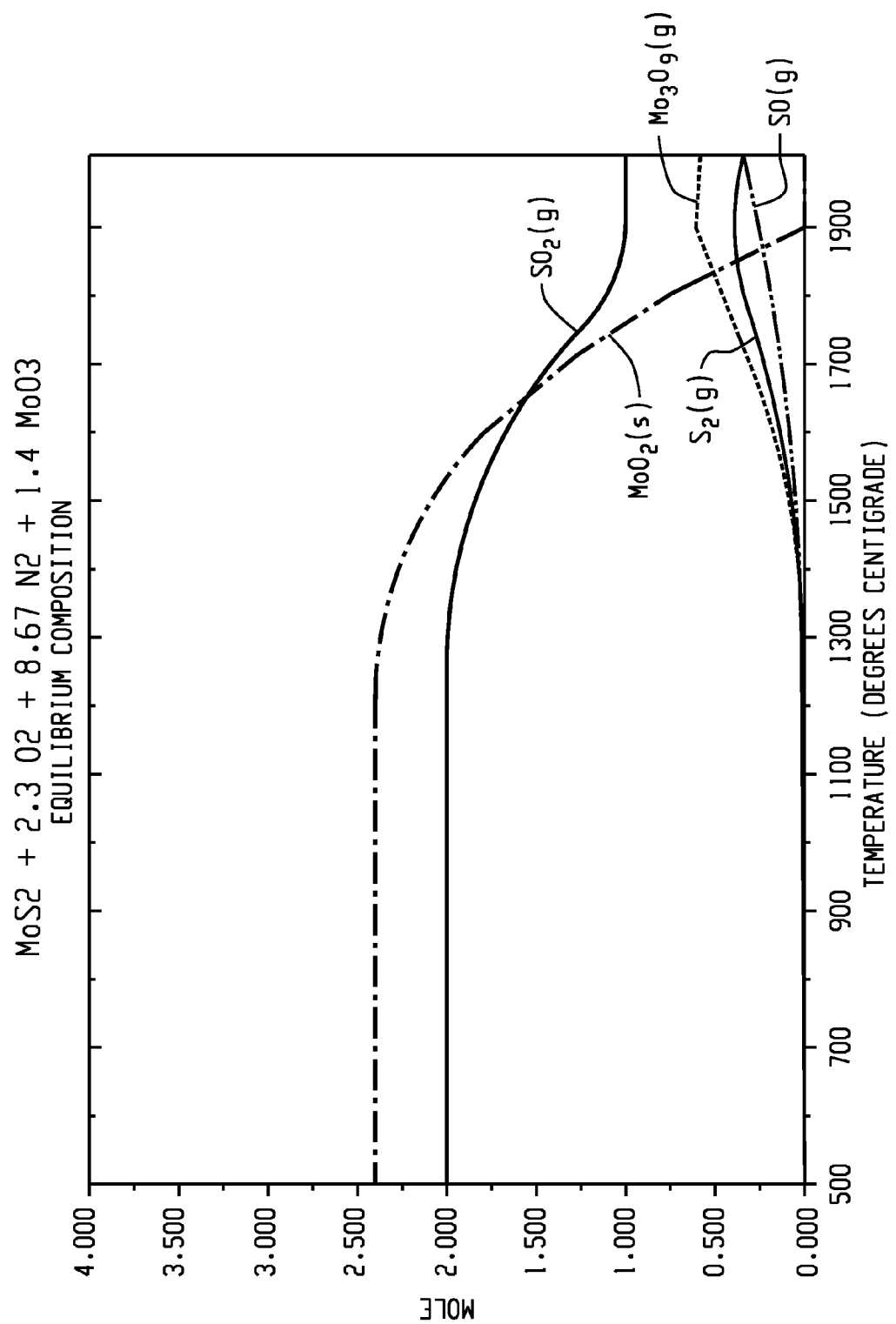
FIG. 13 shows a thermodynamic equilibrium for combined cycle oxidation of 1 mole of molybdenite; 2.3 moles $O_2$, 1.4 moles $MoO_3$.
Figure 14:
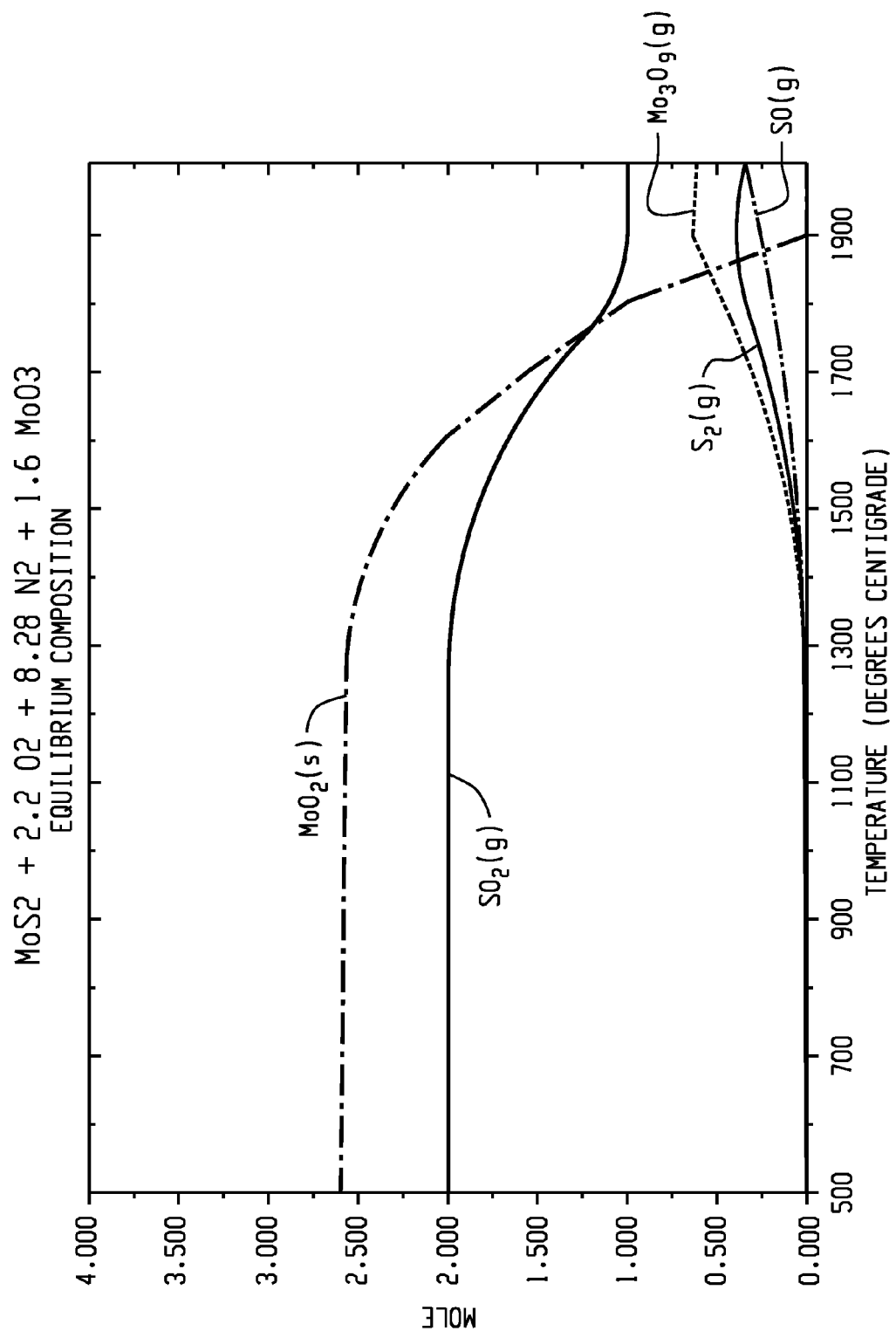
FIG. 14 shows a thermodynamic equilibrium for combined cycle oxidation of 1 mole of molybdenite; 2.2 moles $O_2$, 1.6 moles $MoO_3$.
Figure 15:
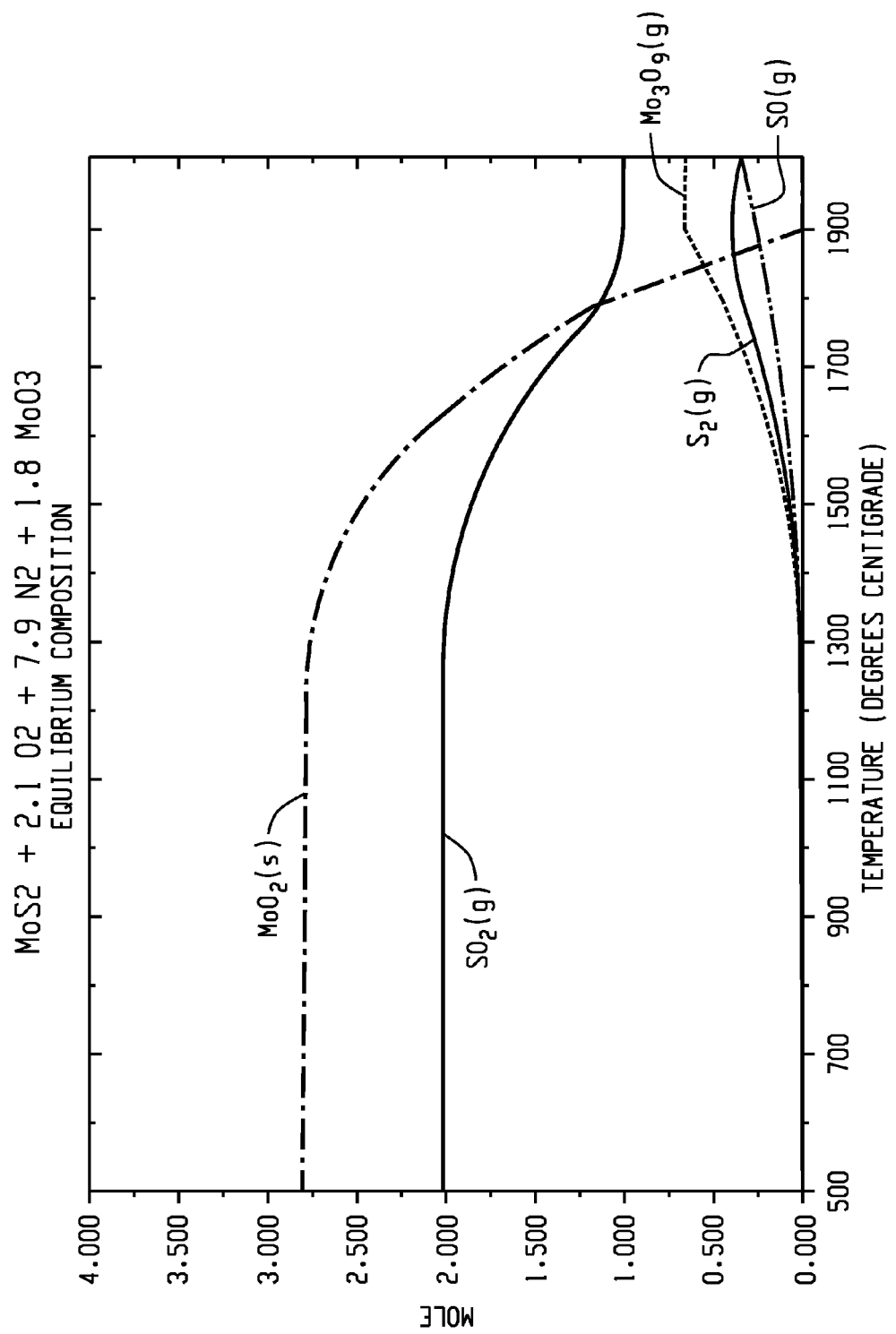
FIG. 15 shows a thermodynamic equilibrium for combined cycle oxidation of 1 mole of molybdenite; 2.1 moles $O_2$, 1.8 moles $MoO_3$.
Figure 16:
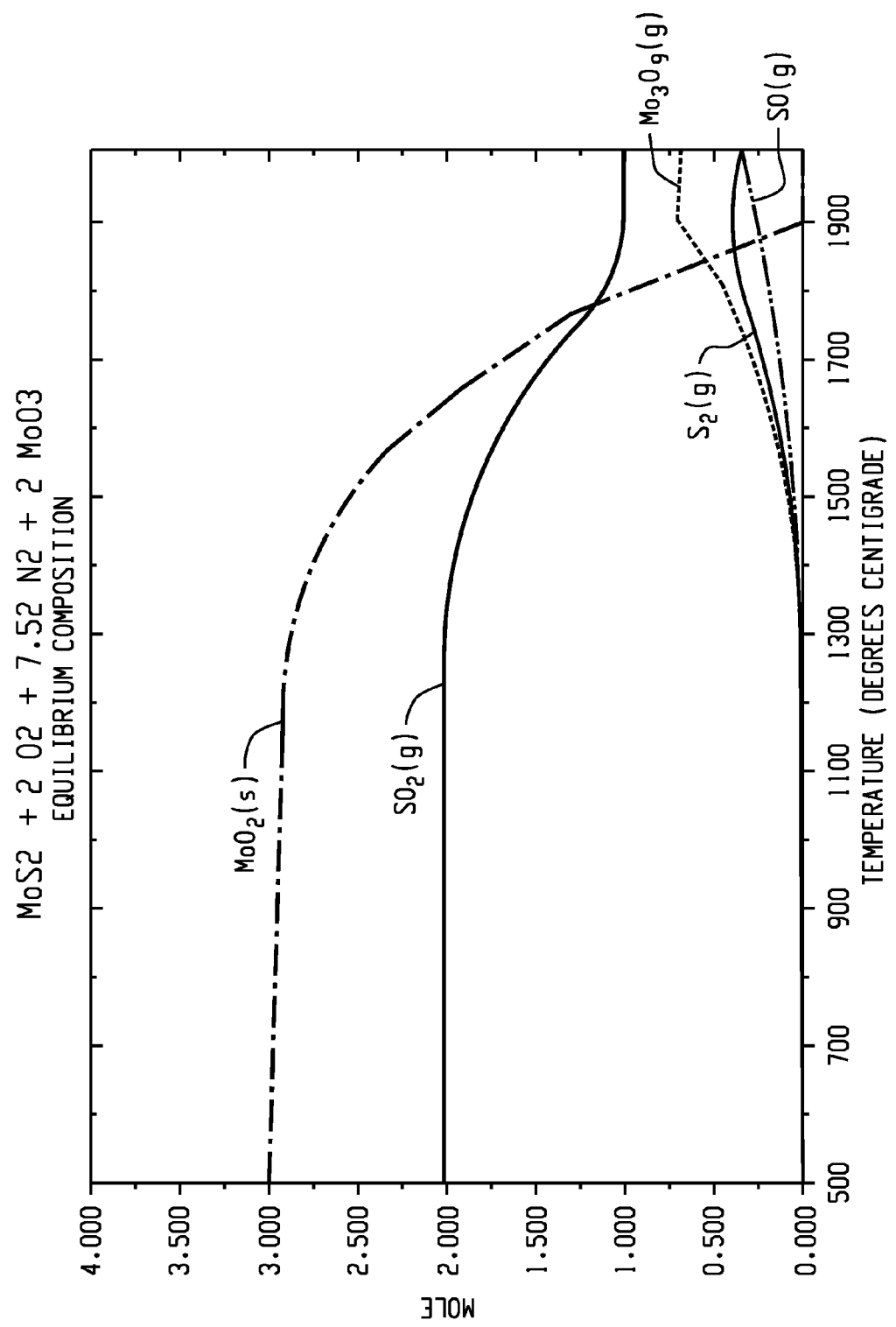
FIG. 16 shows a thermodynamic equilibrium for combined cycle oxidation of 1 mole of molybdenite; 2 moles $O_2$, 2 moles $MoO_3$.
Figure 17:
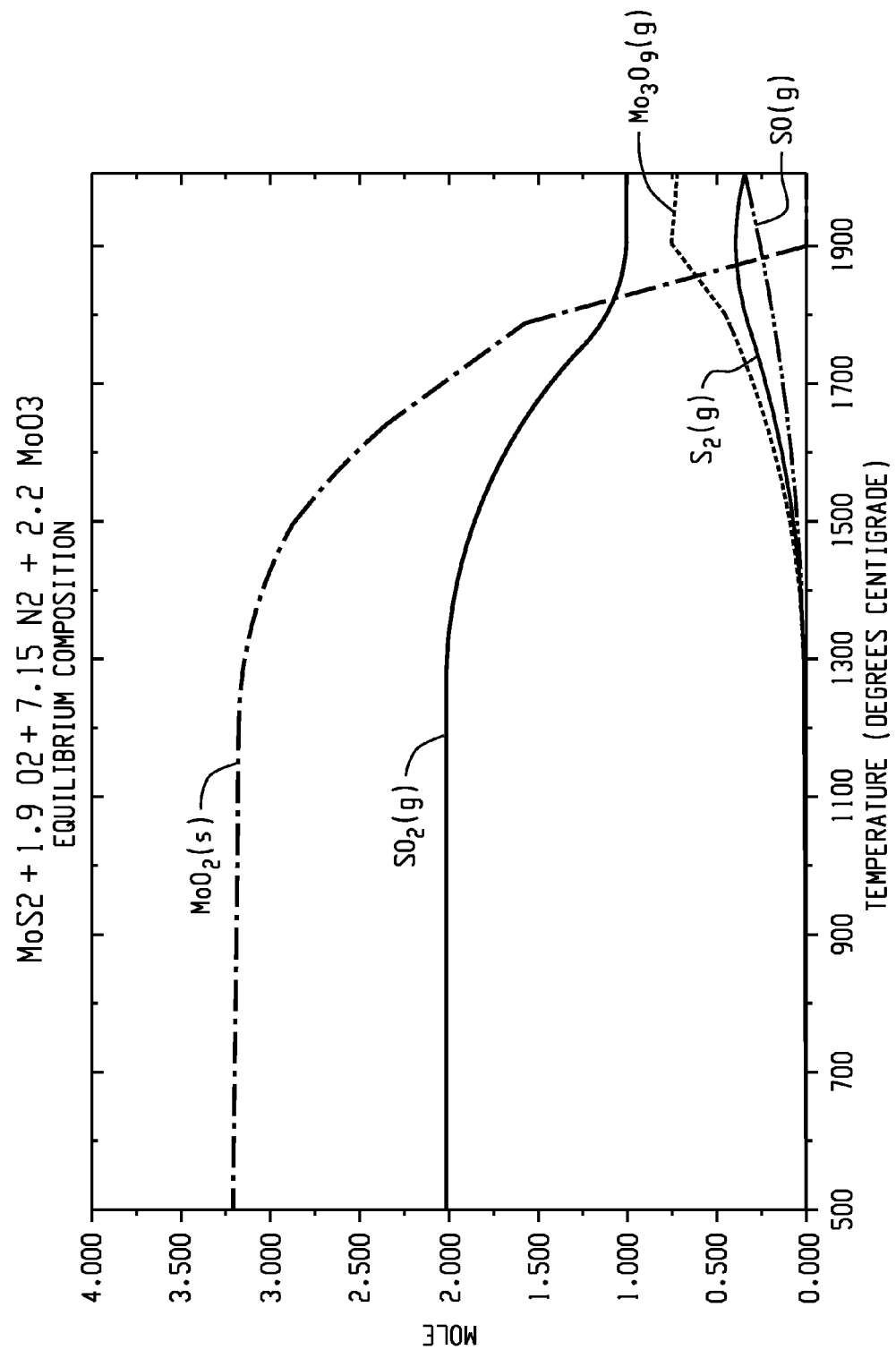
FIG. 17 shows a thermodynamic equilibrium for combined cycle oxidation of 1 mole of molybdenite; 1.9 moles $O_2$, 2.2 moles $MoO_3$.
Figure 18:
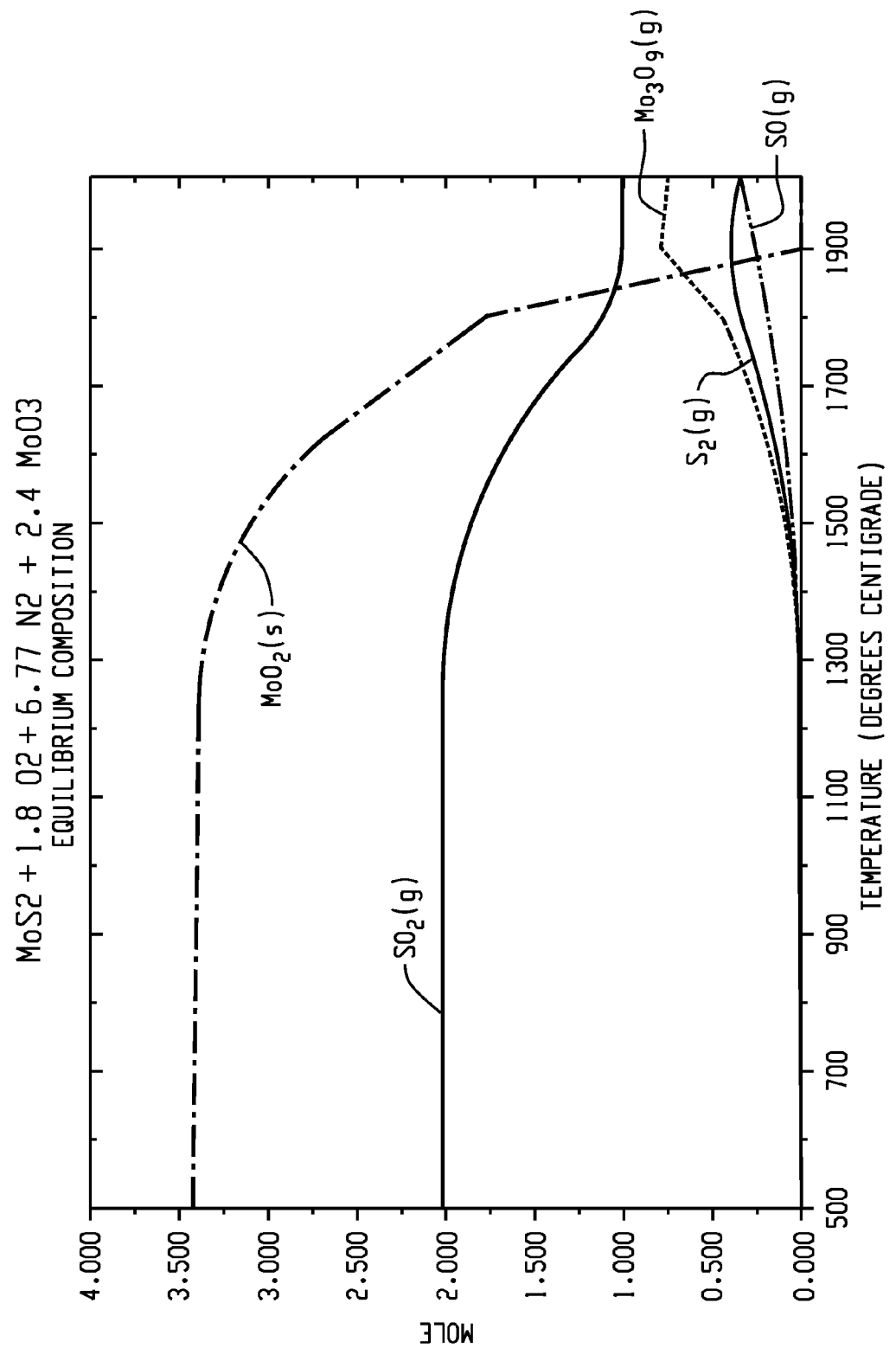
FIG. 18 shows a thermodynamic equilibrium for combined cycle oxidation of 1 mole of molybdenite; 1.8 moles $O_2$, 2.4 moles $MoO_3$.

Under conditions utilizing $O_2$ in a much lower excess (0.5%), the product distribution is less adversely affected and the selectivity to $MoO_2$ is much higher (FIG. 7). With a marginal excess of $O_2$, the $S_2$ partial pressure is slightly higher than in the case with 5% excess oxygen (FIG. 8). Additionally, greater excess of oxygen leads to higher partial pressures of $SO_2$ at low temperatures, but lower partial pressures of $SO_2$ at high temperatures (FIG. 9). From these observations it is apparent that the precise oxygen stoichiometry control to obtain the desired product distribution may not be necessary. When controlling as near to stoichiometric conditions as possible, a shortage of $O_2$ may be developed, leading to oxygen-lean conditions.

The data indicating adiabatic temperature of varying % $O_2$ stoichiometry are listed in Table 2. These data demonstrate the feasibility of direct $MoO_2$ production from $MoS_2$ using $O_2$ from the air as an oxidizer. Almost quantitative yields are achieved under proper stoichiometric and thermal control. Table 2 suggests that operating below, at, or even slightly above stoichiometry permits higher yields of $MoO_2$ with reasonable adiabatic temperatures in 85% nitrogen and 15% oxygen mixture. Additionally, $SO_2$ present in the off-gas may be captured and used for sulfuric acid production.

TABLE 2

Adiabatic Temperature of Varying % $O_2$ Stoichiometry.

| Moles of $O_2$ | % $O_2$ Stoichiometry | Adiabatic Temperature using 15 $O_2$/85% $N_2$ (° C.) | Yield w/ Air | $SO_2$ Content w/ Air, wt. % | Adiabatic Temperature using pure $O_2$ (° C.) |
|---|---|---|---|---|---|
| 2.70 | 90% | 1,228 | 99.9% | 19.9% | 2,535 |
| 2.76 | 92% | 1,236 | 99.8% | 20.3% | 2,561 |
| 2.82 | 94% | 1,244 | 99.7% | 20.4% | 2,588 |
| 2.88 | 96% | 1,251 | 99.6% | 20.6% | 2,616 |
| 2.94 | 98% | 1,258 | 99.1% | 20.8% | 2,645 |
| 3.00 | 100% | 1,262 | 96.7% | 21.0% | 2,674 |
| 3.06 | 102% | 1,253 | 87.2% | 20.8% | 2,701 |
| 3.12 | 104% | 1,241 | 75.5% | 20.4% | 2,724 |

TABLE 2-continued

Adiabatic Temperature of Varying % $O_2$ Stoichiometry.

| Moles of $O_2$ | % $O_2$ Stoichiometry | Adiabatic Temperature using 15 $O_2$/85% $N_2$ (° C.) | Yield w/ Air | $SO_2$ Content w/ Air, wt. % | Adiabatic Temperature using pure $O_2$ (° C.) |
|---|---|---|---|---|---|
| 3.18 | 106% | 1,229 | 63.7% | 20.1% | 2,742 |
| 3.24 | 108% | 1,218 | 51.8% | 19.7% | 2,757 |
| 3.30 | 110% | 1,207 | 39.8% | 19.5% | 2,768 |

Combined Cycle Oxidation of $MoS_2$ for the Production of $MoO_2$

While direct oxidation of $MoS_2$ with $O_2$ produces $MoO_2$ in one step, it is difficult to accurately control the $O_2$ stoichiometry, so the resulting $MoO_2$ may be further oxidized to produce $MoO_3$. This issue can be resolved by introducing $MoO_3$ as an oxidizing agent, combining direct oxidation and Looping Sulfide Oxidation ("LSO") simultaneously in a common cycle oxidation process (L. F. McHugh, R. Balliett, J. A. Mozolic, *The Sulfide Ore Looping Oxidation Process: An Alternative to Current Roasting and Smelting Practice*, JOM, July 2008, 84-87; L. N. Shekhter, C. G. Anderson, D. G. Gribbin, E. Cankaya-Yalcin, J. D. Lessard, L. F. McHugh, *Looping Sulfide Oxidation™ Process for Anode Copper Production,* Proceedings of the 4$^{th}$ International Symposium on High-Temperature Metallurgical Processing, to be published).

In an embodiment, the looping method for production of molybdenum(IV) oxide may include: oxidation of the molybdenite feed with a mixture comprising $MoO_3$ and oxygen in a first furnace to $MoO_2$; removing a portion of $MoO_2$ from the first furnace; transferring a second portion of $MoO_2$ from the first furnace to a second furnace; reoxidation of the transferred portion of the $MoO_2$ in the second furnace to $MoO_3$; and looping $MoO_3$ from the second furnace into the first furnace for use as an oxidizing agent.

Figure 28:
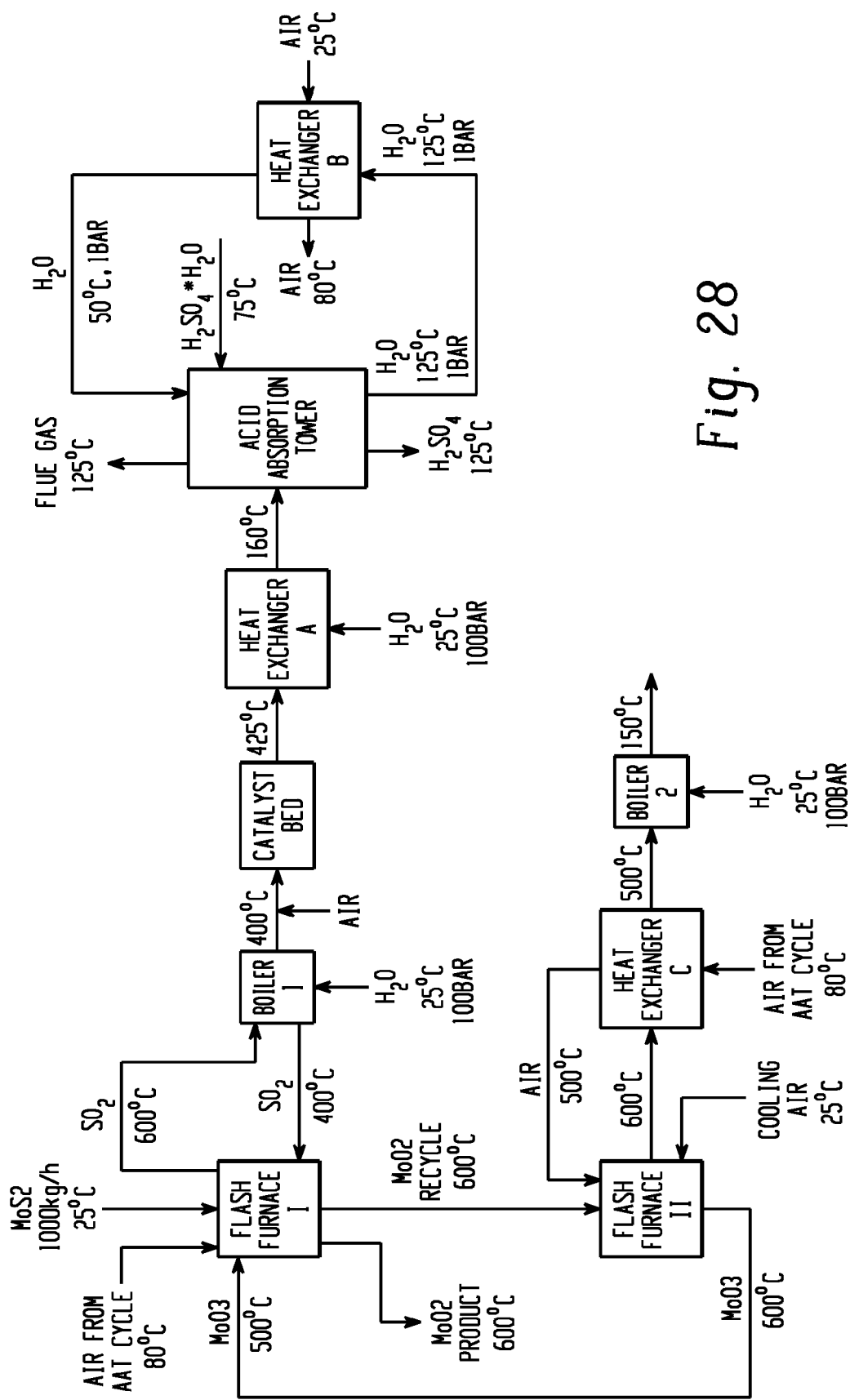
FIG. 28 is a flow sheet illustrating a $MoS_2$—$MoO_3$-Air dual flash looping process.

As shown in FIG. 28, the oxidation of the molybdenum feed takes place in a first furnace (Flash Furnace I), which may be a flash furnace, a shaft furnace, a multiple hearth furnace, a rotary kiln, or a fluid bed furnace. The residence time wherein the reactants are undergoing chemical reactions is longer in the combined cycle operation as compared to the reaction of $MoS_2$ with only $O_2$ as outlined above. In the first furnace, $MoS_2$ contained in the molybdenite feed is converted to $MoO_2$ in the presence of a $MoO_3$/preheated air mixture. The oxidation also produces a concentrated $SO_2$ off-gas stream as a by-product. As used herein, the term "concentrated $SO_2$ off gas" means the off-gas wherein the content of $SO_2$ is 20 weight % or greater, and more preferably is 40 weight % or greater. $MoO_3$ may be particulate $MoO_3$. A ratio of $MoO_3$ to oxygen in the oxidizing agent may be from about 1.0:2.5 to about 2.4:1.8, for example from about 1.5:2.0 to about 2.4:1.8 or from about 1.5:2.0 to about 2.0:1.5.

A total amount of the oxidizing agent including $MoO_3$ and oxygen may be substantially stoichiometric to an amount of the molybdenite feed. The term "substantially stoichiometric" as defined herein with regard to the looping method for production of $MoO_2$ refers to a ratio of the oxidizing agent [molecular oxygen ($O_2$) +molybdenum(VI) oxide ($MoO_3$)] to molybdenite feed ($MoS_2$) that is [6×(1−a/3)+a]:1 or about [6×(1−a/3)+a]:1 [(moles $O_2$+moles $MoO_3$):moles $MoS_2$] where a represents the moles of $O_2$ (cf. Equation 4). The stoichiometric amount is given as a percent of the stoichiometric [6×(1−a/3)+a] moles of the oxidizing agent (molecular oxygen+molybdenum (VI) oxide): 1 mole $MoS_2$ stoichiometry. A stoichiometric percent of 90% to 110% indicates a ratio of moles of the oxidizing agent to moles of $MoS_2$ of about 0.90×[6×(1−a/3)+a]:1 to about 1.10×[6×(1−a/3)+a]:1.

The substantially stoichiometric amount may be about 85% to about 115% based on the total amount of the molybdenum feed, specifically, about 90% to about 110% based on the total amount of the molybdenum feed, more specifically, about 95% to about 105% based on the total amount of the molybdenum feed.

Another benefit of the combined usage of $MoO_3$ and $O_2$ for the oxidation of the molybdenite is the reduction of the recycled (re-oxidized) amount of $MoO_2$ due to the usage of oxygen. When no oxygen is used for the oxidation of $MoS_2$, more than 85% Mo on molar basis will have to be recycled.

After the oxidation, a portion of $MoO_2$ may be removed from Flash Furnace I as a product and stored or used as needed. Another portion of $MoO_2$ may be carried to a second furnace (Flash Furnace II), which may be a flash furnace. In the second furnace, $MoO_2$ may be converted to $MoO_3$ by use of an appropriate oxidizing agent, such as oxygen. The oxygen may include pure oxygen, air, or oxygen-enriched air. The stream of the $SO_2$ off-gas may be carried to the Boiler wherein water steam is generated due to the heat transfer. To facilitate localized condensation of any excess $MoO_3$ in a given area of the reactor, a portion of the $SO_2$ off-gas may be recycled to Flash Furnace I. The rest of the $SO_2$ off-gas may be passed through Catalyst Bed and Heat Exchanger to Acid Absorption Tower for $H_2SO_4$ (sulfuric acid) production.

The regenerated $MoO_3$ (for example, condensed particulate $MoO_3$) may be looped back to the first furnace. The incoming reaction air to the furnace may be preheated to increase the efficiency in the overall system. The off-gas stream from the second flash furnace may be directed to a heat exchanger-boiler system for energy generation and reaction air preheating. Boilers downstream of the second flash furnace system and in the acid plant may be utilized to generate high pressure steam for energy production via turbines. In an embodiment, the oxidation may produce energy in an amount of about 385 to about 400 kiloWatt×hour based on 1,000 kilogram of the molybdenite feed.

As stated above, the presented looping method allows a selective production of $MoO_2$ without its further oxidation to $MoO_3$. While not wanting to be bound by a theory, it is understood that oxygen that is present in the oxidizing agent in less than a stoichiometric amount selectively converts some of the molybdenite feed into $MoO_2$. The rest of the molybdenite is oxidized with $MoO_3$ to produce $MoO_2$. Thus, use of the oxidizing agent including both oxygen and $MoO_3$, allows to obtain a nearly quantitative yield of $MoO_2$ without any noticeable quantities of $MoO_3$.

FIGS. 11 to 18 demonstrate the thermodynamics for the chemical reaction of $MoS_2$ with gaseous oxygen and $MoO_3$ produced using FactSage software that model the thermodynamic equilibria of various species under given thermodynamic states. As was shown by Equation 2, the stoichiometric amount of oxygen to oxidize 1 mole of $MoS_2$ to $MoO_2$ is 3 mole. As follows from Equation 3, the stoichiometric amount of $MoO_3$ to oxidize 1 mole of $MoS_2$ to $MoO_2$ is 6 mole.

$$MoS_2 + 6\ MoO_3 \rightarrow 7\ MoO_2 + 2\ SO_2 \qquad \text{Equation 3}$$

In order to investigate the relationship between the $MoO_3$ and $O_2$ as oxidizing agents in combined cycle oxidation, the ratio of $MoO_3$ to $O_2$ was varied (Table 3). The reaction stoichiometry for these experiments can be represented by Equation 4, wherein the ratio represents the ratio between $MoO_3$ and $O_2$.

$$MoS_2 + aMoO_3 + (3 - a/2)O_2 \rightarrow (1 + a)MoO_2 + 2SO_2 \quad \text{Equation 4}$$

Under each unique oxidation condition, the equilibrium behavior was noted with attention paid to determining the optimal operating conditions for $MoO_2$ production.

TABLE 3

Ratios of Oxidizing Agents in the Combined Cycle Production of $MoO_2$ per mole of $MoS_2$ (The equilibrium product distributions of each case are given in the indicated figures).

| | | | | | | | | |
|---|---|---|---|---|---|---|---|---|
| Moles of $MoO_3$ | 1.0 | 1.2 | 1.4 | 1.6 | 1.8 | 2.0 | 2.2 | 2.4 |
| Moles of $O_2$ | 2.5 | 2.4 | 2.3 | 2.2 | 2.1 | 2.0 | 1.9 | 1.8 |
| Ratio | 1:2.5 | 1:2.0 | 1:1.64 | 1:1.38 | 1:1.17 | 1:1 | 1:0.86 | 1:0.75 |
| Figure | 11 | 12 | 13 | 14 | 15 | 16 | 17 | 18 |

FIGS. 11 to 18 demonstrate the relationship between the $MoO_3$: $O_2$ ratio in the oxidizing composition and the temperature dependence of the production distribution (Table 4). In general, the higher the ratio between the $MoO_3$ and the $O_2$ (i.e. the higher the amount of $MoO_3$ relative to $O_2$), the higher the temperature at which the $MoO_2$ begins oxidation to gaseous $MoO_3$ ($Mo_3O_9$). This trend agrees with the thermochemical nature of the competing oxidation reactions between $MoS_2$ and $O_2$ and $MoO_3$; oxidation with $MoO_3$ is less exothermic than oxidation with $O_2$, so with higher $MoO_3$ content, the overall equilibrium composition is less affected by elevated temperatures. Lower yields of $MoO_2$ were observed with a concomitant decrease in the partial pressure of $SO_2$ and increase in the partial pressure of $S_2$ suggesting that $SO_2$ acts as the oxidizer towards $MoO_2$ during the oxidation of the dioxide to the trioxide. In effect, $MoO_2$ and $SO_2$ are not chemically inert towards each other at high temperatures.

has been determined that the temperature range of this oxidation can be controlled by the ratio of oxidants. These results make it possible the development of a continuous process capable of converting molybdenite feed to the desirable $MoO_2$. To improve its energy footprint and enable continuous operation, $MoO_3$ should desirably be produced continuously within the process such that it can be used to oxidize the feed. As stated above, such an operation can be achieved by further oxidation of a portion of the $MoO_2$ produced during the combined cycle oxidation with $O_2$ and looping this $MoO_3$ back to the feed to act as an oxidant (Equation 5).

$$MoO_2 + \tfrac{1}{2} O_2 \rightarrow MoO_3 \quad \Delta H° = -87.1 \text{ kWh} \quad \text{Equation 5}$$

For the combined cycle oxidation of the molybdenite feed in the presence of a mixture of $MoO_3$ and $O_2$, a flash reactor can be used to create a high temperature zone in which the conversion of the $MoS_2$ to $MoO_2$ takes place. Since the residence time in this high temperature zone will be short, the flash temperature should exceed the boiling point of the looped $MoO_3$ to ensure that it is fully vaporized, mitigating mass transfer limitations when it reacts with the $MoS_2$. As previously discussed, the upper temperature of the flash zone is limited by the temperature at which the yield of $MoO_2$ decreases due to in situ gaseous $Mo_3O_9$ formation. Additionally, the off-gas produced in the combined cycle oxidation flash reactor is rich in $SO_2$ (Table 4), and provides another avenue for significant energy capture in a downstream sulfuric acid plant.

The $MoO_2$ product that is not looped for reoxidation can be collected as a final product. The $MoO_2$ to be recycled enters a second flash furnace at 600° C. where it is reacted at over 1,100° C. (due to the exothermic nature of the oxidation

TABLE 4

Relationship between Potential Process Performance and $O_2/MoO_3$ Ratio.

| | | | | | | | | |
|---|---|---|---|---|---|---|---|---|
| Moles $O_2$ (in air) | 2.5 | 2.4 | 2.3 | 2.2 | 2.1 | 2.0 | 1.9 | 1.8 |
| Moles $MoO_3$ | 1.0 | 1.2 | 1.4 | 1.6 | 1.2 | 2.0 | 2.2 | 2.4 |
| Adiabatic Temperature (° C.) | 1404 | 1368 | 1331 | 1293 | 1253 | 1214 | 1172 | 1132 |
| Yield (at Adiabatic Temp) | 94.6% | 95.6% | 97.9% | 98.7% | 99.3% | 99.6% | 99.8% | 99.9% |
| $SO_2$ Content, wt. % (at Adiabatic Temp) | 31.7% | 33.0% | 34.2% | 35.4% | 36.5% | 37.7% | 38.9% | 40.3% |
| Optimal T Range (° C.) [>95% Recovery] | 1,100-1,350 | 1,100-1,375 | 1,100-1,375 | 1,100-1,400 | 1,100-1,400 | 1,100-1,400 | 1,100-1,425 | 1,100-1,425 |

Figure 19:
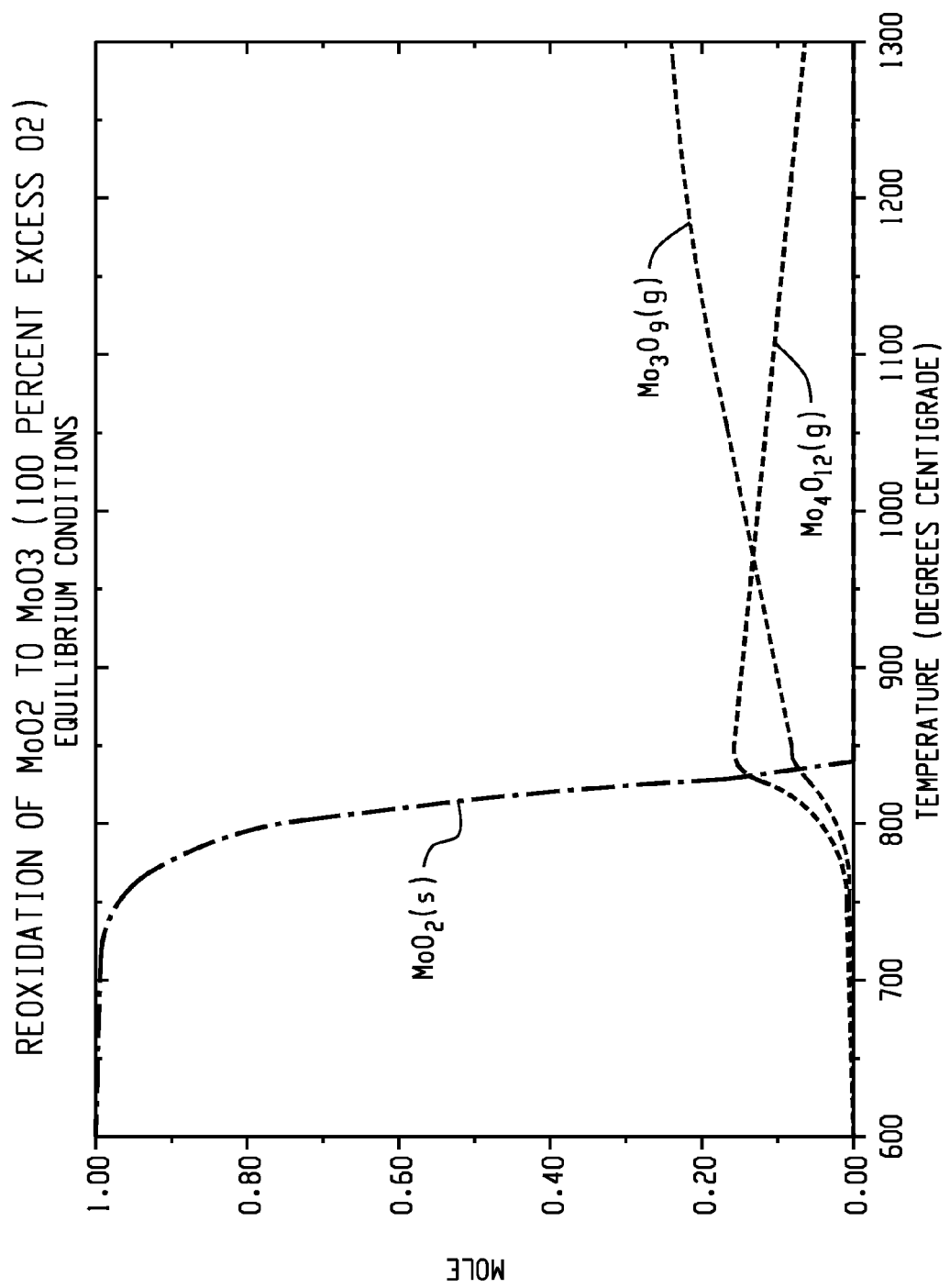
FIG. 19 illustrates a reoxidation of 1 mole of $MoO_2$ in excess $O_2$.
Figure 20:
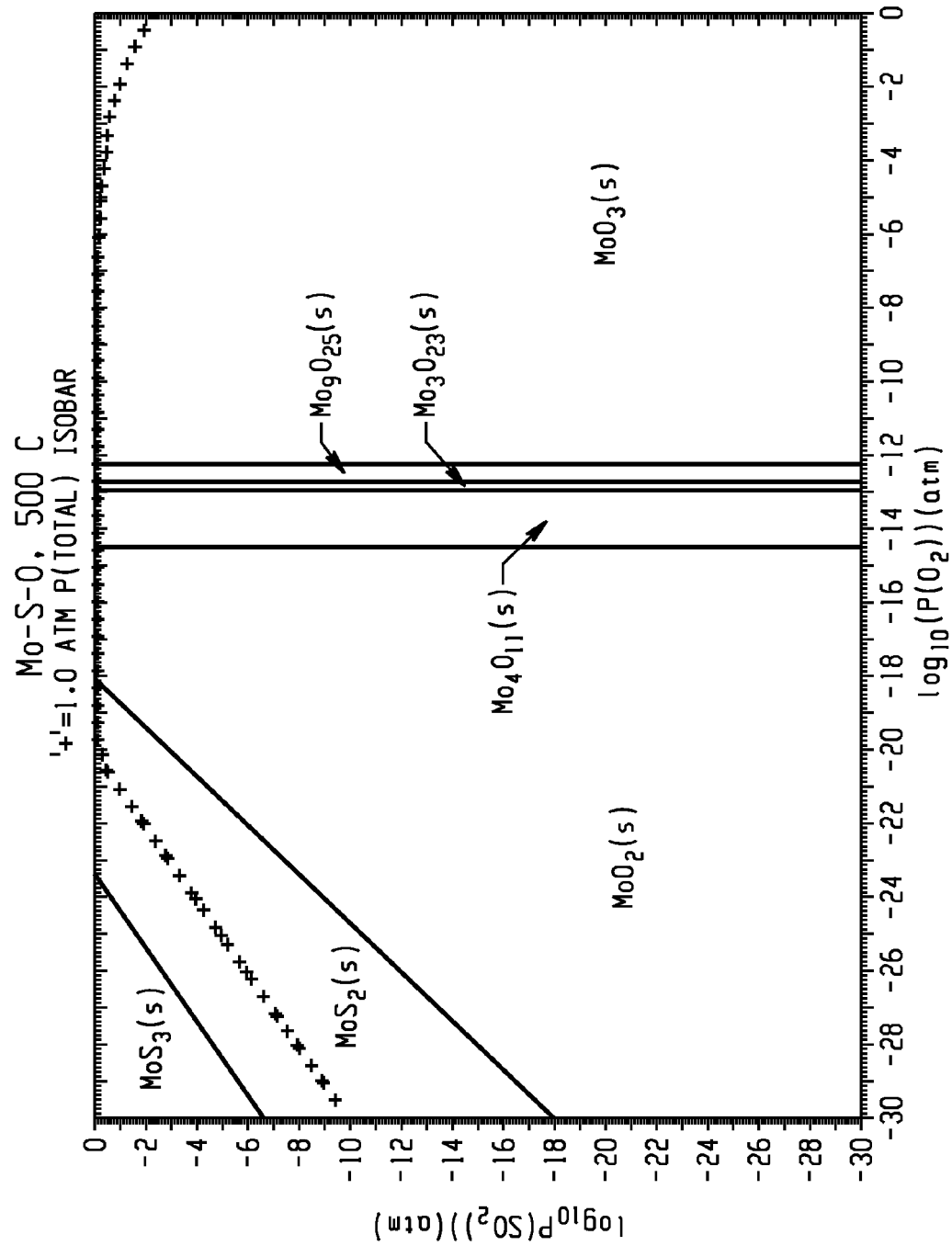
FIG. 20 shows a predominance diagram for the thermodynamic equilibrium in the Mo—S—O system at 500° C.
Figure 21:
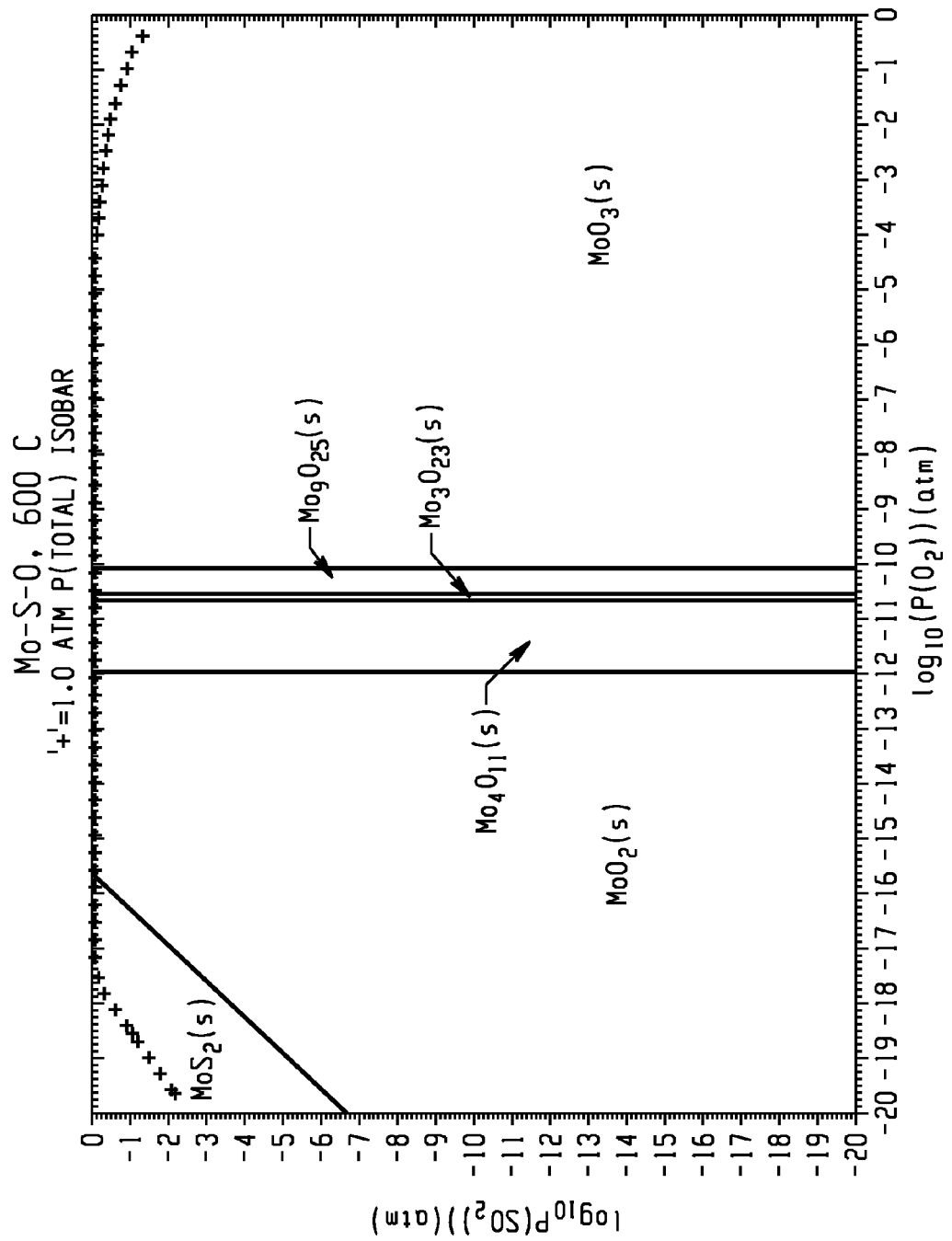
FIG. 21 shows a predominance diagram for the thermodynamic equilibrium in the Mo—S—O system at 600° C.
Figure 22:
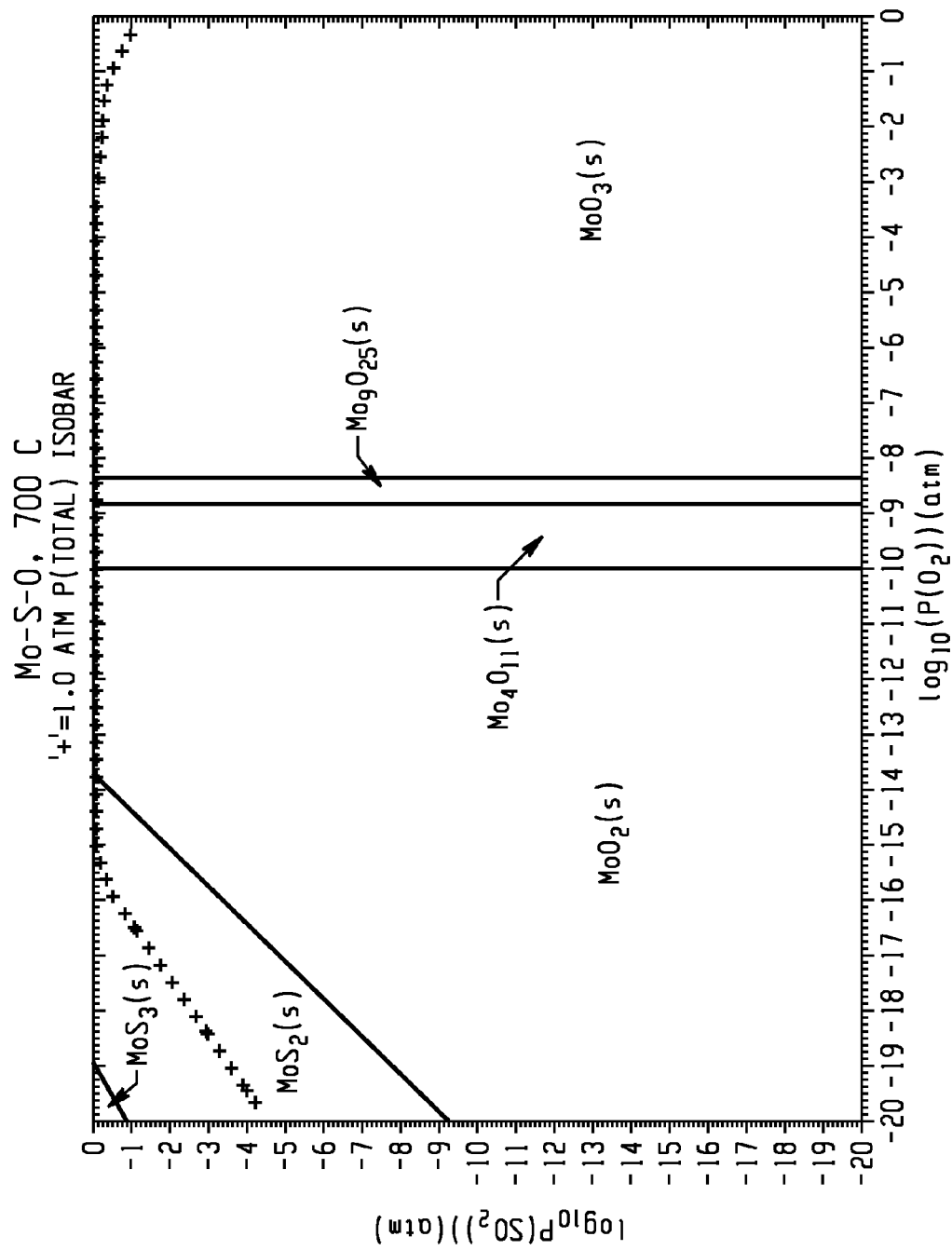
FIG. 22 shows a predominance diagram for the thermodynamic equilibrium in the Mo—S—O system at 700° C.
Figure 23:
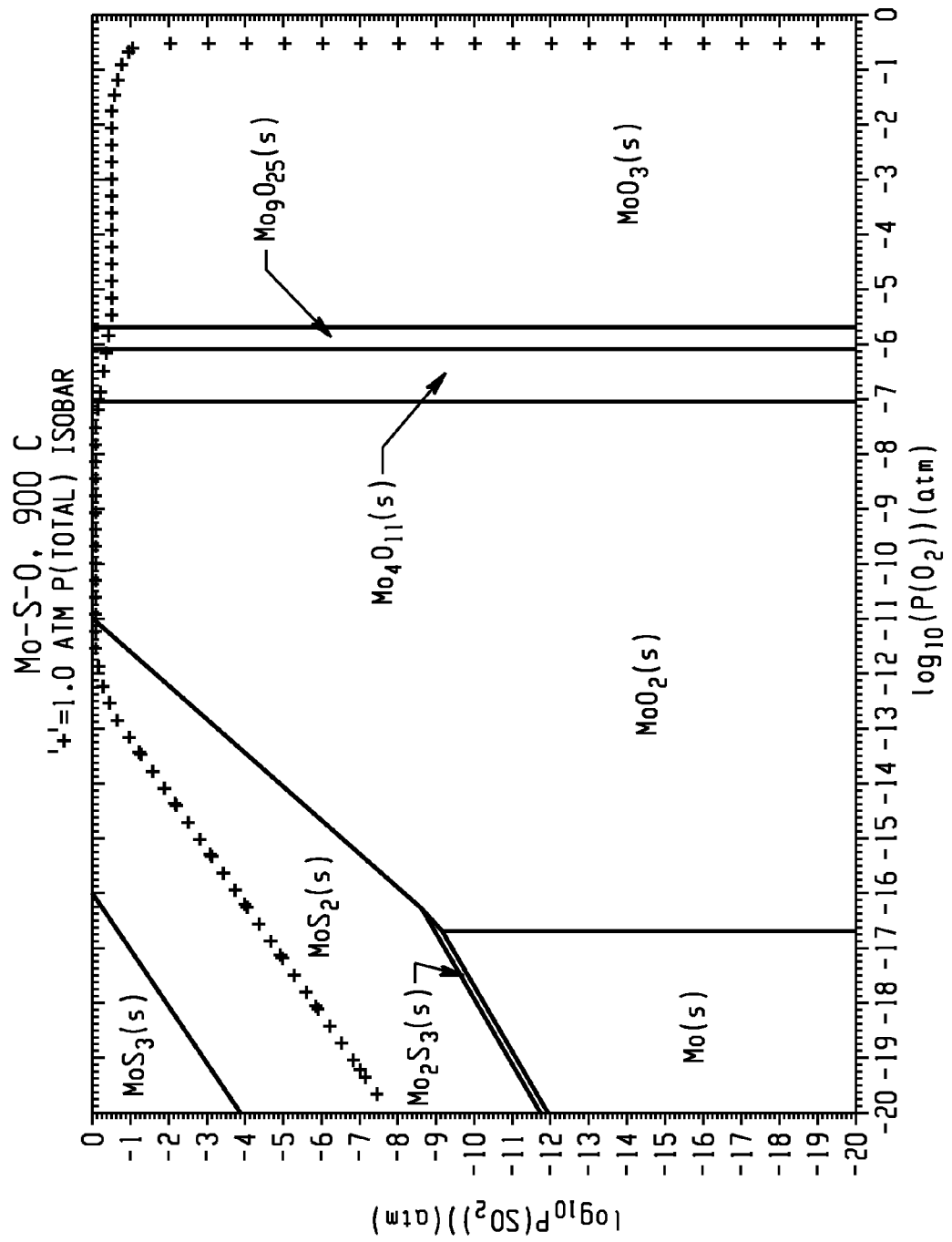
FIG. 23 shows a predominance diagram for the thermodynamic equilibrium in the Mo—S—O system at 900° C.
Figure 24:
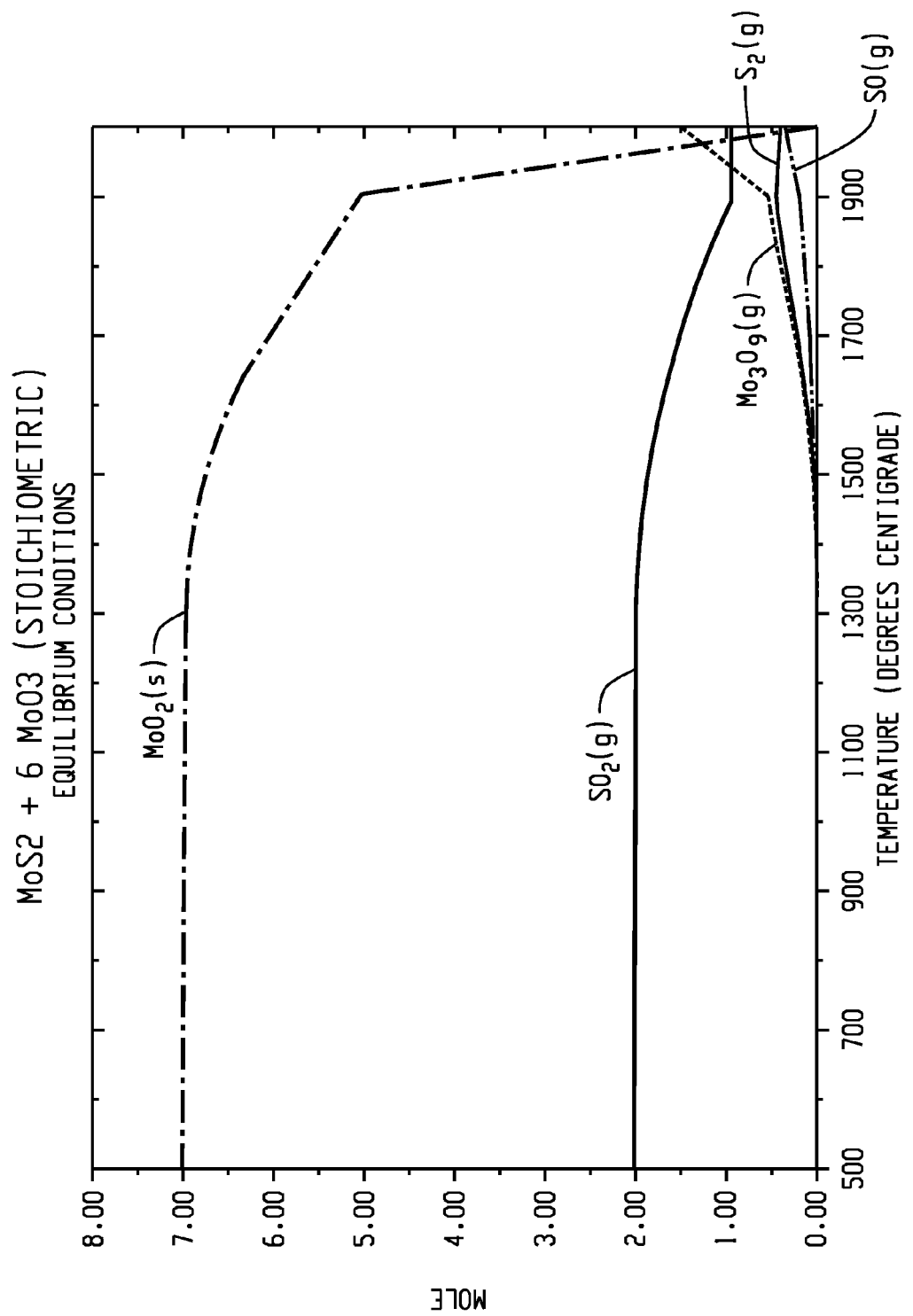
FIG. 24 shows a thermodynamic equilibrium composition for the oxidation of 1 mole of $MoS_2$ to $MoO_2$ using a stoichiometric amount of $MoO_3$.

FIGS. 11 to 18 and Table 4 suggest that the combined cycle oxidation of $MoS_2$ with $MoO_3$ and $O_2$ is an effective means to produce $MoO_2$ with nearly 100% selectivity. Furthermore, it reaction, Equation 5) in the presence of oxygen in the high temperature zone of the furnace. These conditions lead to the complete oxidation of $MoO_2$ to $MoO_3$ (FIG. 19). This gaseous $MoO_3$ is then cooled in a condensing zone with ambient temperature air to produce $MoO_3$ in a powder form at 600° C. to be looped to the first flash furnace.

This entire process in the second flash furnace operates free of sulfur (in either the gas or solid phase), so that condensation of sulfuric acid (due to $SO_2$ or $SO_3$) in downstream processes is eliminated. As such, energy capture from the $MoO_2$ reoxidation with $O_2$ to $MoO_3$ for looping is maximal. This energy capture is realized as preheating reaction air for this second flash furnace and as high pressure steam generation.

Production of Molybdenum Suboxides During Molybdenite Conversion to Molybdenum Dioxide FIGS. 20-24 demonstrate the thermodynamic feasibility of producing suboxides of molybdenum from molybdenite under sulfur-oxygen atmospheres. FIGS. 20-24 are predominance diagrams produced using FactSage software that models the thermodynamic equilibria of various species under given thermodynamic states. From a predom diagram it is possible to define the species that will be present when thermodynamic equilibrium is reached at a given temperature and pressure. FIGS. 20-24 describe such equilibria for the Mo—$SO_2$—$O_2$ system in the temperature range of 500-1,000° C.

From FIGS. 20-23 it is apparent that the suboxides of molybdenum ($Mo_4O_{11}$, $Mo_8O_{23}$, $Mo_9O_{26}$) are formed under specific $SO_2$ and $O_2$ partial pressures over distinct temperature ranges. FIG. 1 demonstrates that by temperatures of ca. 1,000° C., no intermediate suboxides are formed with only $MoO_2$ in the solid state and $Mo_4O_{12}$ (gaseous $MoO_3$) being stable. The partial pressure of $O_2$ is the key to determining the species of suboxide formed, with the oxygen partial pressure range of each stable species narrowing with increasing temperature (cf. FIGS. 20-23).

It must be noted that the production of intermediate molybdenum suboxides is a process that takes place at low temperatures (relative to the production of $MoO_2$ described in the LSO process). During this low temperature process, direct production of the suboxides from the molybdenite concentrate is impossible (FIGS. 20-23). Instead, the molybdenum must first pass through a $MoO_2$ state before further oxidation to one of the several suboxide states. This conversion can be accomplished by first producing $MoO_2$ from the $MoS_2$ concentrate and then adding a very slight excess of $O_2$ to create the necessary oxygen partial pressure to bring about the conversion to a molybdenum suboxide. Again, while the LSO process is capable of producing $MoO_2$ even in slight excesses of $O_2$, this process differs in that suboxides are produced when a slight excesses of $O_2$ is present; this difference is due to the respective temperature ranges of the two processes.

EXAMPLES

Oxidation of Molybdenite with Metal Oxides

To determine the extent to which sulfide minerals are oxidized with metal oxides, a testing was performed. The amount of desulfurization achieved in mixing the sulfide and metal oxide was determined. In one test, $MoS_2$ was mixed with $MoO_3$ to achieve 98.5% desulfurization producing $MoO_2$ as a primary product. These results correlate well with the performed calculations, as can be seen below in FIG. 24 (L. F. McHugh, R. Balliett, J. A. Mozolic, *The Sulfide Ore Looping Oxidation Process: An Alternative to Current Roasting and Smelting Practice*, JOM, July 2008, 84-87).

Figure 26:
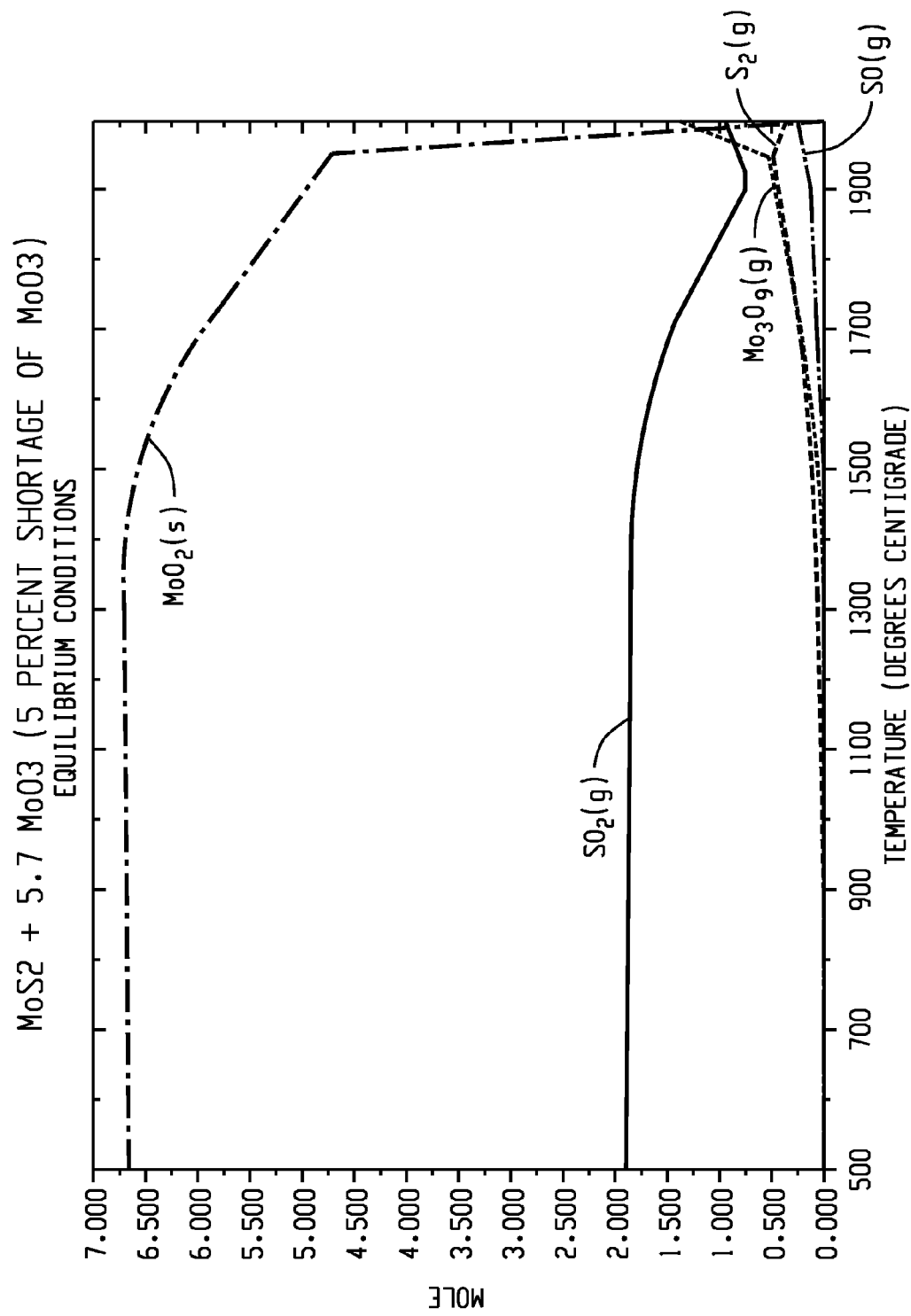
FIG. 26 shows a thermodynamic equilibrium composition for the oxidation of 1 mole of $MoS_2$ at a 5% shortage of $MoO_3$.
Figure 27:
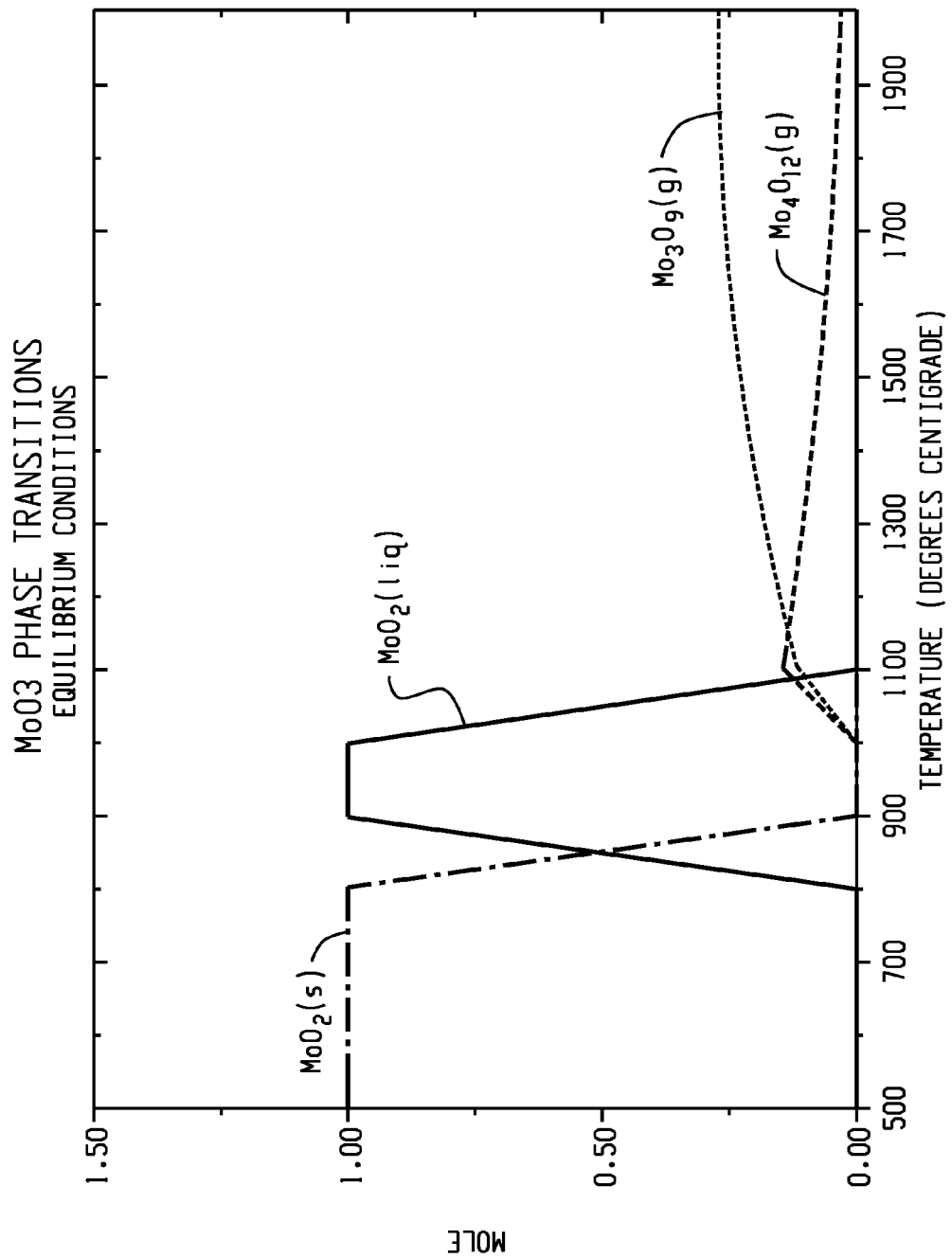
FIG. 27 displays speciation and phase transition of $MoO_3$ as a function of temperature.

Since feeding stoichiometric amounts of two powders is easier than feeding stoichiometric amounts of a powder and a gas, the effect of running in both excess and lean conditions has been investigated (FIGS. 26 and 27).

Figure 25:
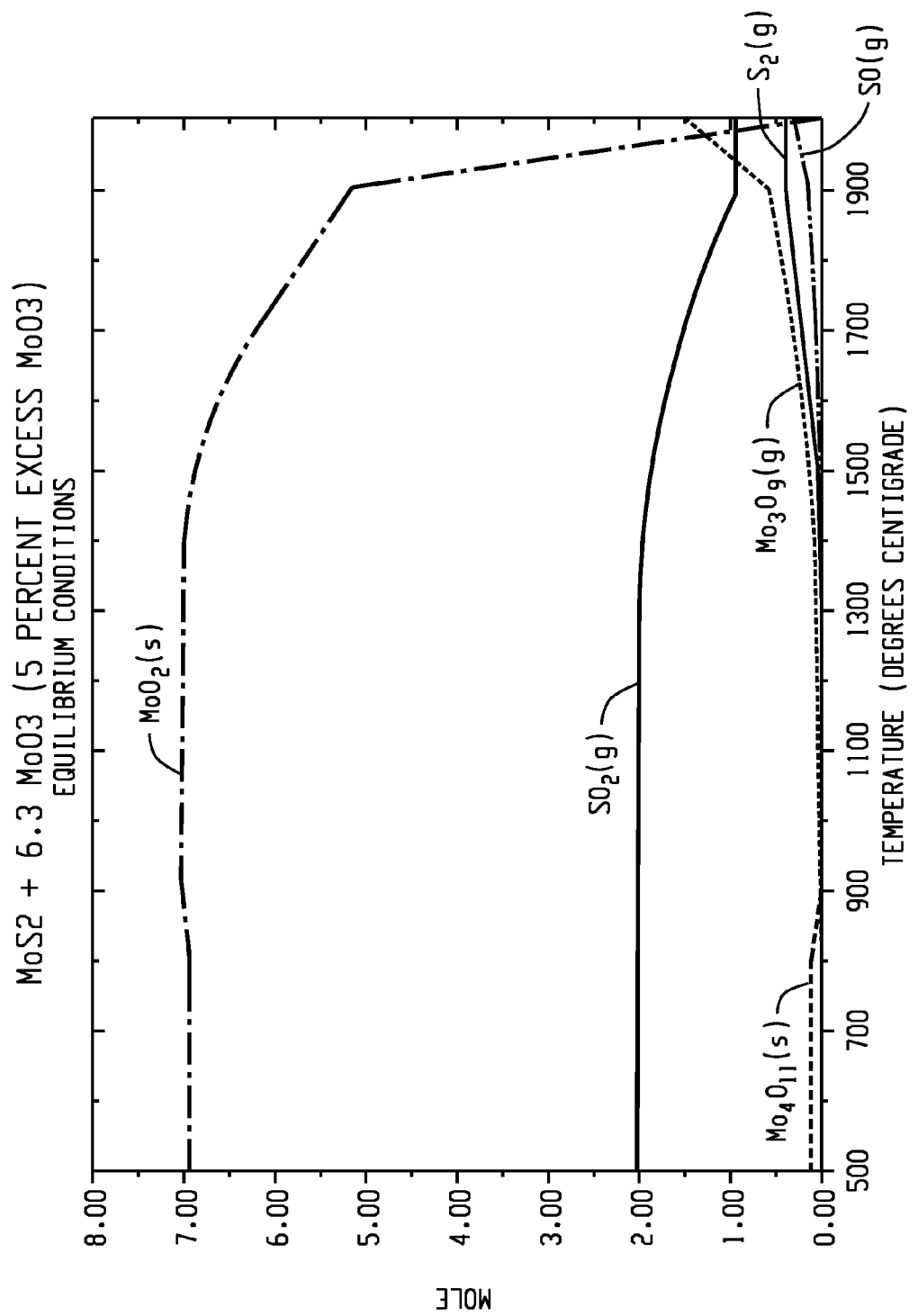
FIG. 25 shows a thermodynamic equilibrium composition for the oxidation of 1 mole of $MoS_2$ in 5% excess $MoO_3$.

With 5% excess $MoO_3$ (FIG. 25), formation of an intermediate solid molybdenum oxide between 500° C. to 900° C. ($Mo_4O_{11}$) was observed. In contrast, at a temperature above 900° C. and until approximately 1,400° C., a high yield of $MoO_2$ is observed. Thus, running a reaction with a small excess of $MoO_3$ still allows complete desulfurization of the molybdenum feed and full conversion of $MoS_2$ to the desired product ($MoO_2$).

When operating at a 5% shortage of $MoO_3$ (FIG. 26), full conversion of $MoS_2$ is still achieved at a temperature in the range of 1,100° C. to 1,400° C. with high selectivity to $MoO_2$. This situation is very similar to that wherein the oxidation of $MoS_2$ is carried out under lean $O_2$ conditions.

While both of the foregoing reactions yield $MoO_2$ as the product, they differ substantially from an energy generation perspective (Table 5). The reaction of $MoS_2$ with $O_2$ is extremely exothermic, allowing for high energy capture potential. In contrast, the reaction of $MoS_2$ with $MoO_3$ is endothermic until approximately 800° C. At or above this temperature, $MoO_3$ exists as either a molten liquid or a gas and its reaction with $MoS_2$ is exothermic. Accordingly, it is more desirable to operate at a higher temperature, wherein the kinetics are faster, provided the particles of the reagents are small enough in order to mitigate diffusion limitations. Thus, $\Delta H_{rxn}$ is shown for both 25° C. and 1,200° C. in Table 5.

TABLE 5

Comparison of the Heats of Reaction during the Oxidation of Molybdenite with Different Oxidants.

| | | |
|---|---|---|
| $MoS_2 + O_2$ | $MoS_2 + 3 O_2 = MoO_2 + 2 SO_2$ | $\Delta H° = -251.0$ Wh |
| | $MoS_2 + 3 O_2 = MoO_2 + 2 SO_2$ | $\Delta H_{1200° C.} = -249.0$ Wh |
| $MoS_2 + MoO_3$ | $MoS_2 + 6 MoO_3 = 7 MoO_2 + 2 SO_2$ | $\Delta H° = +10.2$ Wh |
| | $MoS_2 + 6 MoO_3 = 7 MoO_2 + 2 SO_2$ | $\Delta H_{1200° C.} = -89.8$ Wh |

Oxidation of $MoS_2$ with $O_2$ has a greater potential for energy capture than the oxidation with $MoO_3$. However, reacting $MoS_2$ with $MoO_3$ is a practically desirable reaction, because having a small excess or shortage of $MoO_3$ does not detrimentally impact the yield of $MoO_2$. Thus it was determined that oxidation by a combination of $MoO_3$ and $O_2$ could be beneficial for the production of $MoO_2$. The first step in doing so was to determine what the adiabatic temperatures would be for various ratios of $MoO_3$ to $O_2$ (Table 4). Calculations were performed using the FactSage software (Bale, C. W., et al. FactSage™ 6.3.1, Thermfact and GTT-Technologies, CRCT, Montreal, Canada (2012)).

Table 4 demonstrates that for this range of reagent ratios, the adiabatic temperature is between 1,111° C. to 1,381° C. In this temperature range, $MoO_3$ is completely vaporized (FIG. 27). Since $MoO_3$ is present in a vapor, mixing of the $MoS_2$ with $MoO_3$ is much simpler, minimizing the mass transfer limitations to the reaction.

Due to a decrease in yield of $MoO_2$ with an increase in temperature and to ensure a stable adiabatic temperature, a reagent ratio of 2.2 moles $MoO_3$:1.9 moles $O_2$ was chosen for sample calculations. This ratio allows operation at high enough temperature to avoid $MoO_3$ condensation on the walls of the furnace, but does not affect yield of $MoO_2$. It should be noted that this reaction proceeds with all stoichiometric combinations of $MoO_3$ and $O_2$ but sample calculations were only performed for this particular ratio.

As can be seen in Table 6, this combination of oxidizing agents allows for both low and high temperature exothermic production of $MoO_2$.

TABLE 6

Oxidation of 1 mole $MoS_2$ with 2.2 moles $MoO_3$ and 1.9 moles $O_2$ at Standard Conditions and 1,200° C.

| $MoO_3/O_2$ Mix | $MoS_2$ + 2.2 $MoO_3$ + 1.9 $O_2$ = 3.2 $MoO_2$ + 2 $SO_2$ | $\Delta H°$ = −155.2 Wh |
|---|---|---|
| | $MoS_2$ + 2.2 $MoO_3$ + 1.9 $O_2$ = 3.2 $MoO_2$ + 2 $SO_2$ | $\Delta H_{1200° C.}$ = −190.6 Wh |

Heat and Material Balance Calculations for Configuration Including Flash Furnace The heat and material balances for each processing step in FIG. 28 were calculated using HSC Chemistry 7.1 software and its SIM 7.1 module (Roine, A., et al. HSC 7.11, Outotec, Pori, Finland (2011)). The heat and material balances were calculated for a 37/63% mixture of $MoO_3/O_2$ with a starting amount of 1,000 kg of $MoS_2$ to show energy generated in this example. The results are shown in Tables 7 to 17.

1. Oxidation of Molybdenite

A process which takes place in Flash Furnace I may be represented by Equation 6:

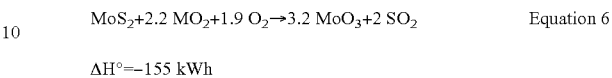

$$MoS_2 + 2.2\, MO_2 + 1.9\, O_2 \rightarrow 3.2\, MoO_3 + 2\, SO_2 \qquad \text{Equation 6}$$

$\Delta H° = -155$ kWh

The ratio of $MoO_3:O_2$ 37/63% was used in the furnace. The air was introduced at 80° C. which was preheated in the heat exchanger of the acid absorption tower. The adiabatic temperature was 1,170° C. and the products were cooled down to 600° C. with the $SO_2$ recycle.

TABLE 7

Heat and Material Balance on Flash Furnace I.

| INPUT SPECIES (1) Formula | Temper. ° C. | Amount kmol | Amount kg | Amount Nm³ | Latent H kWh | Total H kWh |
|---|---|---|---|---|---|---|
| Sulfide Feed | 25.000 | 6.248 | 1000.000 | 0.198 | 0.00 | −482.46 |
| $MoS_2$ | 25.000 | 6.248 | 1000.000 | 0.198 | 0.00 | −482.46 |
| Oxide Feed | 500.000 | 13.745 | 1978.408 | 0.422 | 161.04 | −2681.85 |
| $MoO_3$ | 500.000 | 13.745 | 1978.408 | 0.422 | 161.04 | −2681.85 |
| Air Feed | 83.142 | 56.526 | 1630.806 | 1266.961 | 26.68 | 26.68 |
| $N_2(g)$ | 83.142 | 44.656 | 1250.963 | 1000.899 | 21.02 | 21.02 |
| $O_2(g)$ | 83.142 | 11.871 | 379.843 | 266.062 | 5.66 | 5.66 |
| OUTPUT SPECIES (1) Formula | Temper. ° C. | Amount kmol | Amount kg | Amount Nm³ | Latent H kWh | Total H kWh |
| $MoO_2$ | 1170.934 | 19.993 | 2557.817 | 0.395 | 496.54 | −2768.35 |
| $MoO_2$ | 1170.934 | 19.993 | 2557.817 | 0.395 | 496.54 | −2768.35 |
| Flue Gas | 1170.934 | 57.151 | 2051.398 | 1280.964 | 660.94 | −369.28 |
| $N_2(g)$ | 1170.934 | 44.656 | 1250.963 | 1000.899 | 452.28 | 452.28 |
| $SO_2(g)$ | 1170.934 | 12.495 | 800.435 | 280.065 | 208.66 | −821.56 |
| | | kmol | Kg | Nm³ | kWh | kWh |
| BALANCE: | | 0.625 | 0.000 | 13.779 | 969.75 | 0.00 |

TABLE 8

Heat and Material Balance on $MoO_2$ Product and Recycle Streams.

| INPUT SPECIES (2) Formula | Temper. ° C. | Amount kmol | Amount kg | Amount Nm³ | Latent H kWh | Total H kWh |
|---|---|---|---|---|---|---|
| $MoO_2$ Product (Out) | 1170.934 | 6.248 | 799.318 | 0.124 | 155.17 | −865.11 |
| $MoO_2$ | 1170.934 | 6.248 | 799.318 | 0.124 | 155.17 | −865.11 |
| $MoO_2$ Recycle | 1170.934 | 13.745 | 1758.499 | 0.272 | 341.37 | −1903.24 |
| $MoO_2$ | 1170.934 | 13.745 | 1758.499 | 0.272 | 341.37 | −1903.24 |
| Flue Gas | 1170.934 | 57.151 | 2051.398 | 1280.964 | 660.94 | −369.28 |
| $N_2(g)$ | 1170.934 | 44.656 | 1250.963 | 1000.899 | 452.28 | 452.28 |
| $SO_2(g)$ | 1170.934 | 12.495 | 800.435 | 280.065 | 208.66 | −821.56 |
| $SO_2$ Recycle | 400.000 | 309.175 | 11097.590 | 6929.720 | 1071.13 | −4502.09 |
| $N_2(g)$ | 400.000 | 241.578 | 6767.421 | 5414.633 | 745.72 | 745.72 |
| $SO_2(g)$ | 400.000 | 67.597 | 4330.169 | 1515.087 | 325.40 | −5247.82 |
| OUTPUT SPECIES (2) Formula | Temper. ° C. | Amount kmol | Amount kg | Amount Nm³ | Latent H kWh | Total H kWh |
| $MoO_2$ Product (Out) | 600.000 | 6.248 | 799.318 | 0.124 | 70.81 | −949.47 |
| $MoO_2$ | 600.000 | 6.248 | 799.318 | 0.124 | 70.81 | −949.47 |
| $MoO_2$ Recycle | 600.000 | 13.745 | 1758.499 | 0.272 | 155.78 | −2088.83 |
| $MoO_2$ | 600.000 | 13.745 | 1758.499 | 0.272 | 155.78 | −2088.83 |
| Flue Gas | 600.000 | 57.151 | 2051.398 | 1280.964 | 312.34 | −717.88 |
| $N_2(g)$ | 600.000 | 44.656 | 1250.963 | 1000.899 | 215.39 | 215.39 |
| $SO_2(g)$ | 600.000 | 12.495 | 800.435 | 280.065 | 96.95 | −933.26 |

TABLE 8-continued

| Heat and Material Balance on MoO$_2$ Product and Recycle Streams. | | | | | | |
|---|---|---|---|---|---|---|
| SO$_2$ Recycle | 600.000 | 309.175 | 11097.590 | 6929.720 | 1689.68 | −3883.54 |
| N$_2$(g) | 600.000 | 241.578 | 6767.421 | 5414.633 | 1165.19 | 1165.19 |
| SO$_2$(g) | 600.000 | 67.597 | 4330.169 | 1515.087 | 524.49 | −5048.73 |
| | | kmol | Kg | Nm$^3$ | kWh | kWh |
| BALANCE: | | 0.000 | 0.000 | 0.000 | 0.00 | 0.00 |

2. Reoxidation of MoO$_2$ to MoO$_3$

In Flash Furnace II the reoxidation of MoO$_2$ to MoO$_3$ took place (Equation 5). The air in this reaction was preheated to 500° C. and 10% excess air was used. The adiabatic/flash temperature was around 1,115° C. and the products were cooled down to 600° C. with cooling air at 25° C. The product MoO$_3$ powder was transferred back in to Flash Furnace I to be used as an oxygen source.

TABLE 9

| Heat and Material Balance for Flash Furnace II. | | | | | | |
|---|---|---|---|---|---|---|
| INPUT SPECIES (4) Formula | Temper. ° C. | Amount kmol | Amount kg | Amount Nm$^3$ | Latent H kWh | Total H kWh |
| MoO$_2$ Recycle | 600.000 | 13.745 | 1758.499 | 0.272 | 155.78 | −2088.83 |
| MoO$_2$ | 600.000 | 13.745 | 1758.499 | 0.272 | 155.78 | −2088.83 |
| Reaction Air | 503.117 | 32.726 | 944.151 | 733.504 | 131.42 | 131.42 |
| N$_2$(g) | 503.117 | 25.853 | 724.242 | 579.468 | 102.71 | 102.71 |
| O$_2$(g) | 503.117 | 6.872 | 219.909 | 154.036 | 28.71 | 28.71 |
| Excess Air | 503.117 | 3.273 | 94.415 | 73.350 | 13.14 | 13.14 |
| N$_2$(g) | 503.117 | 2.585 | 72.424 | 57.947 | 10.27 | 10.27 |
| O$_2$(g) | 503.117 | 0.687 | 21.991 | 15.404 | 2.87 | 2.87 |
| OUTPUT SPECIES (4) Formula | Temper. ° C. | Amount kmol | Amount kg | Amount Nm$^3$ | Latent H kWh | Total H kWh |
| MoO$_3$ | 1114.039 | 13.745 | 1978.408 | 0.422 | 619.16 | −2223.74 |
| MoO$_3$ | 1114.039 | 13.745 | 1978.408 | 0.422 | 619.16 | −2223.74 |
| Flue Gas | 1114.039 | 29.126 | 818.657 | 652.818 | 279.46 | 279.46 |
| N$_2$(g) | 1114.039 | 28.439 | 796.666 | 637.415 | 272.49 | 272.49 |
| O$_2$(g) | 1114.039 | 0.687 | 21.991 | 15.404 | 6.97 | 6.97 |
| | | kmol | Kg | Nm$^3$ | kWh | kWh |
| BALANCE: | | −6.872 | 0.000 | −153.886 | 598.28 | 0.00 |

TABLE 10

| Heat and Material Balance for Cooling MoO$_3$ Product | | | | | | |
|---|---|---|---|---|---|---|
| INPUT SPECIES (5) Formula | Temper. ° C. | Amount kmol | Amount kg | Amount Nm$^3$ | Latent H kWh | Total H kWh |
| MoO$_3$ | 1114.039 | 13.745 | 1978.408 | 0.422 | 619.16 | −2223.74 |
| MoO$_3$ | 1114.039 | 13.745 | 1978.408 | 0.422 | 619.16 | −2223.74 |
| Flue Gas | 1114.039 | 29.126 | 818.657 | 652.818 | 279.46 | 279.46 |
| N$_2$(g) | 1114.039 | 28.439 | 796.666 | 637.415 | 272.49 | 272.49 |
| O$_2$(g) | 1114.039 | 0.687 | 21.991 | 15.404 | 6.97 | 6.97 |
| Cooling Air | 25.000 | 114.428 | 3301.289 | 2564.746 | 0.00 | 0.00 |
| N$_2$(g) | 25.000 | 90.398 | 2532.361 | 2026.149 | 0.00 | 0.00 |
| O$_2$(g) | 25.000 | 24.030 | 768.928 | 538.597 | 0.00 | 0.00 |
| OUTPUT SPECIES (5) Formula | Temper. ° C. | Amount kmol | Amount kg | Amount Nm$^3$ | Latent H kWh | Total H kWh |
| MoO$_3$ | 600.000 | 13.745 | 1978.408 | 0.422 | 199.63 | −2643.26 |
| MoO$_3$ | 600.000 | 13.745 | 1978.408 | 0.422 | 199.63 | −2643.26 |
| Flue Gas | 600.000 | 143.554 | 4119.945 | 3217.564 | 698.98 | 698.98 |
| N$_2$(g) | 600.000 | 118.837 | 3329.027 | 2663.564 | 573.18 | 573.18 |
| O$_2$(g) | 600.000 | 24.717 | 790.919 | 554.000 | 125.80 | 125.80 |
| | | kmol | Kg | Nm$^3$ | kWh | kWh |
| BALANCE: | | 0.000 | 0.000 | 0.000 | 0.00 | 0.00 |

TABLE 11

Heat and Material Balance for Boiler 1.

| INPUT SPECIES (3) Formula | Temper. °C. | Amount kmol | Amount kg | Amount Nm³ | Latent H kWh | Total H kWh |
|---|---|---|---|---|---|---|
| Flue Gas | 600.000 | 366.326 | 13148.988 | 8210.684 | 2002.02 | −4601.42 |
| $N_2(g)$ | 600.000 | 286.234 | 8018.384 | 6415.532 | 1380.57 | 1380.57 |
| $SO_2(g)$ | 600.000 | 80.092 | 5130.603 | 1795.152 | 621.45 | −5981.99 |
| Water | 25.000 | 52.110 | 938.775 | 1.024 | 0.00 | −4134.99 |
| $H_2O$(100 bar) | 25.000 | 52.110 | 938.775 | 1.024 | 0.00 | −4134.99 |

| OUTPUT SPECIES (3) Formula | Temper. °C. | Amount kmol | Amount kg | Amount Nm³ | Latent H kWh | Total H kWh |
|---|---|---|---|---|---|---|
| Flue Gas | 400.000 | 366.326 | 13148.988 | 8210.684 | 1269.13 | −5334.31 |
| $N_2(g)$ | 400.000 | 286.234 | 8018.384 | 6415.532 | 883.57 | 883.57 |
| $SO_2(g)$ | 400.000 | 80.092 | 5130.603 | 1795.152 | 385.56 | −6217.88 |
| Steam | 350.000 | 52.110 | 938.775 | 1167.977 | 282.97 | −3402.10 |
| $H_2O$(100 bar) | 350.000 | 52.110 | 938.775 | 1167.977 | 282.97 | −3402.10 |

|  |  | kmol | Kg | Nm³ | kWh | kWh |
|---|---|---|---|---|---|---|
| BALANCE: |  | 0.000 | 0.000 | 1166.953 | −449.92 | 0.00 |

TABLE 12

Heat and Material Balance for Catalyst Bed.

| INPUT SPECIES (8) Formula | Temper. °C. | Amount kmol | Amount kg | Amount Nm³ | Latent H kWh | Total H kWh |
|---|---|---|---|---|---|---|
| $SO_2$ Off-gas | 60.000 | 57.151 | 2051.398 | 1280.964 | 17.59 | −1012.63 |
| $SO_2(g)$ | 60.000 | 12.495 | 800.435 | 280.065 | 4.94 | −1025.28 |
| $N_2(g)$ | 60.000 | 44.656 | 1250.963 | 1000.899 | 12.65 | 12.65 |
| Air | 25.000 | 44.626 | 1287.479 | 1000.232 | 0.00 | 0.00 |
| $O_2(g)$ | 25.000 | 9.371 | 299.876 | 210.049 | 0.00 | 0.00 |
| $N_2(g)$ | 25.000 | 35.255 | 987.602 | 790.183 | 0.00 | 0.00 |

| OUTPUT SPECIES (8) Formula | Temper. °C. | Amount kmol | Amount kg | Amount Nm³ | Latent H kWh | Total H kWh |
|---|---|---|---|---|---|---|
| $SO_3$ for Acid Absorption Tower | 425.108 | 95.530 | 3338.876 | 2141.163 | 361.04 | −1012.63 |
| $SO_2(g)$ | 425.108 | 12.495 | 1000.352 | 280.065 | 86.49 | −1287.18 |
| $N_2(g)$ | 425.108 | 79.911 | 2238.565 | 1791.082 | 263.76 | 263.76 |
| $O_2(g)$ | 425.108 | 3.124 | 99.959 | 70.016 | 10.80 | 10.80 |

|  |  | kmol | Kg | Nm³ | kWh | kWh |
|---|---|---|---|---|---|---|
| BALANCE: |  | −6.248 | 0.000 | −140.032 | 343.45 | 0.00 |

TABLE 13

Heat and Material Balance for Heat Exchanger A.

| INPUT SPECIES (9) Formula | Temper. °C. | Amount kmol | Amount kg | Amount Nm³ | Latent H kWh | Total H kWh |
|---|---|---|---|---|---|---|
| $SO_3$ for Acid Absorption | 425.108 | 95.530 | 3338.876 | 2141.163 | 361.04 | −1012.63 |
| $SO_3(g)$ | 425.108 | 12.495 | 1000.352 | 280.065 | 86.49 | −1287.18 |
| $N_2(g)$ | 425.108 | 79.911 | 2238.565 | 1791.082 | 263.76 | 263.76 |
| $O_2(g)$ | 425.108 | 3.124 | 99.959 | 70.016 | 10.80 | 10.80 |
| Water | 25.000 | 17.341 | 312.396 | 0.341 | 0.00 | −1376.00 |
| $H_2O$(100 bar) | 25.000 | 17.341 | 312.396 | 0.341 | 0.00 | −1376.00 |

| OUTPUT SPECIES (9) Formula | Temper. °C. | Amount kmol | Amount kg | Amount Nm³ | Latent H kWh | Total H kWh |
|---|---|---|---|---|---|---|
| $SO_3$ for Acid Absorption | 160.000 | 95.530 | 3338.876 | 2141.163 | 117.16 | −1256.51 |
| $SO_3(g)$ | 160.000 | 12.495 | 1000.352 | 280.065 | 26.16 | −1347.51 |
| $N_2(g)$ | 160.000 | 79.911 | 2238.565 | 1791.082 | 87.50 | 87.50 |

TABLE 13-continued

Heat and Material Balance for Heat Exchanger A.

|  |  |  |  |  |  |  |
|---|---|---|---|---|---|---|
| $O_2(g)$ | 160.000 | 3.124 | 99.959 | 70.016 | 3.50 | 3.50 |
| Steam | 350.000 | 17.341 | 312.396 | 388.668 | 94.16 | −1132.12 |
| $H_2O$(100 bar) | 350.000 | 17.341 | 312.396 | 388.668 | 94.16 | −1132.12 |

|  |  | kmol | Kg | $Nm^3$ | kWh | kWh |
|---|---|---|---|---|---|---|
| BALANCE: |  | 0.000 | 0.000 | 388.327 | −149.72 | 0.00 |

TABLE 14

Heat and Material Balance for Acid Absorption Tower.

| INPUT SPECIES (10) Formula | Temper. °C. | Amount kmol | Amount kg | Amount $Nm^3$ | Latent H kWh | Total H kWh |
|---|---|---|---|---|---|---|
| $SO_3$ Feed | 160.000 | 95.530 | 3338.876 | 2141.163 | 117.16 | −1256.51 |
| $SO_3(g)$ | 160.000 | 12.495 | 1000.352 | 280.065 | 26.16 | −1347.51 |
| $N_2(g)$ | 160.000 | 79.911 | 2238.565 | 1791.082 | 87.50 | 87.50 |
| $O_2(g)$ | 160.000 | 3.124 | 99.959 | 70.016 | 3.50 | 3.50 |
| Acid Feed | 75.000 | 12.495 | 1450.564 | 0.000 | 37.77 | −3876.11 |
| $H_2SO_4*H_2O$ | 75.000 | 12.495 | 1450.564 | 0.000 | 37.77 | −3876.11 |
| Water (Boiler) | 50.000 | 27.675 | 498.562 | 0.544 | 14.47 | −2182.79 |
| $H_2O$(1 bar) | 50.000 | 27.675 | 498.562 | 0.544 | 14.47 | −2182.79 |

| OUTPUT SPECIES (10) Formula | Temper. °C. | Amount kmol | Amount kg | Amount $Nm^3$ | Latent H kWh | Total H kWh |
|---|---|---|---|---|---|---|
| Acid | 125.000 | 24.991 | 2450.916 | 1.331 | 102.01 | −5548.57 |
| $H_2SO_4$ | 125.000 | 24.991 | 2450.916 | 1.331 | 102.01 | −5548.57 |
| Flue Gas | 125.000 | 83.034 | 2338.524 | 1861.098 | 67.32 | 67.32 |
| $N_2(g)$ | 125.000 | 79.911 | 2238.565 | 1791.082 | 64.75 | 64.75 |
| $O_2(g)$ | 125.000 | 3.124 | 99.959 | 70.016 | 2.58 | 2.58 |
| Steam (Boiler) | 125.000 | 27.675 | 498.562 | 620.286 | 27.60 | −1834.17 |
| $H_2O$(1 bar) | 125.000 | 27.675 | 498.562 | 620.286 | 27.60 | −1834.17 |

|  |  | kmol | Kg | $Nm^3$ | kWh | kWh |
|---|---|---|---|---|---|---|
| BALANCE: |  | 0.000 | 0.000 | 341.008 | 27.54 | 0.00 |

TABLE 15

Heat and Material Balance for Heat Exchanger B.

| INPUT SPECIES (11) Formula | Temper. °C. | Amount kmol | Amount kg | Amount $Nm^3$ | Latent H kWh | Total H kWh |
|---|---|---|---|---|---|---|
| Steam from AAT | 125.000 | 27.675 | 498.562 | 0.544 | 58.14 | −2139.12 |
| $H_2O$(1 bar) | 125.000 | 27.675 | 498.562 | 0.544 | 58.14 | −2139.12 |
| Air | 25.000 | 92.525 | 2669.372 | 2073.814 | 0.00 | 0.00 |
| $N_2(g)$ | 25.000 | 73.095 | 2047.629 | 1638.313 | 0.00 | 0.00 |
| $O_2(g)$ | 25.000 | 19.430 | 621.744 | 435.501 | 0.00 | 0.00 |

| OUTPUT SPECIES (11) Formula | Temper. °C. | Amount kmol | Amount kg | Amount $Nm^3$ | Latent H kWh | Total H kWh |
|---|---|---|---|---|---|---|
| Water | 50.000 | 27.675 | 498.562 | 0.544 | 14.47 | −2182.79 |
| $H_2O$(1 bar) | 50.000 | 27.675 | 498.562 | 0.544 | 14.47 | −2182.79 |
| Preheated Air | 83.142 | 92.525 | 2669.372 | 2073.814 | 43.68 | 43.68 |
| $N_2(g)$ | 83.142 | 73.095 | 2047.629 | 1638.313 | 34.41 | 34.41 |
| $O_2(g)$ | 83.142 | 19.430 | 621.744 | 435.501 | 9.27 | 9.27 |

|  |  | kmol | kg | $Nm^3$ | kWh | kWh |
|---|---|---|---|---|---|---|
| BALANCE: |  | 0.000 | 0.000 | 0.000 | 0.00 | 0.00 |

TABLE 16

Heat and Material Balance for Heat Exchanger C.

| INPUT SPECIES (7) Formula | Temper. °C. | Amount kmol | Amount kg | Amount Nm³ | Latent H kWh | Total H kWh |
|---|---|---|---|---|---|---|
| Flue Gas | 600.000 | 143.554 | 4119.945 | 3217.564 | 698.98 | 698.98 |
| $N_2(g)$ | 600.000 | 118.837 | 3329.027 | 2663.564 | 573.18 | 573.18 |
| $O_2(g)$ | 600.000 | 24.717 | 790.919 | 554.000 | 125.80 | 125.80 |
| Air | 83.142 | 35.998 | 1038.566 | 806.854 | 16.99 | 16.99 |
| $N_2(g)$ | 83.142 | 28.439 | 796.666 | 637.415 | 13.39 | 13.39 |
| $O_2(g)$ | 83.142 | 7.560 | 241.900 | 169.439 | 3.61 | 3.61 |
| OUTPUT SPECIES (7) Formula | Temper. °C. | Amount kmol | Amount kg | Amount Nm³ | Latent H kWh | Total H kWh |
| Flue Gas | 500.000 | 143.554 | 4119.945 | 3217.564 | 571.42 | 571.42 |
| $N_2(g)$ | 500.000 | 118.837 | 3329.027 | 2663.564 | 468.88 | 468.88 |
| $O_2(g)$ | 500.000 | 24.717 | 790.919 | 554.000 | 102.54 | 102.54 |
| Preheated Air | 503.117 | 35.998 | 1038.566 | 806.854 | 144.56 | 144.56 |
| $N_2(g)$ | 503.117 | 28.439 | 796.666 | 637.415 | 112.98 | 112.98 |
| $O_2(g)$ | 503.117 | 7.560 | 241.900 | 169.439 | 31.58 | 31.58 |
| | | kmol | kg | Nm³ | kWh | kWh |
| BALANCE: | | 0.000 | 0.000 | 0.000 | 0.00 | 0.00 |

TABLE 17

Heat and Material Balance for Boiler 2.

| INPUT SPECIES (6) Formula | Temper. °C. | Amount kmol | Amount kg | Amount Nm³ | Latent H kWh | Total H kWh |
|---|---|---|---|---|---|---|
| Flue Gas | 500.000 | 143.554 | 4119.945 | 3217.564 | 571.42 | 571.42 |
| $N_2(g)$ | 500.000 | 118.837 | 3329.027 | 2663.564 | 468.88 | 468.88 |
| $O_2(g)$ | 500.000 | 24.717 | 790.919 | 554.000 | 102.54 | 102.54 |
| Water | 25.000 | 30.247 | 544.903 | 0.594 | 0.00 | −2400.12 |
| $H_2O$(100 bar) | 25.000 | 30.247 | 544.903 | 0.594 | 0.00 | −2400.12 |
| OUTPUT SPECIES (6) Formula | Temper. °C. | Amount kmol | Amount kg | Amount Nm³ | Latent H kWh | Total H kWh |
| Flue Gas | 150.000 | 143.554 | 4119.945 | 3217.564 | 146.02 | 146.02 |
| $N_2(g)$ | 150.000 | 118.837 | 3329.027 | 2663.564 | 120.44 | 120.44 |
| $O_2(g)$ | 150.000 | 24.717 | 790.919 | 554.000 | 25.57 | 25.57 |
| Steam | 350.000 | 30.247 | 544.903 | 677.941 | 164.25 | −1974.72 |
| $H_2O$(100 bar) | 350.000 | 30.247 | 544.903 | 677.941 | 164.25 | −1974.72 |
| | | kmol | kg | Nm³ | kWh | kWh |
| BALANCE: | | 0.000 | 0.000 | 677.347 | −261.15 | 0.00 |

Figure 29:
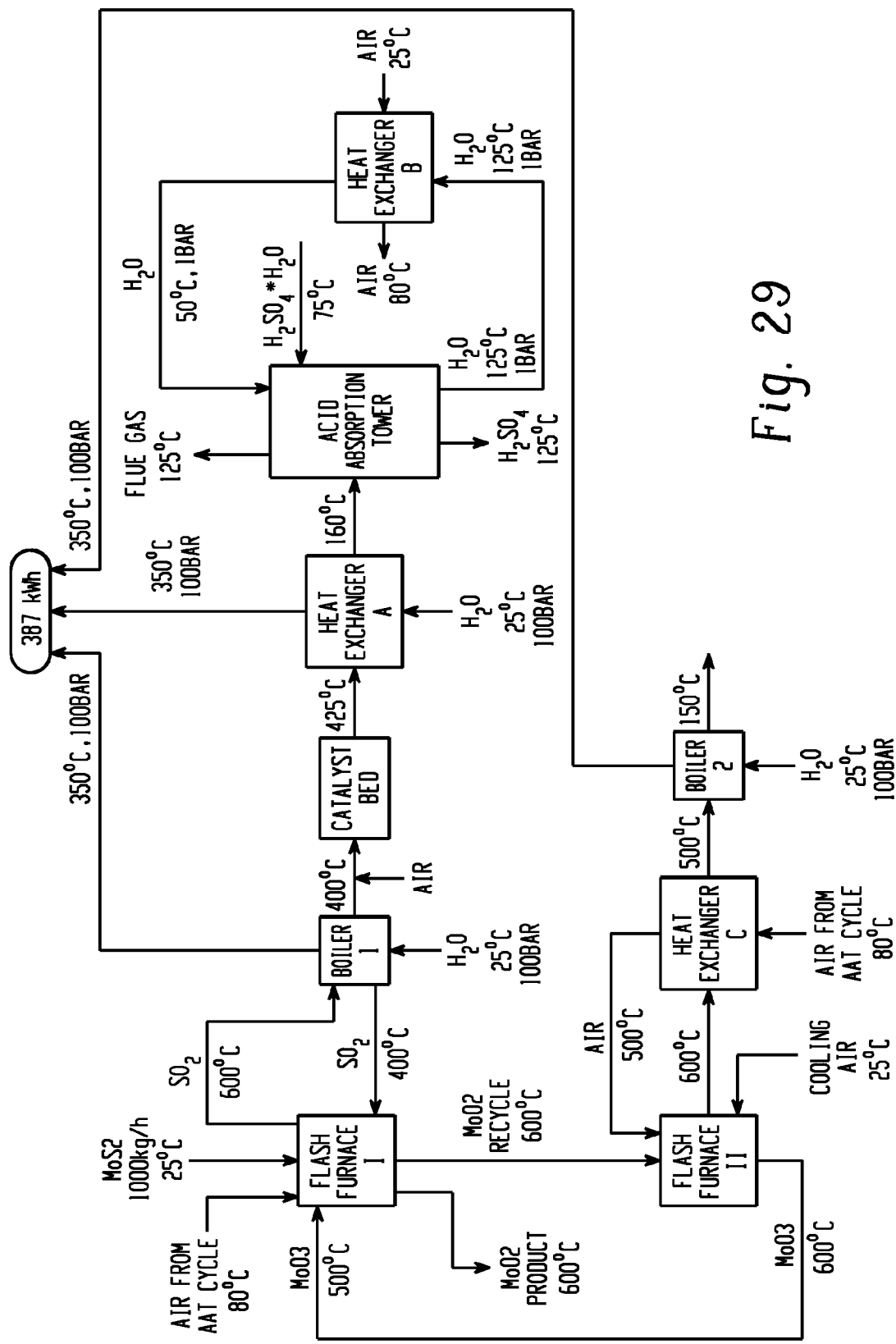
FIG. 29 is a flow sheet illustrating a $MoS_2$—$MoO_3$-Air dual flash looping process with high pressure steam production.

Based on these calculations, an energy flow sheet diagram was prepared (FIG. 29). The energy input required to operate this given starting composition was zero. This starting composition of 37% $MoO_3$/63% $O_2$ yields 387 kWh-value of high pressure steam (350° C., 100 bar) per 1,000 kg $MoS_2$.

The potential for energy capture was evaluated for each of the $MoO_3$:$O_2$ ratios investigated above (Table 18). As can be seen, the amount of energy to be captured ranges from 385 to 400 kWh per 1,000 kg $MoS_2$.

TABLE 18

Energy Capture with Varying Stoichiometric Ratios of $MoO_3$/$O_2$ (in Air) in $MoO_2$ Production (per 1,000 kg $MoS_2$)

| Moles of $MoO_3$ | 1.0 | 1.2 | 1.4 | 1.6 | 1.8 | 2.0 | 2.2 | 2.4 |
|---|---|---|---|---|---|---|---|---|
| Moles of $O_2$ (in air) | 2.5 | 2.4 | 2.3 | 2.2 | 2.1 | 2.0 | 1.9 | 1.8 |
| Adiabatic Temperature (° C.) | 1404 | 1368 | 1331 | 1293 | 1253 | 1214 | 1172 | 1132 |

TABLE 18-continued

Energy Capture with Varying Stoichiometric Ratios of $MoO_3$/$O_2$ (in Air) in $MoO_2$ Production (per 1,000 kg $MoS_2$)

| Energy Value (kWh) | 400 | 398 | 396 | 393 | 391 | 389 | 387 | 385 |
|---|---|---|---|---|---|---|---|---|

Heat and Material Balance Calculations for Configuration Including Rotary Kiln

In the configurations presented here, the key process steps have been modeled; these steps are: (1) deoiling and the concentrate and blending of the concentrate and recycled molybdenum trioxide; (2) reaction of the molybdenum disulfide concentrate with molybdenum trioxide to selectively produce molybdenum dioxide in a rotary kiln; (3) splitting of the molybdenum dioxide into the product stream and the stream to be oxidized and recycled; (4) oxidation of the molybdenum dioxide to molybdenum trioxide in a downer furnace; (5) recycling of the molybdenum trioxide to complete the cycle.

This configuration of processing steps and unit operations is one possible configuration, alternative configurations (including, but not limited to, the use of alternative reaction vessels, e.g. multiple hearth roasters, flash furnaces, etc.) are possible.

Heat losses at the reaction steps have been estimated. Additionally, heat exchangers have been used to maximize heat recovery and minimize the requirement for outside heating. In this model, a heat exchanger is modeled as two units—the first unit cools the hot process gas from the inlet temperature to a specified outlet temperature (potentially constrained by a sulfuric acid dew point consideration); during this cooling, HSC calculates the enthalpy change required. The second unit "calls" the enthalpy change from the cooling unit and applies an enthalpy change of equal magnitude and opposite sign to the cooling air it is supplied; an objective function is used to iterate either the outlet temperature of the cooling air with a given flow rate, or its mass flow rate with a given outlet temperature. In this fashion, an iterative solution for the heat balance is calculated. Because the heat exchangers in this process are linked consecutively to maximize heat recovery and minimize the external heating (via natural gas combustion) required in the furnaces, the mass flow rates of the two linked heat exchanger systems (heat exchangers #1 and #2, and heat exchangers #3, #5, and #6) are specified based on the hot air load required by the furnaces they service. As such, in the iterative solutions for each heat exchanger the mass flow rate is specified and the only degree of freedom available for iteration is the outlet temperature at each unit. A heat transfer efficiency of 90% was assumed. The connectivity of the heat exchangers presented is only one possible configuration; alternative, perhaps more efficient, configurations are possible.

In the model presented below, a deoiler is used to remove water and flotation oil associated with the concentrate before it is fed to the rotary kiln. A blender then adequately mixes the deoiled and dried concentrate with the recycle stream of molybdenum trioxide.

A direct fired rotary kiln is used to perform the looping sulfide oxidation reaction. This rotary kiln has been modeled as two discrete units, though in reality it would function as a direct, countercurrent fired rotary kiln. By modeling the reactor in two discrete steps, the "hockey stick" temperature curve can be better approximated. In the first discrete unit the reaction is carried out to approximately 90% completion and 650° C., in the second discrete unit the reaction is completed at 700° C. This configuration provides a better indication of the natural gas usage and external heating required.

In this case, the amount of hot air required is dependent on the stoichiometry of the reactions taking place in the rotary kiln. As previously discussed, the looping sulfide oxidation reaction provides for a range of molybdenum trioxide to oxygen ratios; in this simulation a ratio of 80% stoichiometry for molybdenum trioxide and 20% stoichiometry for oxygen has been used. Additionally, the requisite amount of air for natural gas combustion has been included. The product gases from the rotary kiln are passed through a heat exchanger and sent for gas cleaning; due to the rich $SO_2$ content in this gas stream the gas must be kept above the acid dew point. The solid products, now mostly molybdenum dioxide, per the looping sulfide oxidation reaction scheme, are further cooled and split based on the reaction stoichiometry. The fraction to be collected as product is cooled further; the fraction to be recycled into molybdenum trioxide is kept at elevated temperature and sent for processing in the downer furnace.

The downer furnace is the reactor in which the molybdenum dioxide is oxidized to molybdenum trioxide with excess air. In this simulation, 300% excess air is used. The air, along with the air required for natural gas combustion is preheated to elevated temperatures by heat exchangers to minimize the amount of natural gas that must be combusted. The downer furnace is designed to operate at 650° C. to minimize molybdenum trioxide volatilization. A heat loss unit is included in this simulation to model the rapid cooling that takes place in the lower sections of the downer furnace as the converted molybdenum trioxide rapidly cools as it falls the length of the reactor. The gases exiting the reactor are cooled and sent to gas handling. The solids are cooled in a heat exchanger and looped back to the blender to complete the reaction cycle.

To demonstrate the relative amounts of reagents consumed in this process, a range of operating throughputs is presented below. In the first case, a molybdenum concentrate feed containing 50 kg per hour of molybdenum disulfide is considered. This throughput is equivalent to approximately 30,000 lbs molybdenum per year of production. In the second case, 200 kg per hour of molybdenum disulfide is considered, which is equivalent to 120,000 lbs molybdenum per year of production.

Figure 30:
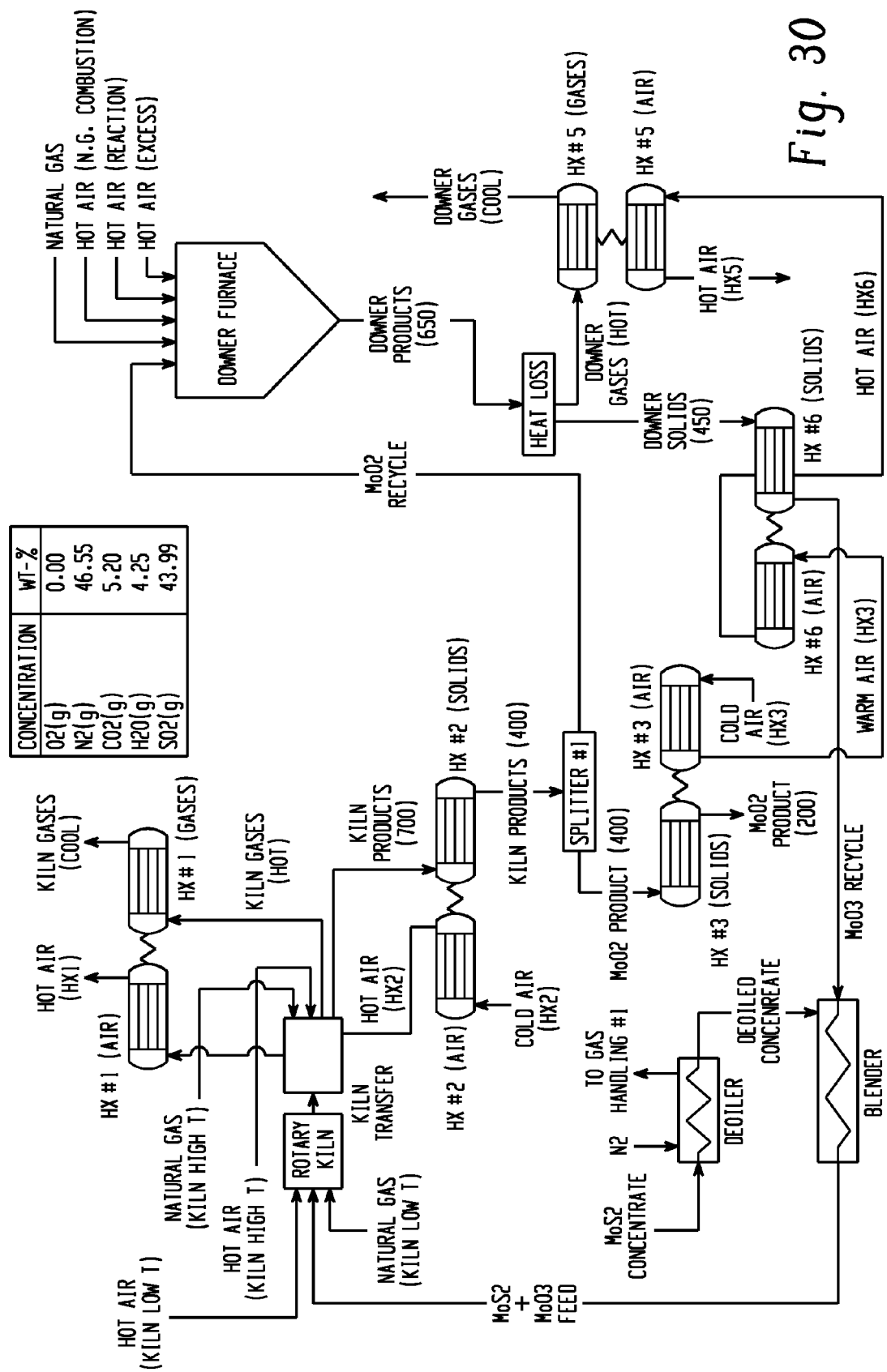
FIG. 30 is a HSC 7.1 SIM simulation flow sheet illustrating the processing of 50 kg/hr of $MoS_2$ concentrate feed in a $MoS_2$—$MoO_3$-Air looping process with high temperature air production.
Figure 31:
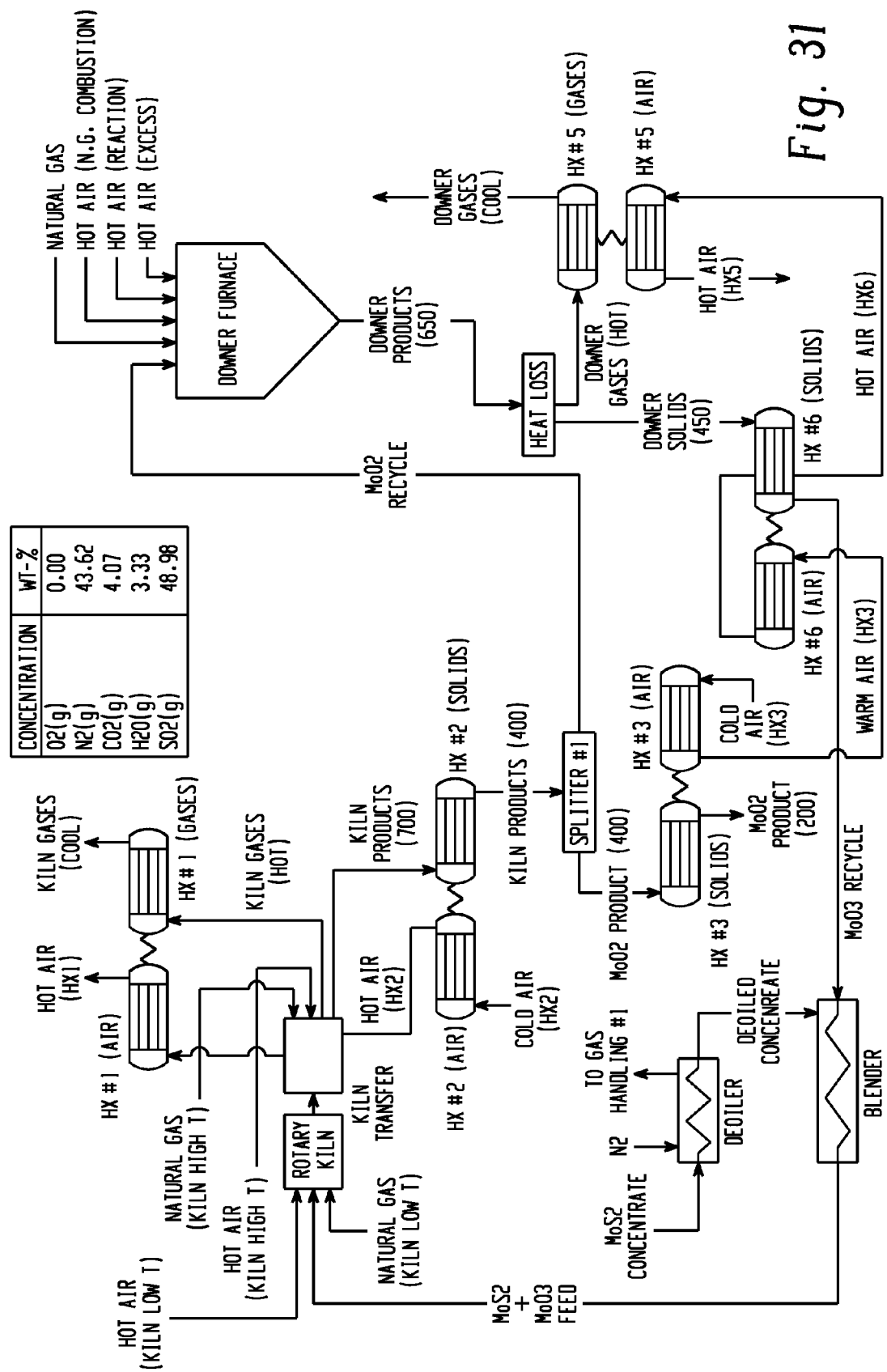
FIG. 31 is a HSC 7.1 SIM simulation flow sheet illustrating the processing of 200 kg/hr of $MoS_2$ concentrate feed in a $MoS_2$—$MoO_3$-Air looping process with high temperature air production.

FIGS. 30 and 31 show process flow sheet and heat and material balances for the production of $MoO_2$ at the feed rates of 50 and 200 kg/hr $MoS_2$ contained, respectively. The heat and material balances for the foregoing processes are summarized in Tables 19A-19B and 20A-20B, respectively.

An alternative configuration not shown here, but that would differ only slightly, is a rotary kiln that is indirectly fired. In this scheme, the rotary kiln would have a firebox, in which natural gas is burned to heat the contents of the kiln via conduction. The natural gas consumption would be slightly higher than that in the directly fired scheme because of the heat losses and inefficiencies associated with heat transfer through the kiln walls. However, the volume of kiln gases requiring treatment in the $SO_2$ handling system would be smaller.

TABLE 19A

Material Balance for 200 kg/hr $MoS_2$ Concentrate Feed to Rotary Kiln Process

| | $MoS_2$ Concentrate | To Gas Handling #1 | $MoS_2$ + $MoO_3$ Feed | Hot Air (Kiln Low T) | Natural Gas (Kiln Low T) | Hot Air (Kiln High T) | Natural Gas (Kiln High T) | Kiln Gases (Hot) | Kiln Products (700) |
|---|---|---|---|---|---|---|---|---|---|
| Mass Flow, kg/h | 59 | 5 | 297 | 51 | 1 | 4 | 0 | 91 | 263 |
| Temperature, C. | 25 | 300 | 250 | 414 | 25 | 414 | 25 | 700 | 700 |
| Pressure, bar | 1 | 1 | 1 | 1 | 1 | 1 | 1 | 1 | 1 |
| $O_2$(g), kg/h | 0.00 | 0.00 | 0.00 | 11.87 | 0.00 | 1.01 | 0.00 | 0.00 | 0.00 |
| $N_2$(g), kg/h | 0.00 | 1.58 | 0.00 | 39.04 | 0.00 | 3.31 | 0.00 | 42.35 | 0.00 |
| $CO_2$(g), kg/h | 0.00 | 0.00 | 0.00 | 0.00 | 0.00 | 0.00 | 0.00 | 4.73 | 0.00 |
| $H_2O$(g), kg/h | 0.00 | 2.22 | 0.00 | 0.00 | 0.00 | 0.00 | 0.00 | 3.87 | 0.00 |

TABLE 19A-continued

Material Balance for 200 kg/hr MoS$_2$ Concentrate Feed to Rotary Kiln Process

|  | MoS$_2$ Concentrate | To Gas Handling #1 | MoS$_2$ + MoO$_3$ Feed | Hot Air (Kiln Low T) | Natural Gas (Kiln Low T) | Hot Air (Kiln High T) | Natural Gas (Kiln High T) | Kiln Gases (Hot) | Kiln Products (700) |
|---|---|---|---|---|---|---|---|---|---|
| SO$_2$(g), kg/h | 0.00 | 0.00 | 0.00 | 0.00 | 0.00 | 0.00 | 0.00 | 40.02 | 0.00 |
| C$_9$H$_{20}$(NONg), kg/h | 0.00 | 1.67 | 0.00 | 0.00 | 0.00 | 0.00 | 0.00 | 0.00 | 0.00 |
| CH$_4$(g), kg/h | 0.00 | 0.00 | 0.00 | 0.00 | 1.47 | 0.00 | 0.26 | 0.00 | 0.00 |
| H$_2$O(l), kg/h | 2.22 | 0.00 | 0.00 | 0.00 | 0.00 | 0.00 | 0.00 | 0.00 | 0.00 |
| C$_9$H$_{20}$(NONl), kg/h | 1.67 | 0.00 | 0.00 | 0.00 | 0.00 | 0.00 | 0.00 | 0.00 | 0.00 |
| MoS$_2$, kg/h | 50.00 | 0.00 | 50.00 | 0.00 | 0.00 | 0.00 | 0.00 | 0.00 | 0.00 |
| SiO$_2$, kg/h | 5.56 | 0.00 | 32.15 | 0.00 | 0.00 | 0.00 | 0.00 | 0.00 | 32.15 |
| MoO$_2$, kg/h | 0.00 | 0.00 | 0.00 | 0.00 | 0.00 | 0.00 | 0.00 | 0.00 | 231.80 |
| MoO$_3$, kg/h | 0.00 | 0.00 | 215.21 | 0.00 | 0.00 | 0.00 | 0.00 | 0.00 | 0.00 |
| Enthalpy, kWh | −58.31 | −8.37 | −457.87 | 5.72 | −1.90 | 0.49 | −0.33 | −60.79 | −400.23 |

TABLE 19B

Material Balance for 50 kg/hr MoS$_2$ Concentrate Feed to Rotary Kiln Process

|  | MoO$_2$ Product (200) | MoO$_2$ Recycle | Natural Gas | Hot Air (N.G. Combustion) | Hot Air (Reaction) | Hot Air (Excess) | Downer Gases (Cool) | Downer Solids (450) | MoO$_3$ Recycle |
|---|---|---|---|---|---|---|---|---|---|
| Mass Flow, kg/h | 46 | 218 | 12 | 211 | 103 | 825 | 1127 | 242 | 242 |
| Temperature, C. | 200 | 400 | 25 | 198 | 198 | 198 | 350 | 450 | 250 |
| Pressure, bar | 1 | 1 | 1 | 1 | 1 | 1 | 1 | 1 | 1 |
| O$_2$(g), kg/h | 0.00 | 0.00 | 0.00 | 49.24 | 23.97 | 71.90 | 72.03 | 0.00 | 0.00 |
| N$_2$(g), kg/h | 0.00 | 0.00 | 0.00 | 161.99 | 78.85 | 752.60 | 993.45 | 0.00 | 0.00 |
| CO$_2$(g), kg/h | 0.00 | 0.00 | 0.00 | 0.00 | 0.00 | 0.00 | 33.77 | 0.00 | 0.00 |
| H$_2$O(g), kg/h | 0.00 | 0.00 | 0.00 | 0.00 | 0.00 | 0.00 | 27.65 | 0.00 | 0.00 |
| SO$_2$(g), kg/h | 0.00 | 0.00 | 0.00 | 0.00 | 0.00 | 0.00 | 0.00 | 0.00 | 0.00 |
| C$_9$H$_{20}$(NONg), kg/h | 0.00 | 0.00 | 0.00 | 0.00 | 0.00 | 0.00 | 0.00 | 0.00 | 0.00 |
| CH$_4$(g), kg/h | 0.00 | 0.00 | 12.31 | 0.00 | 0.00 | 0.00 | 0.00 | 0.00 | 0.00 |
| H$_2$O(l), kg/h | 0.00 | 0.00 | 0.00 | 0.00 | 0.00 | 0.00 | 0.00 | 0.00 | 0.00 |
| C$_9$H$_{20}$(NONl), kg/h | 0.00 | 0.00 | 0.00 | 0.00 | 0.00 | 0.00 | 0.00 | 0.00 | 0.00 |
| MoS$_2$, kg/h | 0.00 | 0.00 | 0.00 | 0.00 | 0.00 | 0.00 | 0.00 | 0.00 | 0.00 |
| SiO$_2$, kg/h | 5.56 | 26.59 | 0.00 | 0.00 | 0.00 | 0.00 | 0.00 | 26.59 | 26.59 |
| MoO$_2$, kg/h | 40.06 | 191.74 | 0.00 | 0.00 | 0.00 | 0.00 | 0.00 | 0.00 | 0.00 |
| MoO$_3$, kg/h | 0.00 | 0.00 | 0.00 | 0.00 | 0.00 | 0.00 | 0.00 | 215.21 | 215.21 |
| Enthalpy, kWh | −73.33 | −343.45 | −15.90 | 10.34 | 5.03 | 40.98 | −78.39 | −402.66 | −412.00 |

TABLE 20A

Material Balance for 200 kg/hr MoS$_2$ Concentrate Feed to Rotary Kiln Process

|  | MoS$_2$ Concentrate | To Gas Handling #1 | MoS$_2$ + MoO$_3$ Feed | Hot Air (Kiln Low T) | Natural Gas (Kiln Low T) | Hot Air (Kiln High T) | Natural Gas (Kiln High T) | Kiln Gases (Hot) | Kiln Products (700) |
|---|---|---|---|---|---|---|---|---|---|
| Mass Flow, kg/h | 238 | 22 | 1189 | 173 | 4 | 13 | 1 | 327 | 1053 |
| Temperature, C. | 25 | 300 | 250 | 460 | 25 | 460 | 25 | 700 | 700 |
| Pressure, bar | 1 | 1 | 1 | 1 | 1 | 1 | 1 | 1 | 1 |
| O$_2$(g), kg/h | 0.00 | 0.00 | 0.00 | 40.28 | 0.00 | 3.06 | 0.00 | 0.01 | 0.00 |
| N$_2$(g), kg/h | 0.00 | 6.38 | 0.00 | 132.51 | 0.00 | 10.05 | 0.00 | 142.56 | 0.00 |
| CO$_2$(g), kg/h | 0.00 | 0.00 | 0.00 | 0.00 | 0.00 | 0.00 | 0.00 | 13.30 | 0.00 |
| H$_2$O(g), kg/h | 0.00 | 8.89 | 0.00 | 0.00 | 0.00 | 0.00 | 0.00 | 10.89 | 0.00 |
| SO$_2$(g), kg/h | 0.00 | 0.00 | 0.00 | 0.00 | 0.00 | 0.00 | 0.00 | 160.09 | 0.00 |
| C$_9$H$_{20}$(NONg), kg/h | 0.00 | 6.67 | 0.00 | 0.00 | 0.00 | 0.00 | 0.00 | 0.00 | 0.00 |
| CH$_4$(g), kg/h | 0.00 | 0.00 | 0.00 | 0.00 | 4.07 | 0.00 | 0.77 | 0.00 | 0.00 |
| H$_2$O(l), kg/h | 8.89 | 0.00 | 0.00 | 0.00 | 0.00 | 0.00 | 0.00 | 0.00 | 0.00 |

TABLE 20A-continued

Material Balance for 200 kg/hr MoS₂ Concentrate Feed to Rotary Kiln Process

|  | MoS₂ Concentrate | To Gas Handling #1 | MoS₂ + MoO₃ Feed | Hot Air (Kiln Low T) | Natural Gas (Kiln Low T) | Hot Air (Kiln High T) | Natural Gas (Kiln High T) | Kiln Gases (Hot) | Kiln Products (700) |
|---|---|---|---|---|---|---|---|---|---|
| C₉H₂₀(NONl), kg/h | 6.67 | 0.00 | 0.00 | 0.00 | 0.00 | 0.00 | 0.00 | 0.00 | 0.00 |
| MoS₂, kg/h | 200.00 | 0.00 | 200.00 | 0.00 | 0.00 | 0.00 | 0.00 | 0.00 | 0.00 |
| SiO₂, kg/h | 22.22 | 0.00 | 128.59 | 0.00 | 0.00 | 0.00 | 0.00 | 0.00 | 128.59 |
| MoO₂, kg/h | 0.00 | 0.00 | 0.00 | 0.00 | 0.00 | 0.00 | 0.00 | 0.00 | 927.21 |
| MoO₃, kg/h | 0.00 | 0.00 | 860.86 | 0.00 | 0.00 | 0.00 | 0.00 | 0.00 | 0.00 |
| Enthalpy, kWh | −233.22 | −33.49 | −1831.47 | 21.80 | −5.26 | 1.65 | −1.00 | −220.49 | −1600.91 |

TABLE 20B

Material Balance for 200 kg/hr MoS₂ Concentrate Feed to Rotary Kiln Process

|  | MoO₂ Product (200) | MoO₂ Recycle | Natural Gas | Hot Air (N.G. Combustion) | Hot Air (Reaction) | Hot Air (Excess) | Downer Gases (Cool) | Downer Solids (450) | MoO₃ Recycle |
|---|---|---|---|---|---|---|---|---|---|
| Mass Flow, kg/h | 182 | 871 | 6 | 108 | 411 | 1040 | 1470 | 967 | 967 |
| Temperature, C. | 200 | 400 | 25 | 144 | 144 | 144 | 350 | 450 | 250 |
| Pressure, bar | 1 | 1 | 1 | 1 | 1 | 1 | 1 | 1 | 1 |
| O₂(g), kg/h | 0.00 | 0.00 | 0.00 | 25.27 | 95.87 | 287.61 | 287.64 | 0.00 | 0.00 |
| N₂(g), kg/h | 0.00 | 0.00 | 0.00 | 83.13 | 315.42 | 752.60 | 1151.15 | 0.00 | 0.00 |
| CO₂(g), kg/h | 0.00 | 0.00 | 0.00 | 0.00 | 0.00 | 0.00 | 17.33 | 0.00 | 0.00 |
| H₂O(g), kg/h | 0.00 | 0.00 | 0.00 | 0.00 | 0.00 | 0.00 | 14.19 | 0.00 | 0.00 |
| SO₂(g), kg/h | 0.00 | 0.00 | 0.00 | 0.00 | 0.00 | 0.00 | 0.00 | 0.00 | 0.00 |
| C₉H₂₀(NONg), kg/h | 0.00 | 0.00 | 0.00 | 0.00 | 0.00 | 0.00 | 0.00 | 0.00 | 0.00 |
| CH₄(g), kg/h | 0.00 | 0.00 | 6.32 | 0.00 | 0.00 | 0.00 | 0.00 | 0.00 | 0.00 |
| H₂O(l), kg/h | 0.00 | 0.00 | 0.00 | 0.00 | 0.00 | 0.00 | 0.00 | 0.00 | 0.00 |
| C₉H₂₀(NONl), kg/h | 0.00 | 0.00 | 0.00 | 0.00 | 0.00 | 0.00 | 0.00 | 0.00 | 0.00 |
| MoS₂, kg/h | 0.00 | 0.00 | 0.00 | 0.00 | 0.00 | 0.00 | 0.00 | 0.00 | 0.00 |
| SiO₂, kg/h | 22.22 | 106.36 | 0.00 | 0.00 | 0.00 | 0.00 | 0.00 | 106.36 | 106.36 |
| MoO₂, kg/h | 160.24 | 766.97 | 0.00 | 0.00 | 0.00 | 0.00 | 0.00 | 0.00 | 0.00 |
| MoO₃, kg/h | 0.00 | 0.00 | 0.00 | 0.00 | 0.00 | 0.00 | 0.00 | 860.86 | 860.86 |
| Enthalpy, kWh | −293.31 | −1373.78 | −8.16 | 3.63 | 13.77 | 34.67 | 42.52 | −1610.62 | −1648.01 |

The terminology used herein is for the purpose of describing particular embodiments only and is not intended to be limiting. The terms "a" and "an" and "the" herein do not denote a limitation of quantity, and are to be construed to cover both the singular and the plural, unless otherwise indicated herein or clearly contradicted by context. "Or" means "and/or." All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. The terms "first," "second," and the like, herein do not denote any order, quantity, or importance, but rather are used to denote one element from another. Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The terms first, second, third etc. can be used herein to describe various elements, components, regions, layers and/or sections, but these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section without departing from the teachings of the present embodiments.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A looping method for production of molybdenum(IV) oxide, the method comprising:
   (a) reacting a molybdenite feed with a stoichiometric mixture comprising molybdenum(VI) oxide and oxygen in a first furnace to produce molybdenum(IV) oxide and sulfur(IV) oxide in accordance with a reaction defined by Equation 4:

$$MoS_2 + aMoO_3 + (3-a/2)O_2 = (1+a)MoO_2 + 2SO_2 \qquad \text{Equation 4,}$$

wherein a is the number of moles of $MoO_3$ per mole of $MoS_2$, and
   wherein an amount of $aMoO_3+(3-a/2)O_2$ in Equation 4 is about 85% to about 115% per mole of $MoS_2$;
   (b) removing a first portion of the molybdenum(IV) oxide from the first furnace;
   (c) transferring a second portion of the molybdenum(IV) oxide from the first furnace to a second furnace;
   (d) reoxidizing the second portion of the molybdenum(IV) oxide in the second furnace to molybdenum(VI) oxide; and
   (e) looping the molybdenum(VI) oxide from the second furnace to the first furnace for use as an oxidizing agent.

2. The looping method for production of molybdenum(IV) oxide of claim 1, wherein a rate of the transferring of the second portion of the molybdenum(IV) oxide to the second furnace is stoichiometrically equivalent to a rate of a molybdenum(VI) oxide usage in the first furnace.

3. The looping method for production of molybdenum(IV) oxide of claim 1, wherein the oxygen comprises pure oxygen, air, or oxygen-enriched air.

4. The looping method for production of molybdenum(IV) oxide of claim 1, wherein the oxidation is carried out at a temperature of less than about 1,000° C.

5. The looping method for production of molybdenum(IV) oxide of claim 1, wherein the oxidation is carried out at a temperature of about 1,300° C. to about 1,400° C.

6. The looping method for production of molybdenum(IV) oxide of claim 1, wherein the reoxidation is carried out at a temperature of less than about 1,300° C.

7. The looping method for production of molybdenum(IV) oxide of claim 1, wherein the first furnace is a flash furnace, a shaft furnace, a multiple hearth furnace, a rotary kiln, or a fluid bed furnace.

8. The looping method for production of molybdenum(IV) oxide of claim 1, wherein the second furnace is a flash furnace, a shaft furnace, a multiple hearth furnace, a rotary kiln, or a fluid bed furnace.

9. The looping method for production of molybdenum(IV) oxide of claim 8, wherein the flash furnace operates free of sulfur.

10. The looping method for production of molybdenum(IV) oxide of claim 1, wherein a ratio of molybdenum(VI) oxide to oxygen is calculated according to the formula $6\times(1-a/3):a$ wherein a is equal to the moles of oxygen per 1 mole of molybdenum(IV) sulfide and used to specify an amount of molybdenum (VI) oxide and oxygen used to produce molybdenum(IV) oxide according to Equation 4.

11. The looping method for production of molybdenum(IV) oxide of claim 1, wherein a ratio of molybdenum(VI) oxide to oxygen is from about 1.0:2.5 to about 2.4:1.8.

12. The looping method for production of molybdenum(IV) oxide of claim 1, wherein the amount of $aMoO_3+(3-a/2)O_2$ in Equation 4 is about 90% to about 110% per mole of $MoS_2$.

13. The looping method for production of molybdenum(IV) oxide of claim 1, further comprising removing a sulfur(IV) oxide off-gas produced in the oxidation.

14. The looping method for production of molybdenum(IV) oxide of claim 13, wherein the sulfur(IV) oxide off gas is concentrated.

15. The looping method for production of molybdenum(IV) oxide of claim 1, wherein a portion of a sulfur dioxide off-gas produced in the oxidation is recycled to the first furnace.

16. The looping method for production of molybdenum(IV) oxide of claim 1, wherein the oxidation produces energy in an amount of about 385 to about 400 kiloWatt×hour based on 1,000 kilogram of the molybdenite feed.

* * * * *